US008830428B2

(12) United States Patent
Miyakawa et al.

(10) Patent No.: US 8,830,428 B2
(45) Date of Patent: Sep. 9, 2014

(54) LIQUID CRYSTAL DISPLAY ELEMENT AND LIQUID CRYSTAL DISPLAY DEVICE

(75) Inventors: Masashi Miyakawa, Tokyo (JP); Shunichi Suwa, Kanagawa (JP); Yuichi Inoue, Kanagawa (JP); Tadaaki Isozaki, Kanagawa (JP); Masahiko Nakamura, Kanagawa (JP)

(73) Assignee: Sony Corporation (JP)

( * ) Notice: Subject to any disclaimer, the term of this patent is extended or adjusted under 35 U.S.C. 154(b) by 602 days.

(21) Appl. No.: 12/958,943

(22) Filed: Dec. 2, 2010

(65) Prior Publication Data

US 2011/0134382 A1 Jun. 9, 2011

(30) Foreign Application Priority Data

Dec. 9, 2009 (JP) ................................ P2009-279627
Jun. 29, 2010 (JP) ................................ P2010-147630
Nov. 8, 2010 (JP) ................................ P2010-249627

(51) Int. Cl.
*G02F 1/141* (2006.01)
*G02F 1/00* (2006.01)
*G02F 1/1337* (2006.01)

(52) U.S. Cl.
CPC ..................................... *G02F 1/00* (2013.01); *G02F 1/133707* (2013.01)
USPC .......................................................... 349/136

(58) Field of Classification Search
CPC .......................................... G02F 2001/133757
USPC .................................................. 349/134, 136
See application file for complete search history.

(56) References Cited

U.S. PATENT DOCUMENTS

| 7,289,178 | B2 * | 10/2007 | Sasabayashi et al. | 349/127 |
| 8,164,725 | B2 * | 4/2012 | Nagae et al. | 349/128 |
| 2003/0067579 | A1 | 4/2003 | Inoue et al. | |
| 2008/0297707 | A1 | 12/2008 | Yang et al. | |

FOREIGN PATENT DOCUMENTS

| JP | 2003-177408 | 6/2003 |
| JP | 2009-092815 | 4/2009 |

OTHER PUBLICATIONS

Official Action (no English translation available) for Japanese Patent Application No. 2010-249627 mailed Apr. 2, 2014, 5 pages.
Official Action (no English translation available) for Chinese Patent Application No. 2010-10571381.0 dated May 30, 2014, 9 pages.

* cited by examiner

*Primary Examiner* — Eric Wong
(74) *Attorney, Agent, or Firm* — Sheridan Ross P.C.

(57) ABSTRACT

A liquid crystal display element for performing a display by a VA mode includes a first substrate including a first electrode, a liquid crystal layer including a liquid crystal molecule exhibiting a negative dielectric anisotropy, and a second substrate facing the first substrate with the liquid crystal layer in between, and including a second electrode facing the first electrode. Only the first electrode, or both of the first electrode and the second electrode are provided with a structure generating a distortion in an electric field, and the liquid crystal molecule located on the second substrate side has a pre-tilt angle larger than that of the liquid crystal molecule located on the first substrate side.

20 Claims, 21 Drawing Sheets

LIQUID CRYSTAL DISPLAY ELEMENT AND LIQUID CRYSTAL DISPLAY DEVICE

CROSS REFERENCES TO RELATED APPLICATIONS

The present application claims priority to Japanese Patent Application JP 2009-279627 filed on Dec. 9, 2009; Japanese Priority Patent Application JP 2010147630 filed on Jun. 29, 2010; and Japanese Priority Patent Application JP 2010-249627 filed on Nov. 8, 2010 the entire contents of which are hereby incorporated by reference.

BACKGROUND

The present disclosure relates to a liquid crystal display element performing a display by a VA mode, and a liquid crystal display device including the same.

In recent years, a liquid crystal display (LCD) has been widely employed as a display monitor of a liquid crystal television, a notebook personal computer, a car navigation system and the like. The liquid crystal display is classified into various display modes (methods) according to a molecular alignment between a panel and a substrate, and, for example, a TN (twisted nematic) mode in which a liquid crystal molecule is twisted and oriented in the state where a voltage is not applied thereto is well known. The TN mode has such properties that the liquid crystal molecule has a positive dielectric anisotropy, that is, a dielectric constant of the molecule is larger in a long axis direction compared with a short axis direction, and the TN mode has a structure in which a liquid crystal molecule is aligned in a vertical direction to a substrate surface, while sequentially rotating an orientation direction of the liquid crystal molecule within a plane parallel to the substrate surface.

Meanwhile, a VA (vertical alignment) mode in which the liquid crystal molecule is vertically oriented to the substrate surface in the state where the voltage is not applied thereto has increasingly attracted attention. The VA mode of the vertical alignment type has such properties that the liquid crystal molecule has a negative dielectric anisotropy, that is, the dielectric constant of the molecule is smaller in the long axis direction compared with the short axis direction, and it is possible to realize a wider viewing angle compared with the TN mode.

The liquid crystal display of the VA mode has such a structure that when the voltage is applied, the liquid crystal molecule vertically oriented to the substrate responds to the voltage by tilting (rising) in the parallel direction to the substrate due to the negative dielectric constant, and light is allowed to transmit. However, the tilt direction of the liquid crystal molecule vertically oriented to the substrate is arbitrary, and the orientation of the liquid crystal molecule is thus disordered by voltage application. This becomes a factor of deterioration in response characteristics to the voltage.

Thus, as a control means of the tilt direction of the liquid crystal molecule responding to the voltage, there has been disclosed a technique that a polymer having a predetermined structure on an opposing face side of the substrate is formed, and the liquid crystal molecule is oriented to tilt in a specific direction from the vertical direction to the substrate (providing a so-called pre-tilt angle) (for example, refer to Japanese Unexamined Patent Publication No. 2003-177408). With such a structure, it is possible to previously fix the tilt direction of the liquid crystal molecule when the voltage is applied, and it is possible to improve the response characteristics to the voltage.

SUMMARY

However, in the structure of Japanese Unexamined Patent Publication No. 2003-177408, since the liquid crystal molecule which is not driven (black display) is also oriented to slightly tilt to a substrate normal, although the response speed to the voltage is improved, the light slightly transmits in the black display state, and there is an issue of contrast reduction. Therefore, it is desirable to realize a liquid crystal display element capable of improving the contrast while favorably maintaining the response speed to the voltage.

In view of the foregoing, it is desirable to provide a liquid crystal display element capable of maintaining response characteristics and improving a contrast, and a liquid crystal display device.

According to an embodiment, there is provided a liquid crystal display element performing a display by a VA mode including: a first substrate including a first electrode; a liquid crystal layer including a liquid crystal molecule exhibiting a negative dielectric anisotropy; and a second substrate facing the first substrate with the liquid crystal layer in between, and including a second electrode facing the first electrode. Only the first electrode, or both of the first electrode and the second electrode are provided with a structure generating a distortion in an electric field, and the liquid crystal molecule located on the second substrate side has a pre-tilt angle larger than that of the liquid crystal molecule located on the first substrate side. A liquid crystal display device according to an embodiment uses an element of the same type as the above-described liquid crystal display element of the invention.

The expression "structure generating a distortion in an electric field" means that when a voltage is applied between both of the electrodes, a non-uniform potential distribution is generated in a parallel direction to a substrate surface, and a distorted electric field is generated at least in the vicinity of the electrode provided with the structure. The term "pre-tilt angle" means an angle in an axis direction, to be a reference angle of the liquid crystal molecule to a substrate normal, when an electric field is not applied to the liquid crystal layer.

In the liquid crystal display element, or the liquid crystal display device according to the embodiments, only the first electrode, or both of the first electrode and the second electrode are provided with the structure generating the distortion in the electric field. Thereby, when a drive voltage is applied between both of the electrodes, the non-uniform potential distribution is generated in the parallel direction to the substrate surface, and the distortion in the electric field is generated only on the first substrate side, or on both of the first substrate side and the second substrate sides. As a result, the electric field containing a component in an oblique direction to the substrate surface is applied to the liquid crystal layer. As this time, in the liquid crystal layer, at least the liquid crystal molecule located on the second substrate side is provided with the pre-tilt angle larger than 0°, and response speed of the liquid crystal molecule to the drive voltage is thus improved. Further, in the liquid crystal layer, the liquid crystal molecule located on the first substrate side is provided with the pre-tilt angle smaller than that of the liquid crystal molecule located on the second substrate side, and transmittance of light in a non-drive state (black display state) is thus reduced.

In the liquid crystal display element according to the embodiment, only the first electrode, or both of the first electrode and the second electrode may be provided with the plurality of slits. Alternatively, only the first electrode, or both of the first electrode and the second electrode may be provided with a conductive layer, and a plurality of projections provided on a surface on the liquid crystal layer side of the conductive layer, and constituted of a dielectric body.

According to the liquid crystal display element and the liquid crystal display device of the embodiments, only the first electrode, or both of the first electrode and the second electrode are provided with the structure generating the distortion in the electric field. Further, the liquid crystal molecule located on the second substrate side has the pre-tilt angle larger than that of the liquid crystal molecule located on the first substrate side. Thereby, for example, response characteristics are more ensured, and a contrast may be more improved compared with the case where the liquid crystal molecules located on both of the substrate-sides are provided with the pre-tilt angles of 0°, and the case where the liquid crystal molecules located on both of the substrate-sides are provided with the same pre-tilt angles larger than 0°.

Other and further objects, features and advantages of the invention will appear more fully from the following description.

Additional features and advantages are described herein, and will be apparent from the following Detailed Description and the figures.

DETAILED DESCRIPTION

Embodiments will be hereinafter described in detail with reference to the drawings. The description will be made in the following order:

1. First embodiment (Example of liquid crystal display element of VA mode and liquid crystal display device)
1-1. Structure of liquid crystal display element
1-2. Manufacturing method of liquid crystal display element
1-3. Structure of liquid crystal display device
1-4. Another structure or the like of liquid crystal display element
2. Second embodiment (Another example of liquid crystal display element and liquid crystal display device)
2-1. Structure or the like of liquid crystal display element
2-2. Another structure or the like of liquid crystal display element
3. Modifications 1. First Embodiment (Example of Liquid Crystal Display Element of VA Mode and Liquid Crystal Display Device)

1-1. Structure of Liquid Crystal Display Element

Figure 1:
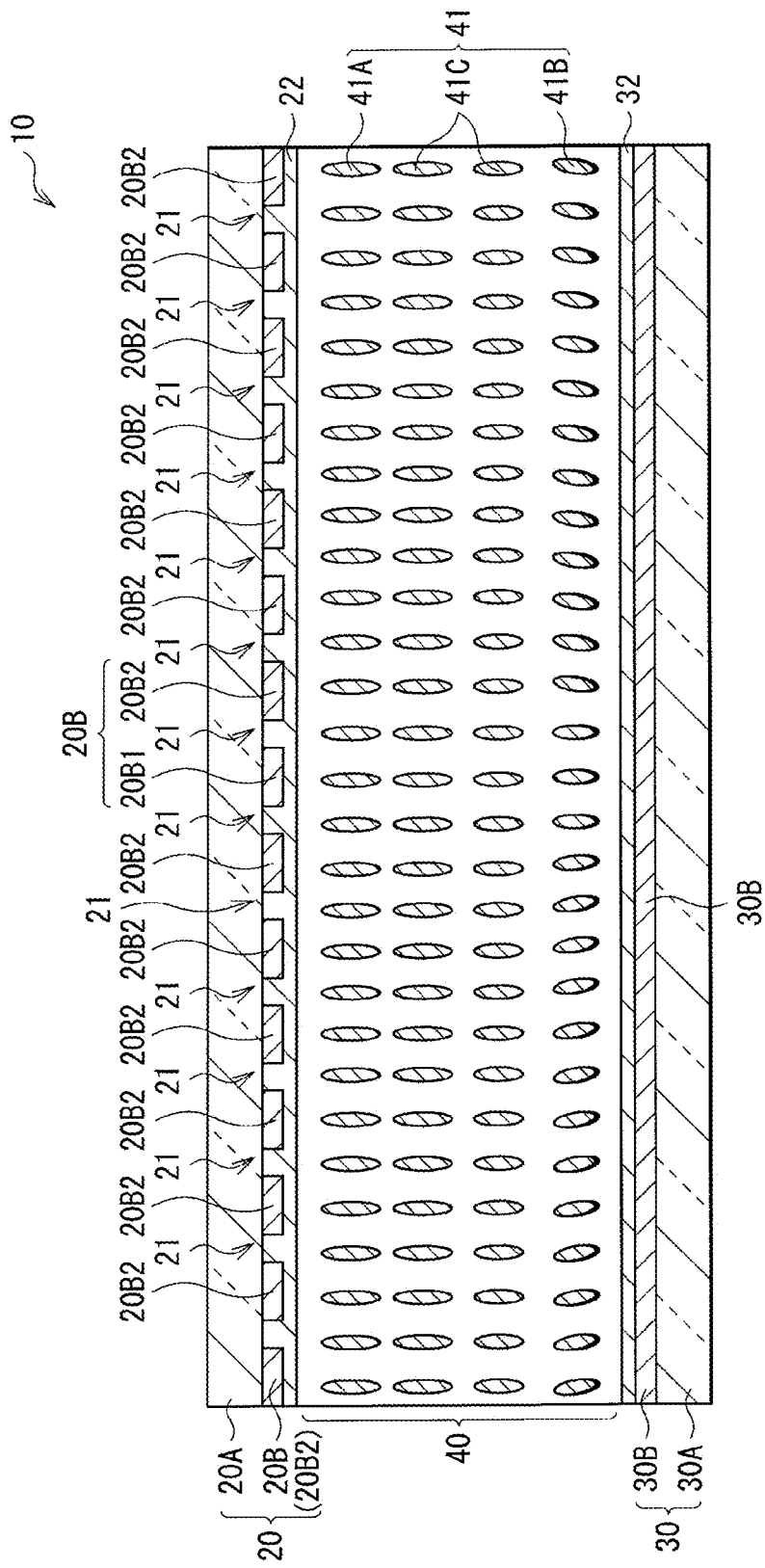
FIG. 1 is a cross-sectional schematic view of a liquid crystal display element according to a first embodiment.
Figure 2:
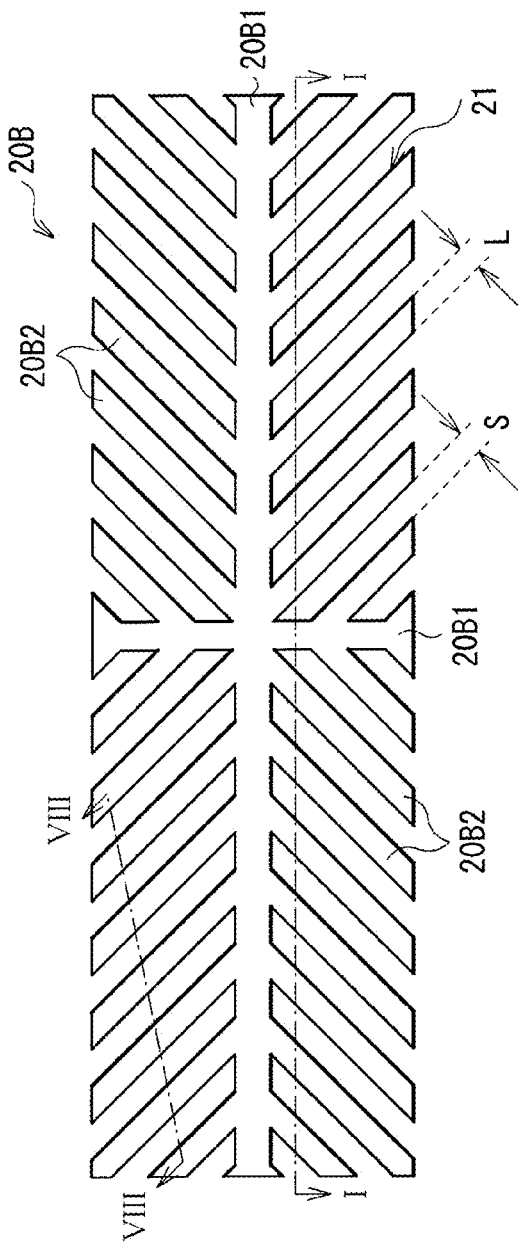
FIG. 2 is a schematic view illustrating a plan structure of a pixel electrode illustrated in FIG. 1.

FIG. 1 schematically illustrates a cross-section of a liquid crystal display element according to a first embodiment. FIG. 2 schematically illustrates a plan structure of a pixel electrode in FIG. 1. FIG. 1 corresponds to the cross section along line I-I in FIG. 2. The display mode of the liquid crystal display element is a vertical alignment (VA) mode. The liquid crystal display element includes a plurality of pixels 10, and is provided with a liquid crystal layer 40 including a liquid crystal molecule 41 between a TFT (thin film transistor) substrate 20 and a CF (color filter) substrate 30 with orientation films 22 and 32 in between. This liquid crystal display element is a so-called transmissive type, and FIG. 1 illustrates the liquid crystal display element in a non-drive state in which a drive voltage is not applied.

In the TFT substrate 20, for example, a plurality of pixel electrodes 20B in matrix are arranged on a surface side where a glass substrate 20A faces the CF substrate 30 in each pixel 10. In the TFT substrate 20, TFT switching elements for driving the plurality of pixel electrodes 20B, respectively, and gate lines, source lines, and the like (not illustrated in the figure) connected to the TFT switching elements are provided.

The pixel electrode 20B is constituted of a material having transparency, such as ITO (indium tin oxide). As illustrated in FIG. 2, in each pixel, the pixel electrode 20B in a predetermined pattern is provided with a plurality of slits 21 (portion where the electrode is not formed) serving as a structure generating distortion in an electric field applied to the liquid crystal layer 40. With the plurality of slits 21, the pixel electrode 20B is constituted of a base 20B1, and a plurality of linear portions 20B2 in which each one end is connected to the base 20B1, and extending toward an in-plane direction of the TFT substrate 20, and has a so-called fish bone shaped structure. By providing the plurality of slits 21 in this manner, the electric field is generated only from the base 20B1 and the linear portion 20B2 when the drive voltage is applied, and a non-uniform potential distribution is thus generated in a parallel direction to a plane of the glass substrate 20A as will be described later, thereby generating the distortion in the electric field. Thus, since the oblique electric field to the long axis direction of the liquid crystal molecule 41 is applied, and regions with different orientation directions are formed (orientation division) in the pixel 10, thereby improving viewing angle characteristics. In other words, the distortion of the electric field generated by the pixel electrode 20B regulates the orientation of the liquid crystal molecule 41 when the drive voltage is applied. In the pixel electrode 20B of FIG. 2, the orientation direction of the liquid crystal molecule 41 when the drive voltage is applied is different in four regions divided by the base 20B1.

For example, a formation pattern of the slit 21 is arbitrary including a stripe shape, a V-shape, and the like, and a width S of the slit 21 provided in the pixel electrode 20B, the number of the slits 21, a width L of the linear portion 20B2, and the like are arbitrarily settable. Among them, the width S of the slit 21 is preferably 1 µm to 20 µm both inclusive, and the width L of the linear portion 20B2 is preferably 1 µm to 20 µm both inclusive. Thereby, when the drive voltage is applied, the oblique electric field to favorably orient the whole liquid crystal molecules 41 is easily applied. Further, processing the pixel electrode 20B is easy, and it is thus possible to ensure a sufficient yield rate. Specifically, when the width S and the width L are smaller than 1 µm, it is difficult to form the pixel electrode 20B, and it is difficult to ensure the sufficient yield rate. Meanwhile, when the width S and the width L are larger than 20 µm, the favorable oblique electric field is hard to be generated between the pixel electrode 20B and a facing electrode 30B when the drive voltage is applied, and the orientation of the whole liquid crystal molecules 41 tends to be slightly disordered. In particular, the width S is preferably 2 µm to 10 µm both inclusive, and the width L is preferably 2 µm to 10 µm both inclusive. The width S and the width L are more preferably 4 µm. Thereby, the sufficient yield rate is ensured, and the orientation of the whole liquid crystal molecules 41 becomes favorable when the drive voltage is applied.

In the CF substrate 30, for example, on the surface side where the glass substrate 30A faces the TFT substrate 20, a color filter (not illustrated in the figure) in which filters of red (R), green (G), and blue (B) are provided in a stripe shape, and the facing electrode 30B formed over the almost-whole surface of an effective display region are arranged. In other words, the facing electrode 30B is provided in a whole region of the CF substrate 30 facing the pixel electrode 20B (including the formation region of the slit 21). Thus, when the drive voltage is applied, the potential is generated with an almost-uniform distribution in the vicinity of the facing electrode 30B of the liquid crystal layer 40, and the distortion in the electric field hardly occurs. Like the pixel electrode 20B, the facing electrode 30B is constituted of a material having the transparency, such as ITO.

The orientation film 22 is provided on the surface on the liquid crystal layer 40 side of the TFT substrate 20 to cover the pixel electrode 20B and the slit 21. The orientation film 32 is provided on the surface on the liquid crystal layer 40 side of the CF substrate 30 to cover the facing electrode 30B. The orientation films 22 and 32 regulate the orientation of the liquid crystal molecule 41, and the liquid crystal molecule 41 is thereby oriented in such a manner that the long axis direction (director) of the liquid crystal molecule 41 is approximately vertical to the glass substrates 20A and 30A as a whole.

The orientation film 22 allows the liquid crystal molecule 41 (41A) in the vicinity of the orientation film 22 to be oriented in the vertical direction to the substrate surface. In other words, the orientation film 22 is a vertical orientation film, and is constituted of a vertical orientation agent. Examples of the vertical orientation agent include a polymer compound such as polyimide and polysiloxane. These polymer compounds include, for example, a structure (hereinafter, referred to as a vertical orientation inductive structure section) to allow the liquid crystal molecule 41 to be oriented in the vertical direction to the substrate surface, as will be described later. Here, the term "vertical direction" does not exclude a slightly-inclined direction to the substrate, and includes a substantially-vertical direction, and an almost-vertical direction in addition to the direction at 90° to the substrate surface.

Like the orientation film 22, the orientation film 32 also regulates the orientation of the liquid crystal molecule 41. Here, the orientation film 32 has a function to provide a pre-tilt angle larger than 0° to the liquid crystal molecule 41 (41B) in the vicinity of the orientation film 32. The orientation film 32 contains one or more kinds of polymer compounds containing a crosslinkable functional group, a polymerizable functional group, or a photosensitive functional group (hereinafter, referred to as a crosslinkable functional group or the like), and reacted (crosslinked, polymerized, or photosensitized) through those functional groups (hereinafter, referred to as a compound after an orientation treatment). Here, the term "crosslinkable functional group" means a group capable of forming a crosslinkable structure (bridged structure), and more specifically means a group capable of being duplex. The term "polymerizable functional group" means a group in which two or more functional groups are capable of sequentially polymerizing. The term "photosensitive functional group" means a group capable of absorbing an energy ray, and examples of the energy ray include an ultraviolet ray, an X-ray, and an electron ray. After the orientation film 32 containing one or more kinds of polymer compounds having a main chain and a side chain is formed, the liquid crystal layer 40 is provided, and then a crosslinkable functional group or the like contained in the side chain is reacted (crosslinked) while applying the electric field or a magnetic field, thereby forming the compound after the orientation treatment. The compound after the orientation treatment generated in this manner is contained in the orientation film 32, and the liquid crystal molecule 41 (41B) in the vicinity of the orientation film 32 is thus provided with the pre-tilt angle larger than 0°, thereby improving the response speed and the display characteristics.

As the polymer compound containing a main chain or a side chain before being reacted (crosslinked, polymerized, or photosensitized), that is, as the polymer compound (hereinafter, referred to as a compound before an orientation treatment) containing the crosslinkable functional group, the polymerizable functional group, or the photosensitive functional group, the polymer compound having a structure with high heat resistance as the main chain is preferable. Thereby, in the liquid crystal display element, since the compound after the orientation treatment in the orientation film 32 maintains an orientation regulation function to the liquid crystal molecule 41 even under a high-temperature environment, the display characteristics such as a contrast and the response characteristics are favorably maintained, and the reliability is ensured. Thus, the main chain preferably contains an imide bond in a repeating unit. Examples of the compound before the orientation treatment containing the imide bond in the main chain include the polymer compound having the polyimide structure represented by the formula 1. The polymer compound having the polyimide structure represented by the formula 1 may be constituted of one kind of the polyimide structures represented by the formula 1, may contain a plurality of kinds of polyimide structures randomly coupled, or other structures in addition to the structure represented by the formula 1.

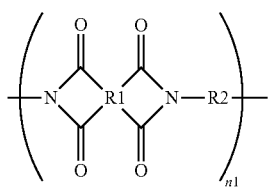

(1)

R1 is a tetravalent organic group, and R2 is a bivalent organic group. n1 is an integer of 1 or more.

R1 and R2 in the formula 1 is arbitrary as long as they each are a tetravalent organic group, or a bivalent organic group containing carbon, but one of R1 and R2 preferably contains a crosslinkable functional group or a polymerizable functional group as the side chain. Thereby, it is easy to obtain a sufficient orientation regulation function in the compound after the orientation treatment.

In the compound before the orientation treatment, the side chain is arbitrary as long as the plurality of side chains are bonded to the main chain, and one or more side chains contain the crosslinkable functional group or the polymerizable functional group. In other words, the compound before the orientation treatment may contain the side chain which does not exhibit crosslinkability in addition to the crosslinkable side chain. The side chain containing the crosslinkable functional group or the like may be one or more kinds. The crosslinkable functional group or polymerizable functional group is arbitrary as long as it is a functional group capable of being crosslinked or polymerized after forming the liquid crystal layer 40. The crosslinkable functional group or the polymerizable functional group may be a group forming the crosslinkable structure or the like by photoreaction, and may be a group forming the crosslinkable structure or the like by thermal reaction. Among them, a photosensitive crosslinkable functional group forming the crosslinkable structure by the photoreaction or the like is preferable. Thereby, the orientation of the liquid crystal molecule 41 is easily regulated in the predetermined direction, and the liquid crystal display element having the favorable display characteristics may be easily manufactured.

The photoreactive crosslinkable functional group is a photosensitive group having photosensitivity, for example, a light duplex photosensitive group. Examples of the light duplex photosensitive group include a group having the structure of one kind of chalcone, cinnamate, cinnamoyl, coumarin, maleimide, benzophenone, norbornene, or orizanol. Among them, examples of the group having the structure of chalcone, cinnamate, or cinnamoyl include the group represented by the formula 2. When the compound before the orientation treatment having the side chain containing the group represented by the formula 2 is crosslinked, for example, the structure represented by the formula 3 is formed. In other words, the compound after the orientation treatment generated from the polymer compound containing the group represented by the formula 2 has the structure having a cyclobutane skeleton and represented by the formula 3. For example, the photosensitive crosslinkable functional group such as maleimide exhibits not only duplexing reaction, but also polymerizing reaction in some cases. Thus, the compound after the orientation treatment is described as the compound in which the polymer compound containing the crosslinkable functional group or the polymerizable functional group is crosslinked.

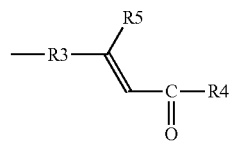

(2)

R3 is a bivalent group containing an aromatic ring, R4 is a monovalent group having a ring structure, R5 is a hydrogen group, or an alkyl group or its derivative.

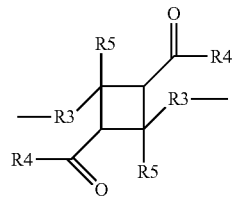

(3)

R3 is a bivalent group having an aromatic ring, R4 is a monovalent group having a ring structure, R5 is a hydrogen group, or an alkyl group or its derivative.

R3 in the formula 2 is arbitrary as long as it is a bivalent group having the aromatic ring such as a benzene ring, and may contain a carbonyl group, an ether bond, an ester bond, or a hydrocarbon group, in addition to the aromatic ring. R4 in the formula 2 may be arbitrary as long as it is a monovalent group having a ring structure, and may contain a carbonyl group, an ether bond, an ester bond, a hydrocarbon group, a halogen group or the like, in addition to an aromatic ring. A ring structure of R4 is arbitrary as long as it is a ring containing carbon as an element constituting a skeleton, and examples of a ring structure include an aromatic ring, a heterocyclic ring, or an aliphatic ring, or a ring structure formed by a bond of these or a fusion of these. R5 in the formula 2 is arbitrary as long as it is a hydrogen group, or an alkyl group or its derivative. Here, the term "derivative" means a group in which a part of a hydrogen group or a whole hydrogen group contained in an alkyl group is substituted by a substituent such as a halogen group. In an alkyl group introduced as R5, its carbon number is arbitrary. As R5, a hydrogen group or a methyl group is preferable. Thereby, the favorable reactive crosslinkability may be obtained.

R3 in the formula 3 may be the same, and may be different from each other. It is also true for R4 and R5 in the formula 3.

Examples of R3, R4, and R5 in the formula 3 include R3, R4, and R5 in the formula 2.

Examples of the group in the formula 2 include a group represented by the formula 2-1 to the formula 2-31. In addition, it is not limited to the group represented by the formula 2-1 to the formula 2-31, as long as it is a group having the structure represented by the formula 2.

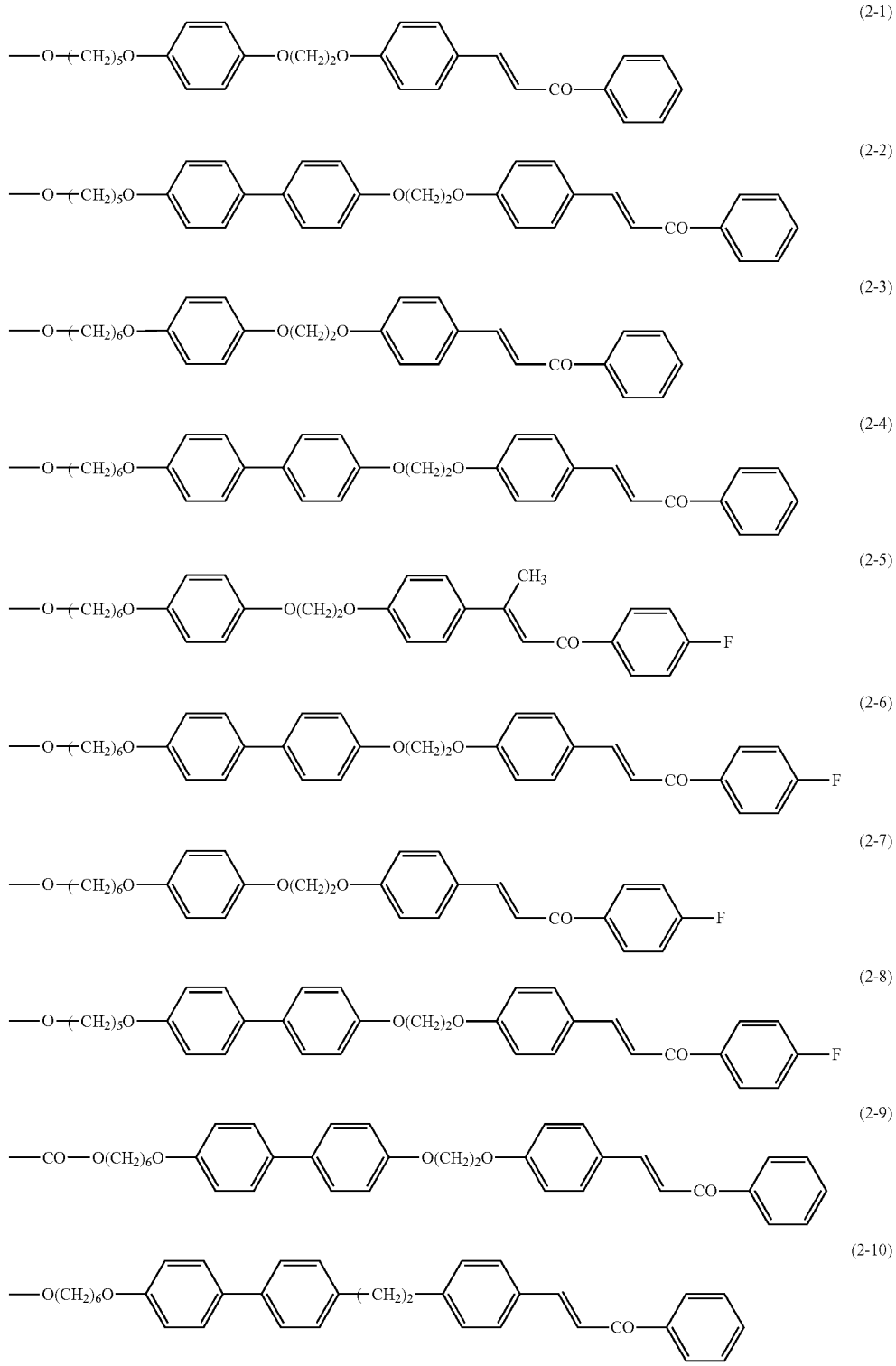

-continued
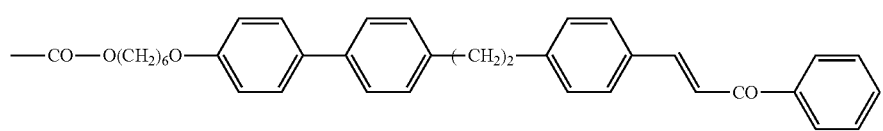
(2-11)
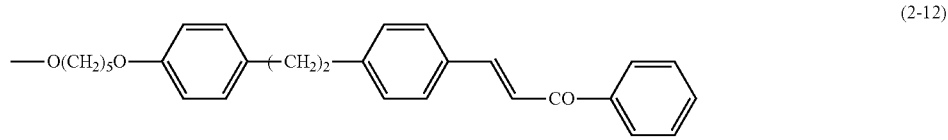
(2-12)
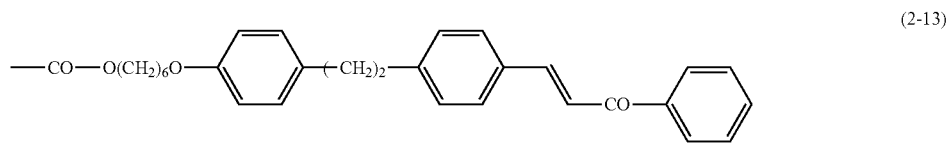
(2-13)
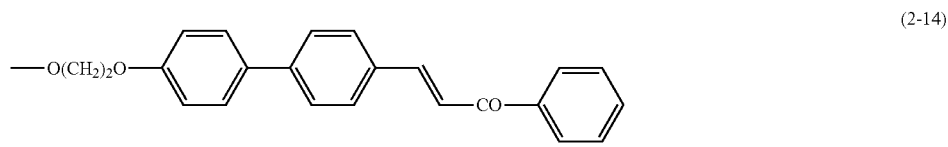
(2-14)
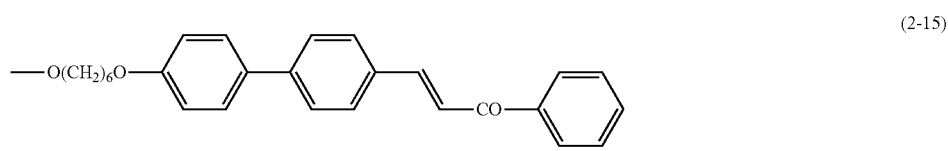
(2-15)
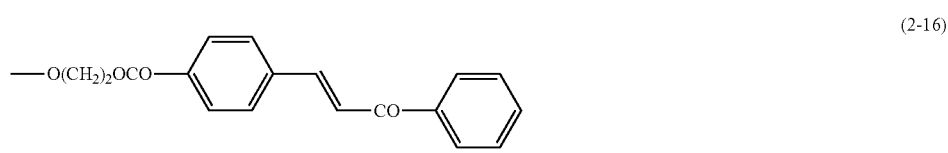
(2-16)
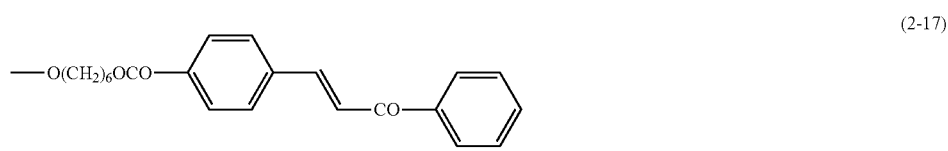
(2-17)
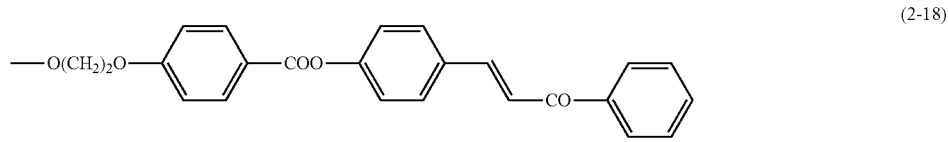
(2-18)
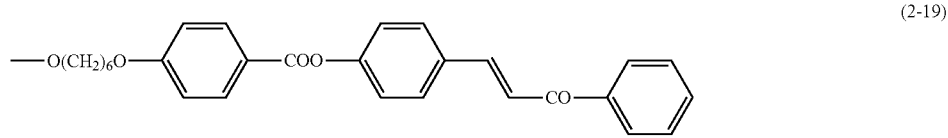
(2-19)
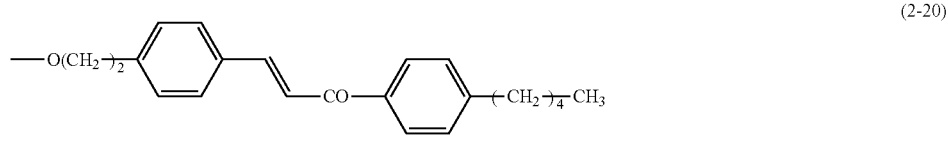
(2-20)

-continued
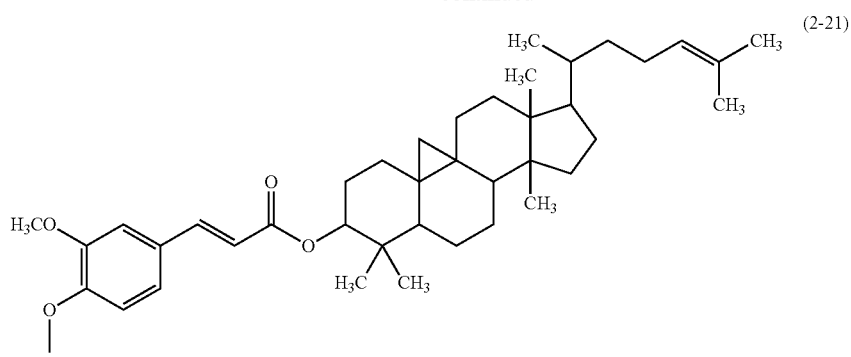
(2-21)
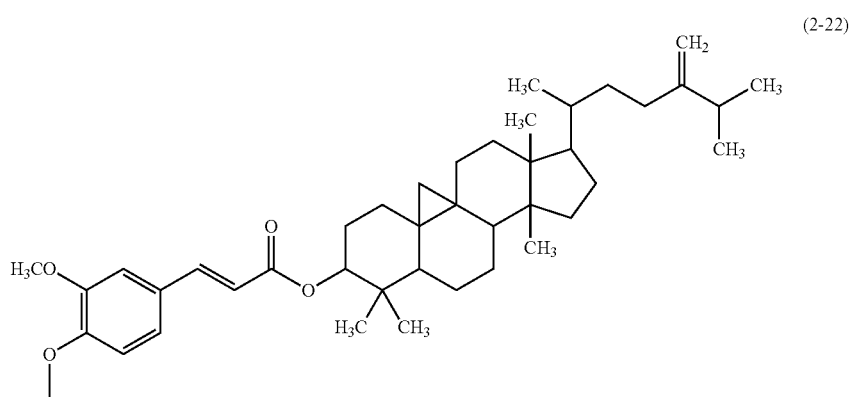
(2-22)
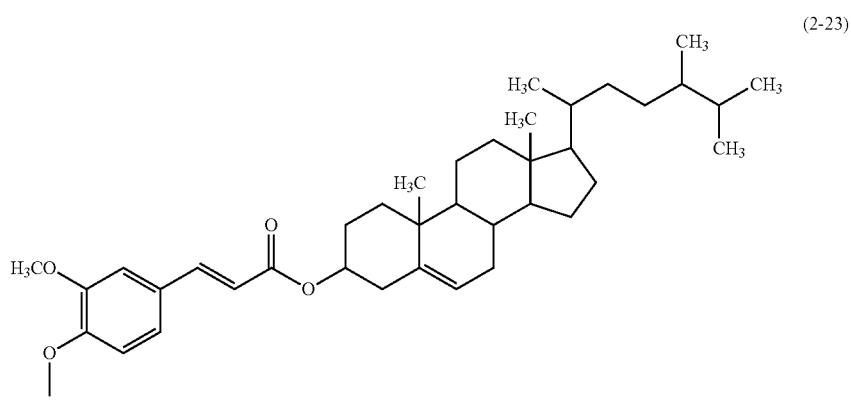
(2-23)
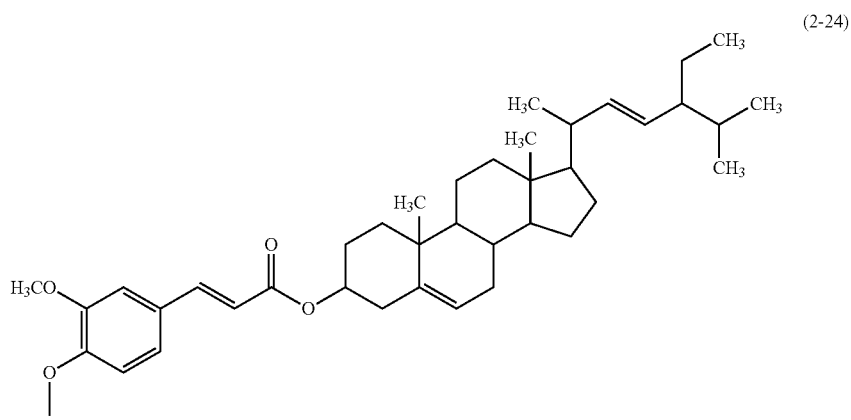
(2-24)

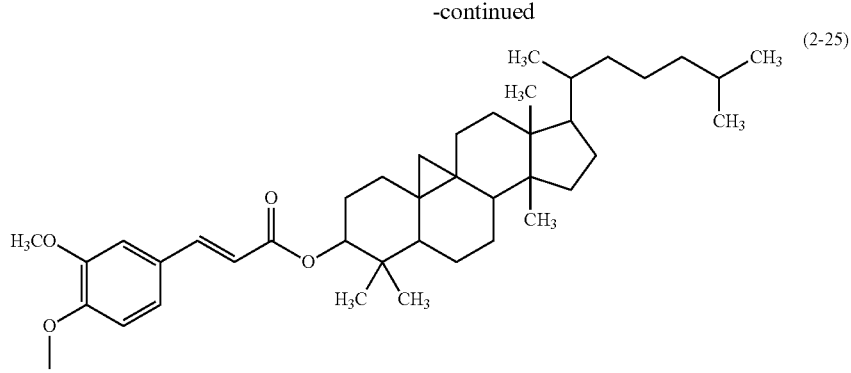
(2-25)
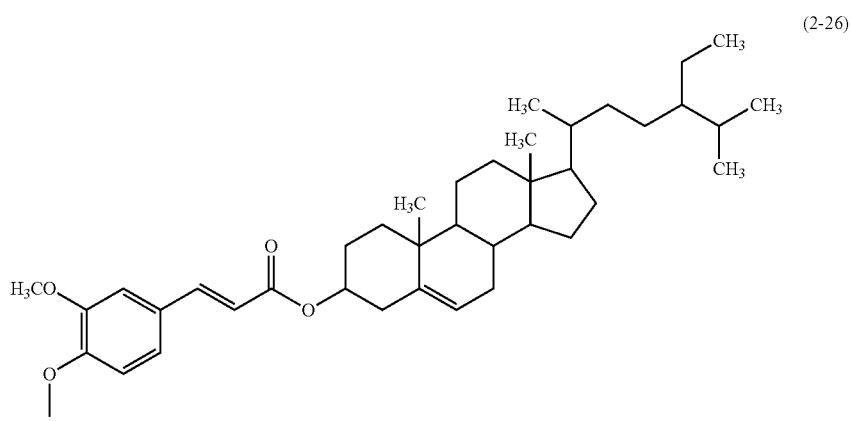
(2-26)
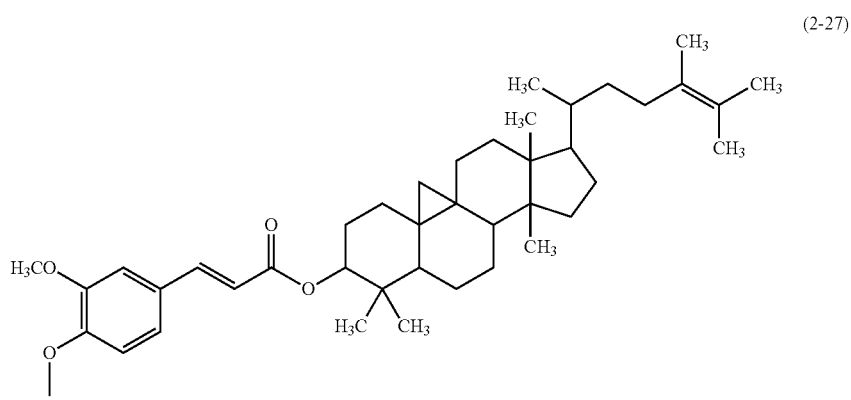
(2-27)
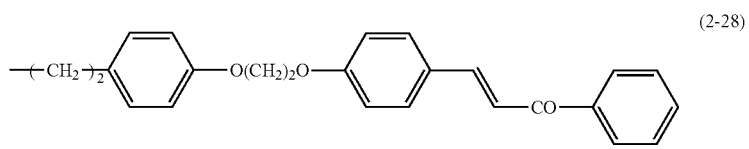
(2-28)
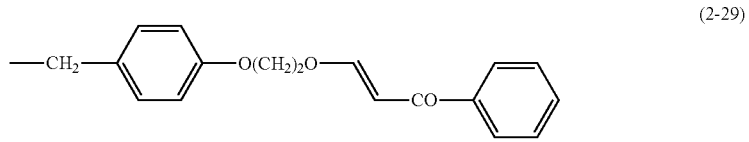
(2-29)
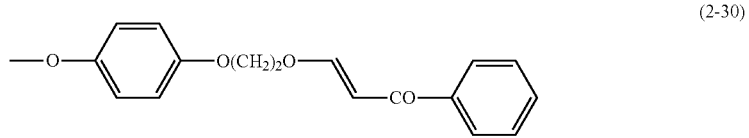
(2-30)

-continued

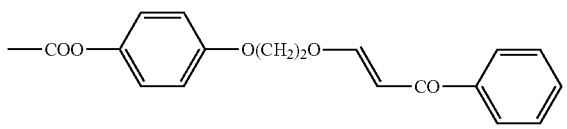

(2-31)

The compound before the orientation treatment preferably has the vertical orientation inductive structure section. Thereby, the orientation of the whole liquid crystal molecules 41 may be regulated even if the orientation film 32 does not contain the compound (a typically-called vertical orientation agent) having the vertical orientation inductive structure section separately from the compound after the orientation treatment. Further, in comparison with the case where the orientation film 32 contains the compound having the vertical orientation inductive structure section separately from the compound after the orientation treatment, the orientation film 32 which may more uniformly exhibit the orientation regulation function to the liquid crystal layer 40 is easily formed. In the compound before the orientation treatment, the vertical orientation inductive structure section may be included in the main chain, the side chain, or both of the main chain and the side chain. In the case where the compound before orientation treatment has the polyimide structure in the formula 1, the vertical orientation inductive structure section includes two kinds of structures of the structure (repeating unit) having the vertical orientation inductive structure section as R2, and the structure (repeating unit) containing the crosslinkable functional group as R2, because they are easily available. In addition, when the vertical orientation inductive structure section is included in the compound before the orientation treatment, the vertical orientation inductive structure is also included in the compound after the orientation treatment.

Examples of the vertical orientation inductive structure section include the organic group containing an alkyl group having 10 or more carbon atoms, an alkyl halide group having 10 or more carbon atoms, an alkoxy group having 10 or more carbon atoms, an alkoxy halide group having 10 or more carbon atoms, or a ring structure. Specifically, examples of the structure including the vertical orientation inductive structure section include the structure represented by the formula 4-1 to the formula 4-6.

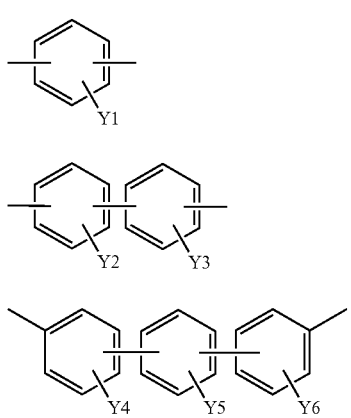

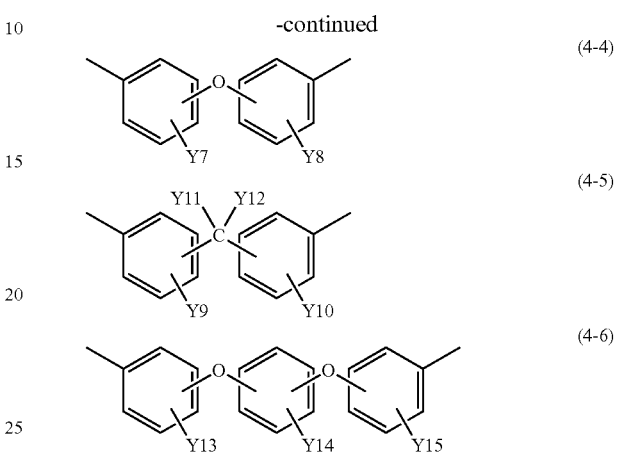

Y1 is a monovalent organic group containing an alkyl group having 10 or more carbon atoms, an alkoxy group having 10 or more carbon atoms, or a ring structure. Y2 to Y15 each are a monovalent organic group containing a hydrogen group, an alkyl group having 10 or more carbon atoms, an alkoxy group having 10 or more carbon atoms, or a ring structure, and one or both of Y2 and Y3, one or more of Y4 to Y6, one or both of Y7 and Y8, one or more of Y9 to Y12, and one or more of Y13 to Y15 each are a monovalent organic group containing an alkyl group having 10 or more carbon atoms, an alkoxy group having 10 or more carbon atoms, or a ring structure. However, Y11 and Y12 may bond to each other to form a ring structure.

Examples of a monovalent organic group having a ring structure as the vertical orientation inductive structure section include the group represented by the formula 5-1 to the formula 5-23. Examples of a bivalent organic group having a ring structure as the vertical orientation inductive structure section include the group represented by the formula 6-1 to the formula 6-7.

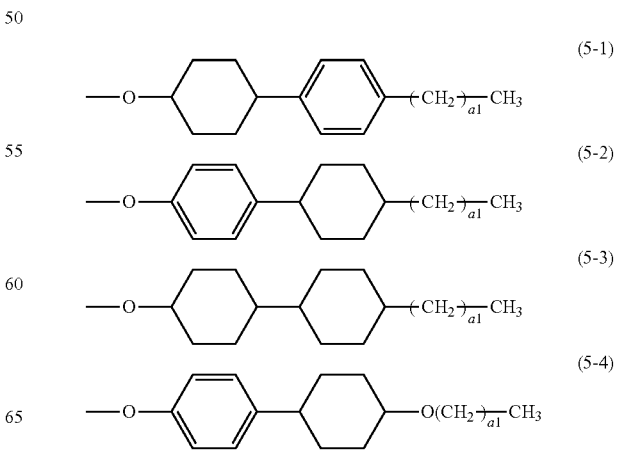

-continued
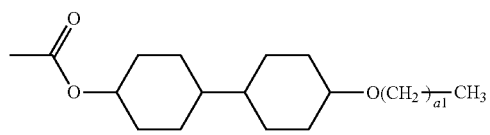 (5-5)
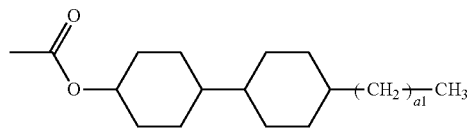 (5-6)
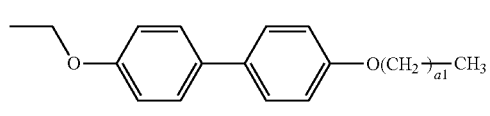 (5-7)
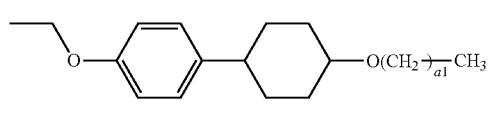 (5-8)
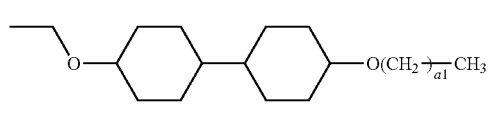 (5-9)
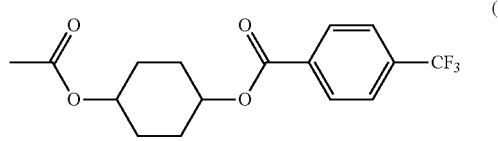 (5-11)
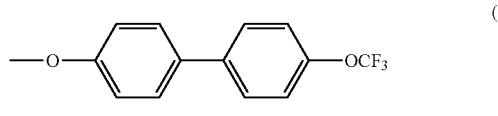 (5-12)
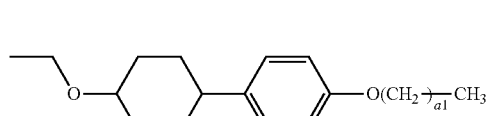 (5-10)
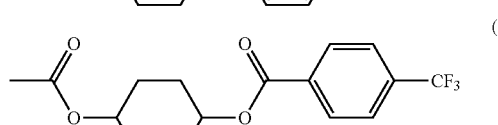 (5-11)
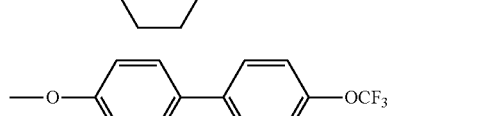 (5-12)
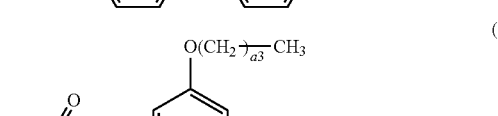 (5-13)
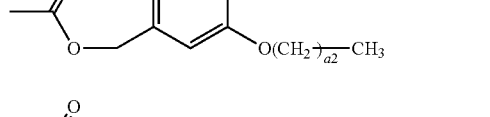 (5-14)
-continued
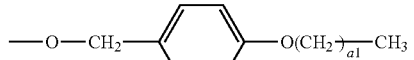 (5-15)
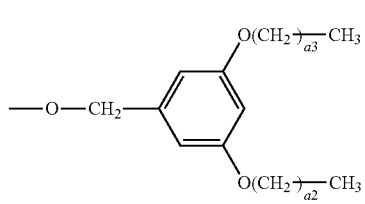 (5-16)
a1 to a3 each are an integer of 0 to 21 both inclusive.
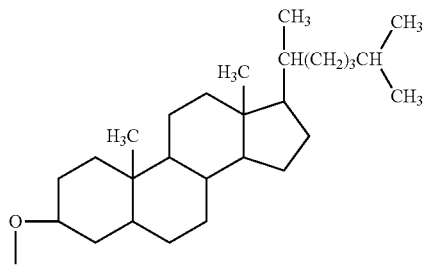 (5-17)
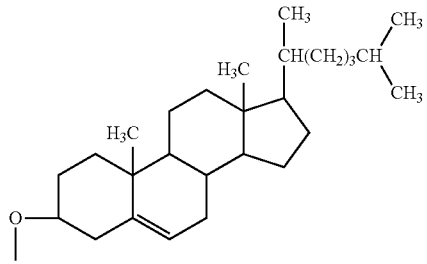 (5-18)
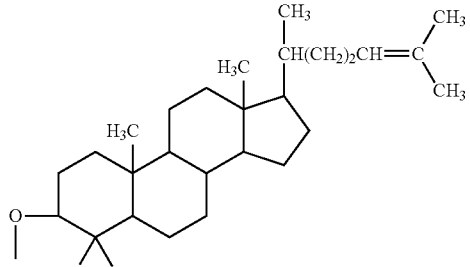 (5-19)
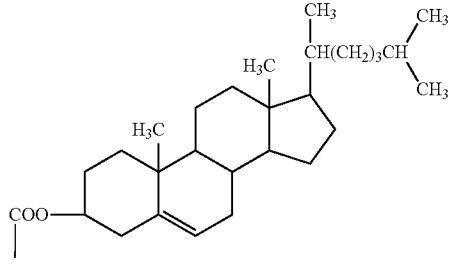 (5-20)

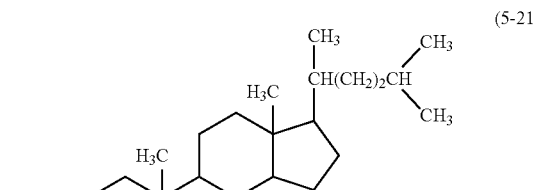
(5-21)
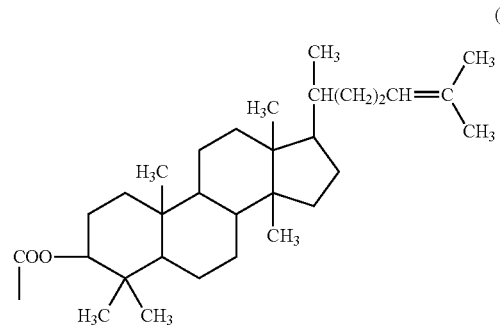
(5-22)
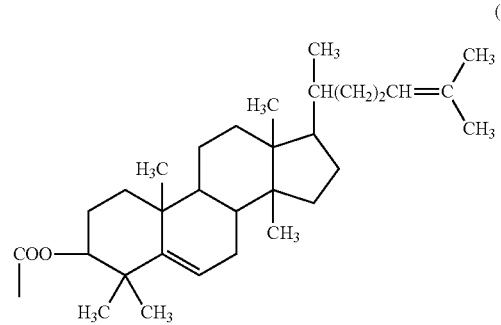
(5-23)
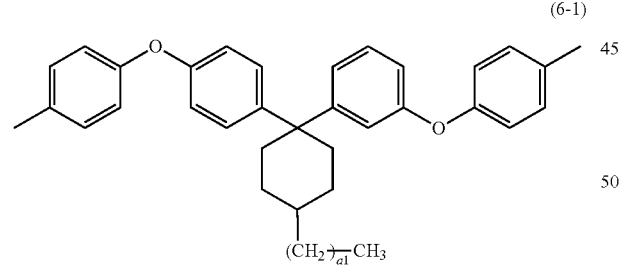
(6-1)
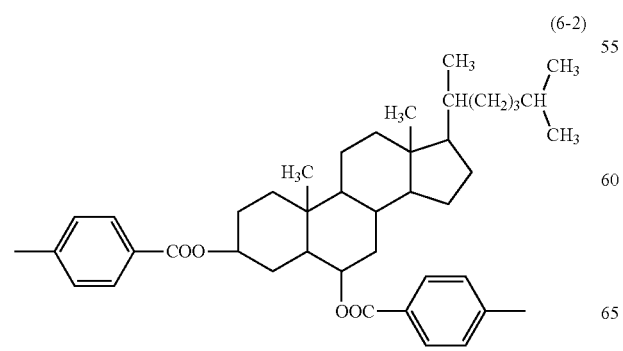
(6-2)
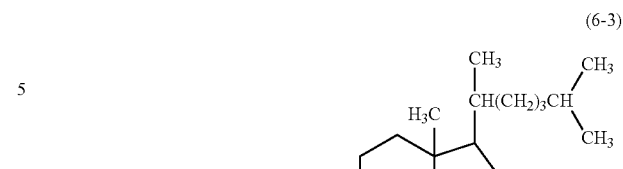
(6-3)
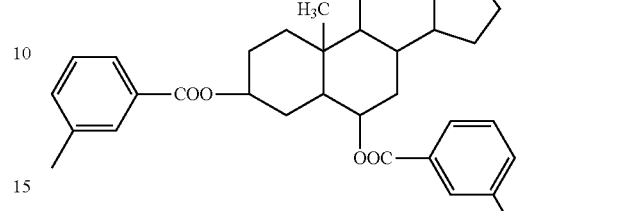
(6-4)
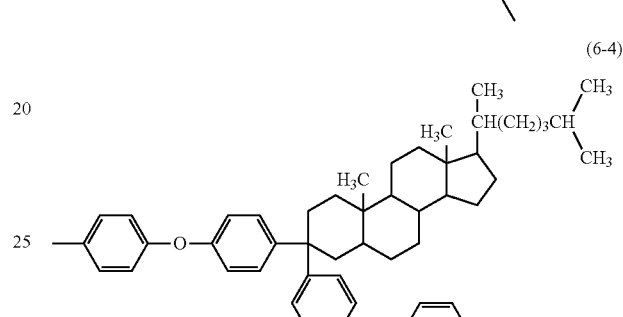
(6-5)
a1 is an integer of 0 to 21 both inclusive.
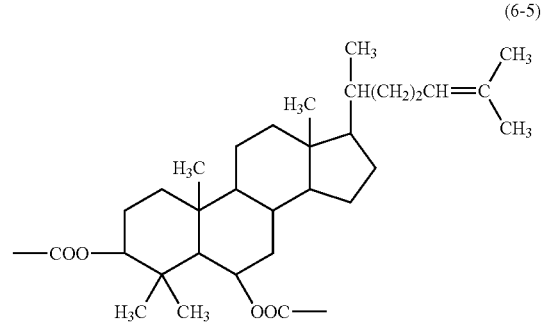
(6-6)

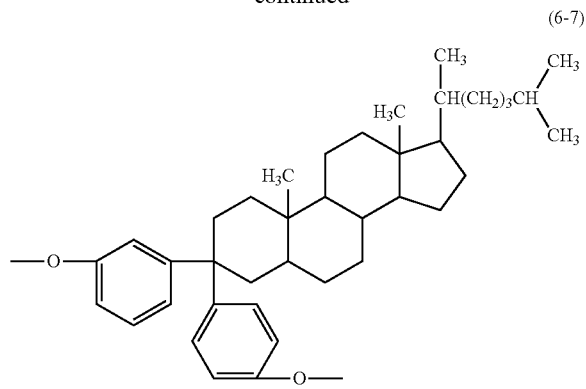

(6-7)

In addition, the vertical orientation inductive structure section is not limited to the above-described group as long as it has the structure which functions to align the liquid crystal molecule 41 in the vertical direction to the substrate surface.

The compound before the orientation treatment preferably contains the group represented by the formula 7, in addition to the crosslinkable functional group or the polymerizable functional group. Thereby, the group represented by the formula 7 may move along the liquid crystal molecule 41, and the group represented by the formula 7 is thus fixed together with the crosslinkable functional group or the like along the orientation direction of the liquid crystal molecule 41, when the compound before the orientation treatment is crosslinked. By the fixed group represented by the formula 7, the orientation of the liquid crystal molecule 41 is more easily regulated in the predetermined direction, and the liquid crystal display element having the favorable display characteristics may be more easily manufactured.

$$—R11-R12-R13 \tag{7}$$

R11 is a linear or branched bivalent organic group having 1 or more carbon atoms and containing a ether group or a ester group, and is bonded to the main chain of the compound before the orientation treatment or the compound after the orientation treatment. Alternatively, R11 is a linkage group of one or more kinds of ether, ester, etherester, acetal, ketal, hemiacetal, and hemiketal, and is bonded to the main chain in the compound before the orientation treatment or the compound after the orientation treatment. R12 is a bivalent organic group having the plurality of ring structures, and one of the atoms constituting that ring structure is bonded to R11. R13 is a monovalent group having a hydrogen group, halogen group, an alkyl group, an alkoxy group, or a carbonate group, or their derivative.

R11 in the formula 7 is a portion functioning as a spacer portion to allow R12 and R13 to be fixed to the main chain, and allow R12 and R13 to freely move along the liquid crystal molecule 41, and examples of R11 include an alkylene group. An alkylene group may have an ether bond between carbon atoms, and the number of the places having an ether bond may be one or more. R11 may have a carbonyl group or a carbonate group. The number of carbon atoms of R11 is more preferably 6 or more. Thereby, the group represented by the formula 7 and the liquid crystal molecule 41 are interacted with each other, and the group represented by the formula 7 is likely to be along the liquid crystal molecule 41. The number of carbon atoms is preferably determined so that a length of R11 is approximately the same as the length of a terminal chain of the liquid crystal molecule 41. R12 in the formula 7 is a portion along a ring structure (core portion) in a typical nematic liquid crystal molecule. Examples of R12 include a group or a skeleton like a ring structure included in the liquid crystal molecule, such as 1,4-phenylene group, 1,4-cyclohexylene group, pyrimidine-2,5-diyl group, 1,6-naphthalene group, a bivalent group having a steroid skeleton, or their derivative. Here the term "derivative" means the group in which one or more substituents are introduced to the above-described series of groups. R13 in the formula 7 is a portion along the terminal chain of the liquid crystal molecule, and examples of R13 include an alkylene group or an alkylene halide group. However, in an alkylene halide group, at least a hydrogen group in an alkylene group may be substituted to a halogen group, and the type of the halogen group is arbitrary. An alkylene group or an alkylene halide group may have an ether bond between the carbon atoms, and the number of places having an ether bond may be one or more. Further, R13 may have the carbonyl group or a carbonate group. The number of carbon atoms of R13 is preferably 6 or more due to the same reason as R11.

Specifically, examples of the group represented by the formula 7 include a monovalent group represented by the formula 7-1 to the formula 7-12.

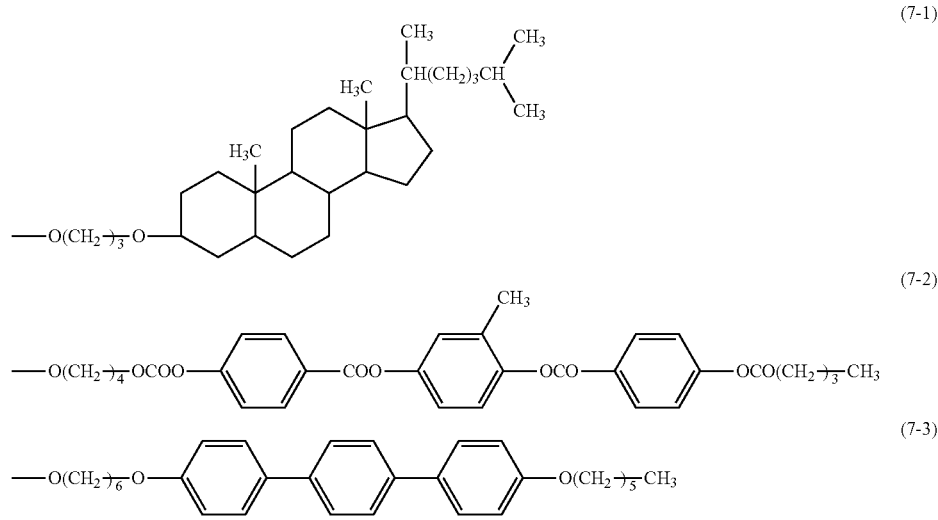

-continued

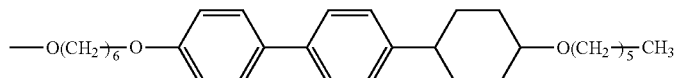 (7-4)

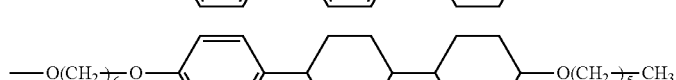 (7-5)

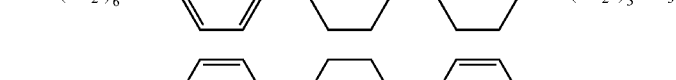 (7-6)

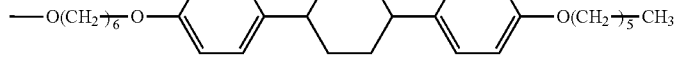 (7-7)

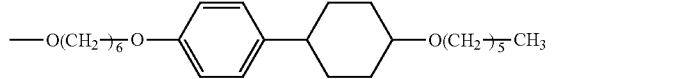 (7-8)

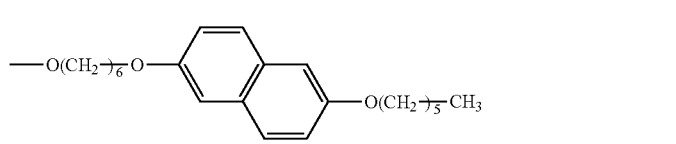 (7-9)

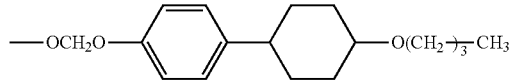 (7-10)

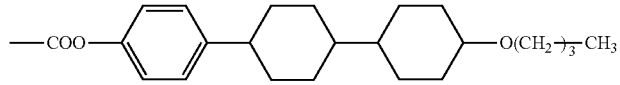 (7-11)

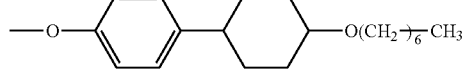 (7-12)

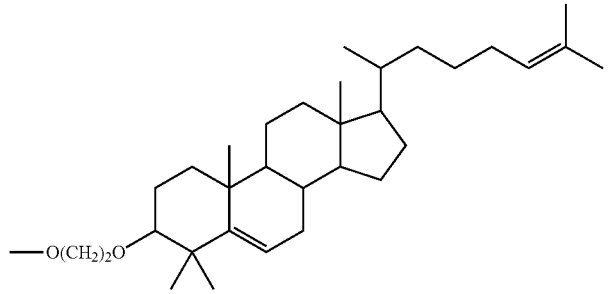

In addition, the group represented by the formula 7 is not limited to the above-described group, as long as it may move along the liquid crystal molecule 41.

The above-described crosslinkable functional group may be the group represented by the formula 8. Thereby, the above-described crosslinkable functional group has the portion along the liquid crystal molecule 41 and the portion which may freely move, in addition to the crosslinked portion, and the portion along the liquid crystal molecule 14 of the crosslinkable functional group may be thus fixed along the liquid crystal molecule 41. Thereby, the orientation of the liquid crystal molecule 41 is more easily regulated in the predetermined direction, and the liquid crystal display element having the favorable display characteristics may be more easily manufactured.

$$—R21-R22-R23-R24 \qquad (8)$$

R21 is the linear or branched bivalent organic group having 1 to 20 carbon atoms both inclusive, preferably having 3 to 12 carbon atoms both inclusive, and containing an ether group or an ester group, and is bonded to the main chain of the compound before the orientation treatment or the compound after the orientation treatment. Alternatively, R21 is a linkage group of one or more kinds of ether, ester, etherester, acetal, ketal, hemiacetal, and hemiketal, and is bonded to the main chain of the compound before the orientation treatment or the compound after the orientation treatment. R22 is a bivalent group having the structure of one kind of chalcone, cinnamate, cinnamoyl, coumarin, maleimide, benzophenone, norbornene, orizanol, chitosan, acryloyl, methacryloyl, vinyl, expoxy, and oxetane, or an ethenylene group. R23 is a bivalent organic group having the plurality of ring structures. R24 is a monovalent group having a hydrogen group, a halogen group, an alkyl group, an alkoxy group, or a carbonate group, or their derivative.

R21 in the formula 8 is the structure section which may freely move, and examples of R21 include the group with which R11 in the formula 7 is expressed. In the group in the formula 8, R22 to R24 may be easily moved by using R21 as an axis, and R23 and R24 are easily along the liquid crystal molecule 41. The number of carbon atoms of R21 is more preferably 6 to 10 both inclusive. The number of carbon atoms is preferably determined so that the length of R21 is approximately the same as the length of the terminal chain of the liquid crystal molecule 41. R22 in the formula 8 is the structure section having the crosslinkable functional group. As described above, the crosslinkable functional group may be the group forming the crosslinkable structure by the photoreaction, or the group forming the crosslinkable structure by the thermal reaction. R23 in the formula 8 is the structure section which may be along the core portion of the liquid crystal molecule 41, and examples of R23 include the group with which R12 in the formula 7 is expressed. R24 in the formula 8 is the portion along the terminal chain of the liquid crystal molecule 41, and examples of R24 include the group with which R13 in the formula 7 is expressed.

Specifically, examples of the group in the formula 8 include a monovalent group represented by the formula 8-1 to the formula 8-11.

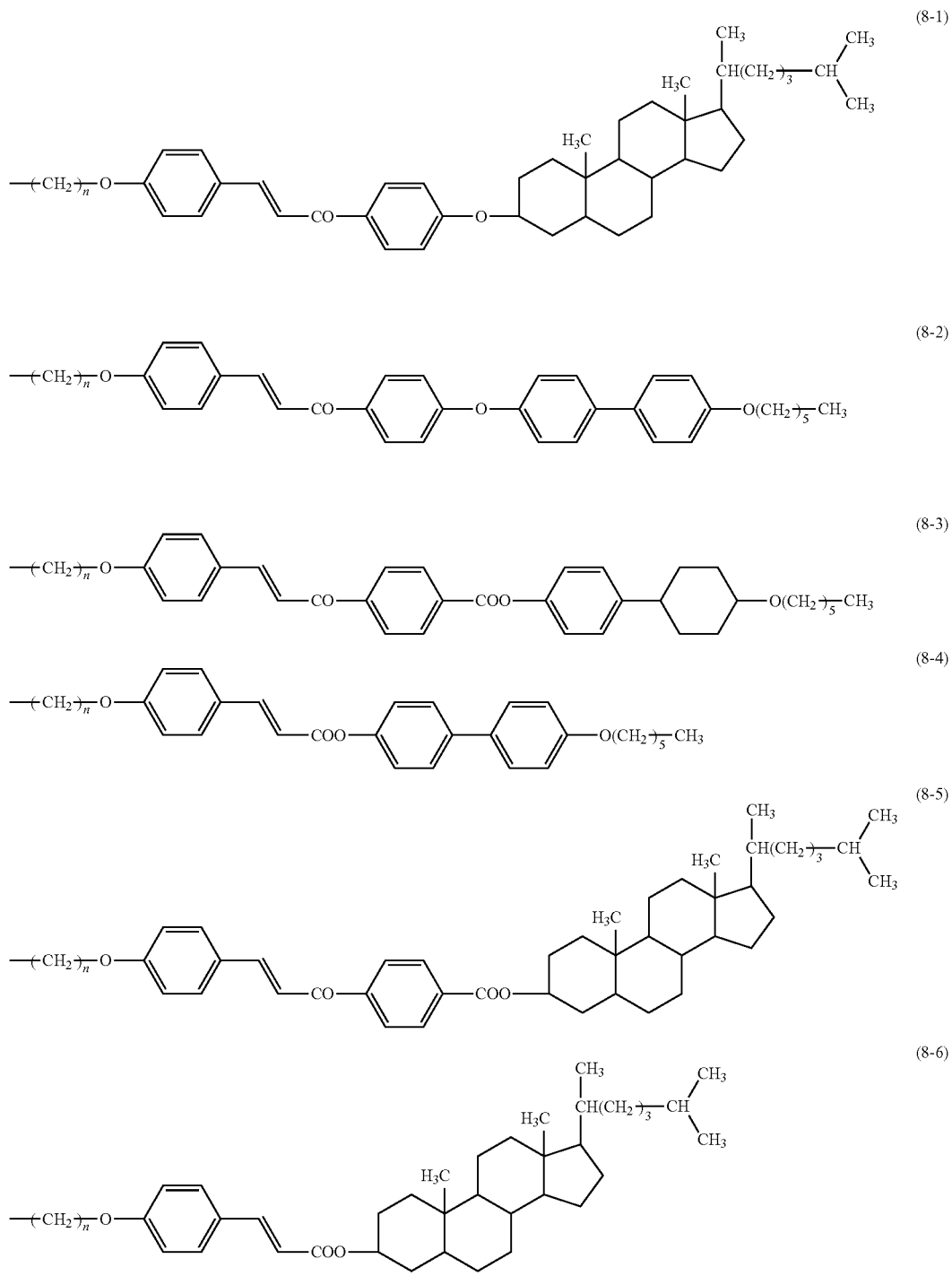

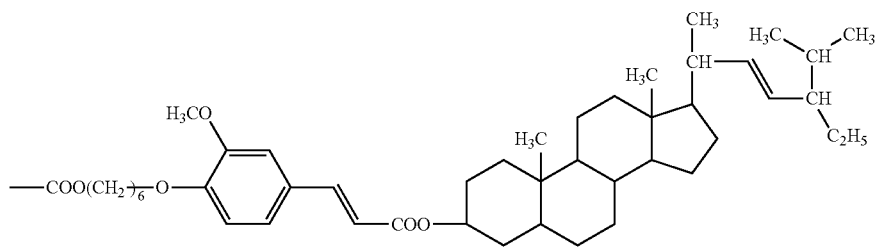
(8-7)

n is an integer of 3 to 20 both inclusive.

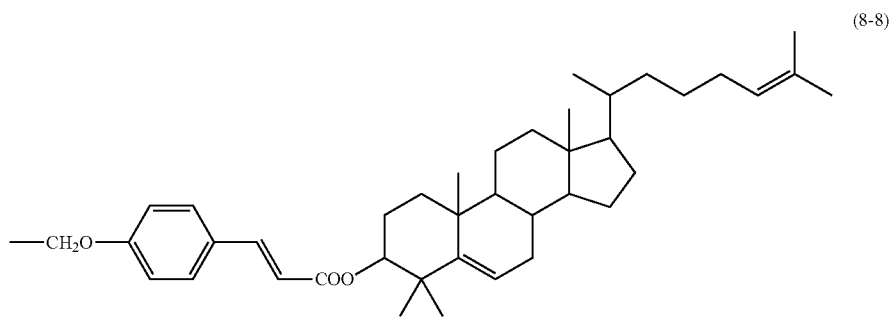
(8-8)

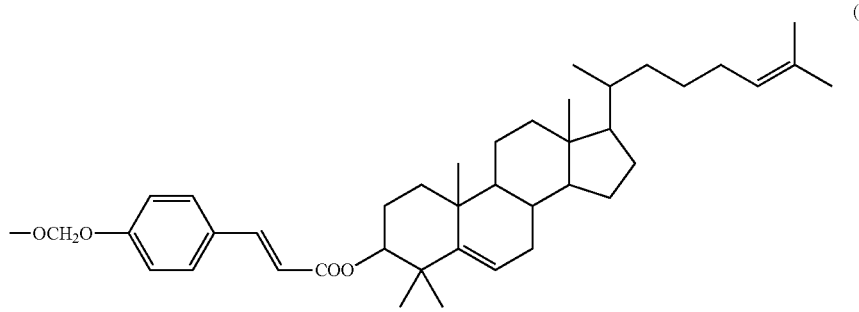
(8-9)

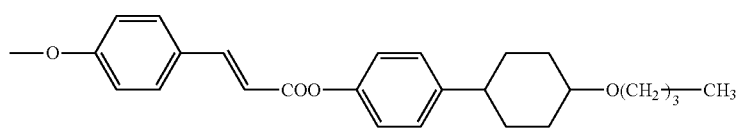
(8-10)

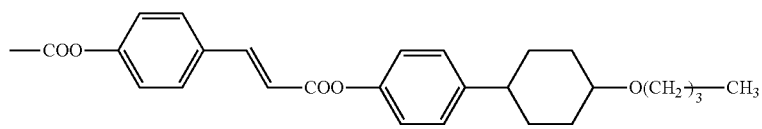
(8-11)

In addition, the group represented by the formula 8 is not limited to the above-described group as long as it has the four structure sections (R21 to R24) expressed above.

The compound after the orientation treatment may contain an unreacted crosslinkable functional group or the like, but the number of the unreacted crosslinkable function groups or the like is preferably small, because there is a risk that the orientation of the liquid crystal molecule 41 is disordered in the case where the unreacted crosslinkable functional group or the like is reacted during the drive. It is possible to confirm whether or not the compound after the orientation treatment contains the unreacted crosslinkable functional group or the like, for example, by decomposing the liquid crystal display element, and analyzing the orientation film 32 with a transmissive or a reflective FT-IR (Fourier transform infrared spectrophotometer). Specifically, first, the liquid crystal display element is decomposed, and the surface of the orientation film 32 is cleaned with the organic solvent or the like. Thereafter, the orientation film 32 is analyzed with FT-IR, and, for example, when a double bond forming the crosslinkable structure or the like in the formula 2 remains in the orientation film 32, absorption spectrum coming from the double bond may be obtained, and the confirmation is performed.

The orientation film 32 may contain other vertical orientation agents in addition to the compound after the orientation treatment. Examples of the other vertical orientation agent include polyimide having the vertical orientation inductive structure section, and the same kind of agent as the vertical orientation agent constituting the orientation film 22, such as polyimide having the vertical orientation inductive structure section, and polysiloxane having the vertical orientation inductive structure section.

The liquid crystal layer 40 includes the vertically-oriented liquid crystal molecule 41. For example, the liquid crystal molecule 41 has a rotationally symmetric shape around the long axis and the short axis orthogonal to each other, respectively, and exhibits the negative dielectric anisotropy. In addition, a dielectric anisotropy ($\Delta\in$) is obtained by $\Delta\in=\in//-\in\perp$. $\in//$ is the dielectric constant of the liquid crystal molecule 41 in the long axis direction, and $\in\perp$ is the dielectric constant of the liquid crystal molecule 41 in the short axis direction.

Figure 3:
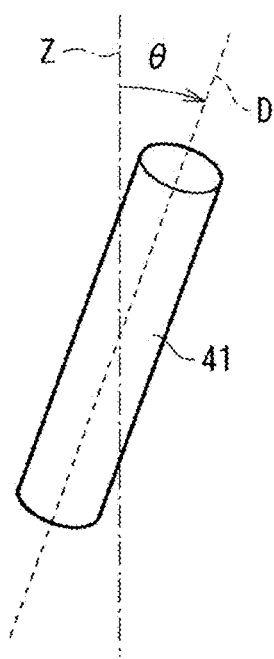
FIG. 3 is a schematic view for explaining a pre-tilt angle of a liquid crystal molecule.

The liquid crystal molecule 41 may be classified into the liquid crystal molecule 41A held by the orientation film 22 in the vicinity of the interface of the liquid crystal layer 40 and the orientation film 22, the liquid crystal molecule 41B held by the orientation film 32 in the vicinity of the interface of the liquid crystal layer 40 and the orientation film 32, and the liquid crystal molecule 41C other than the liquid crystal molecules 41A and 41B. The liquid crystal molecule 41C is located in a middle region in the thickness direction of the liquid crystal layer 40, and is aligned in such a manner that the long axis direction (director) of the liquid crystal molecule 41C is approximately vertical to the glass substrates 20A and 30A when the drive voltage is off. Here, when the drive voltage is on, the director of the liquid crystal molecule 41C is oriented to tilt to be parallel to the glass substrates 20A and 30A. Such a behavior is caused by the characteristics of the liquid crystal molecule 41C that the dielectric constant $\in//$ in the long axis direction is smaller than the dielectric constant $\in\perp$ in the short axis direction. The liquid crystal molecules 41A and 41B have the same characteristics as the liquid crystal molecule 41C, and the liquid crystal molecules 41A and 41B thus basically exhibits the same behavior as the liquid crystal molecule 41C in accordance with the state change when the drive voltage is on or off. However, when the drive voltage is off, the liquid crystal molecule 41A is oriented by the orientation film 22 in such a manner that the director of the liquid crystal molecule 41A is directed in the same direction as the normal direction of the glass substrates 20A and 30A. In other words, the liquid crystal molecule 41A is provided with a pre-tilt θ1 of 0° by the orientation film 22. Meanwhile, the liquid crystal molecule 41B is provided with a pre-tilt θ2 larger than 0° by the orientation film 32 when the drive voltage is off. Thereby, the liquid crystal molecule 41B is oriented in such a manner that the director of the liquid crystal molecule 41B is tilted from the normal direction of the glass substrates 20A and 30A toward the extending direction of the base 20B1 and the liner portion 20B2, from the middle of the pixel electrode 20B to the outside. In addition, here, the expression "held" means that the orientation of the liquid crystal molecule 41 is regulated, but the orientation films 22 and 32, and the liquid crystal molecules 41A and 41B are not fixed to each other. As illustrated in FIG. 3, in the case where the direction (normal direction) vertical to the surface of the glass substrates 20A and 30A is "Z", the term "pre-tilt θ (θ1 and θ2)" means an angle of a director D of the liquid crystal molecule 41 (41A to 41C) in the Z direction when the drive voltage is off, and the angle includes 0°.

In other words, in the liquid crystal layer 40, the pre-tilt θ2 of the liquid crystal molecule 41B is larger than the pre-tilt θ1 of the liquid crystal molecule 41A, and here, the pre-tilt θ1 is 0°, and the pre-tilt θ2 has a value larger than 0°. Thereby, the response characteristics to the application of the drive voltage is more improved compared with the case where both of the pre-tilts θ1 and θ2 are 0°, or the case where the pre-tilt θ1 is larger than 0°, and the pre-tilt θ2 is 0°, and the same level of contrast as the case where both of the pre-tilts θ1 and θ2 are 0° may be obtained. Further, the same level of response speed as the case where both of the pre-tilts θ1 and θ2 are larger than 0° (θ1>0°, and θ2>0°) may be obtained. Therefore, the transmittance of the light at the time of the black display is reduced while the response characteristics are improved, and the contrast may be thus improved. In this case, the pre-tilt θ2 is preferably larger than 0°, and 10° or smaller. Thereby, the sufficient response characteristics may be obtained, and the contrast is more improved. Among them, the pre-tilt θ2 is preferably 1° to 4° both inclusive. Thereby, the excellent response characteristics may be ensured, and the contrast is improved in particular. Specifically, when the pre-tilt θ2 is within the range described above, the response speed (the response speed in the drive state=the rise response speed) of the liquid crystal molecule 41 when the drive voltage is applied is faster than the case where the pre-tilt θ2 is smaller than 1°. Further, the response speed (the fall response speed) of the liquid crystal molecule 41 in the non-drive state after applying the drive voltage is faster than the case where the pre-tilt θ2 is larger than 4°, and the transmittance of the light at the time of the black display is reduced.

1-2. Method of Manufacturing Liquid Crystal Display Element

Figure 4:
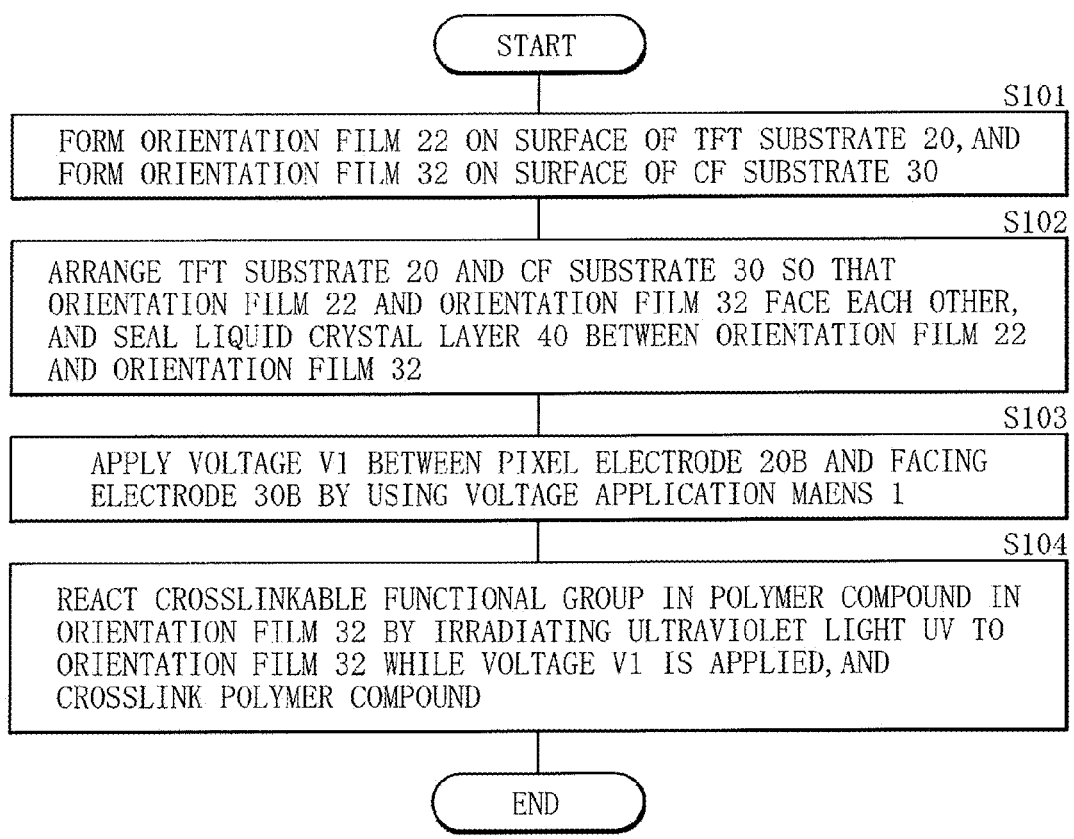
FIG. 4 is a flowchart for explaining a method of manufacturing the liquid crystal display element illustrated in FIG. 1.
Figure 5:
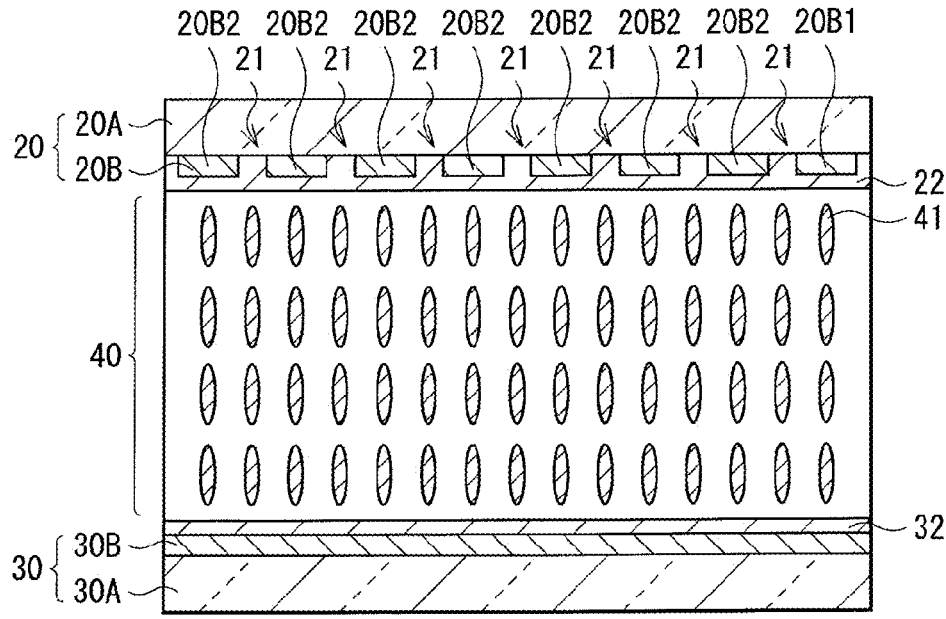
FIG. 5 is a cross-sectional schematic view for explaining the method of manufacturing the liquid crystal display element illustrated in FIG. 1.

Next, a method of manufacturing the liquid crystal display element will be described with reference to a flowchart illustrated in FIG. 4, and cross-sectional schematic views illustrated in FIGS. 5, 6A, and 6B. In addition, in FIGS. 5, 6A, and 6B, only a part of the pixel 10 will be illustrated for the sake of simplicity.

First, the orientation film 22 is formed on the surface of the TFT substrate 20, and the orientation film 32 is formed on the surface of the CF substrate 30 (step S101).

Specifically, first, the pixel electrode 20B on which the pattern of the predetermined slit 21 is formed is provided in the matrix on the surface of the glass substrate 20A, and the TFT substrate 20 is thereby manufactured. Next, the orientation agent containing the vertical orientation agent dissolved or dispersed in a solvent is applied or printed onto the TFT substrate 20 to cover the pixel electrode 20B and the slit 21, and then the heat treatment is performed. Thereby, the solvent contained in the applied or printed orientation material is evaporated, and the orientation film 22 is formed. Thereafter, the process such as rubbing may be performed, if necessary.

Further, the facing electrode 30B is provided on the color filter of the glass substrate 30A on which the color filter is formed, and the CF substrate 30 is thereby manufactured. Next, for example, the compound before the orientation treatment or a polymer compound precursor to be the compound before the orientation treatment, and the solvent, and, if necessary, the vertical orientation agent are mixed, and the orientation material in the liquid state is thereby prepared.

In the case where the polymer compound having the crosslinkable functional group or the polymerizable functional group as the side chain has the polyimide structure in the formula 1, examples of the polymer compound precursor include a polyamic acid having the crosslinkable functional group or the polymerizable functional group. The polyamic acid as the polymer compound precursor is synthesized, for example, by reacting a diamine compound and a tetracarboxylic acid dianhydride. One or both of the diamine compound and the tetracarboxylic acid dianhydride used here has the crosslinkable functional group or the polymerizable functional group. Examples of the diamine compound include the compound having the crosslinkable functional group represented by the formula A-1 to the formula A-21, and examples of the tetracarboxylic acid dianhydride include the compound having the crosslinkable functional group represented by the formula A-22 to the formula A-31.

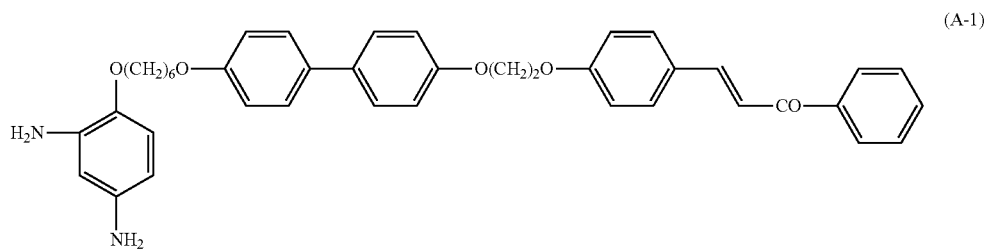
(A-1)
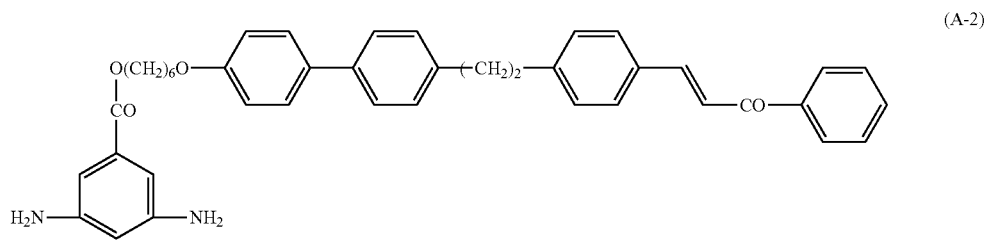
(A-2)
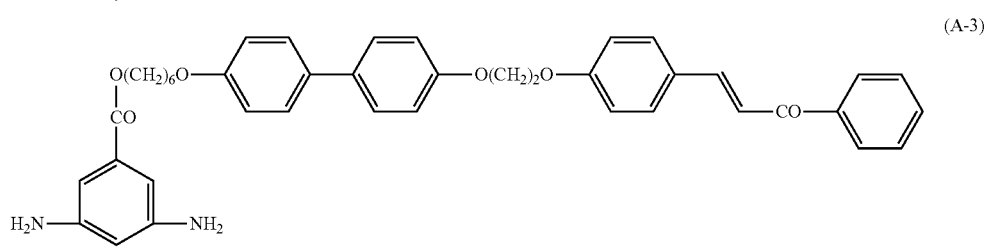
(A-3)
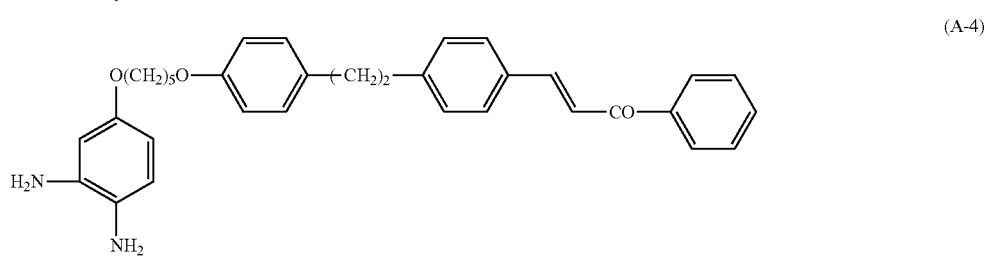
(A-4)
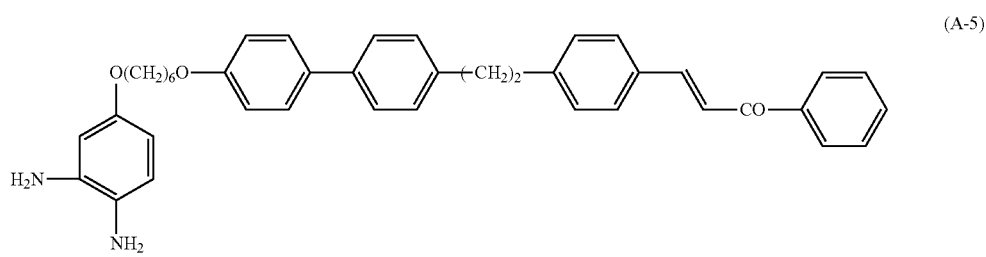
(A-5)
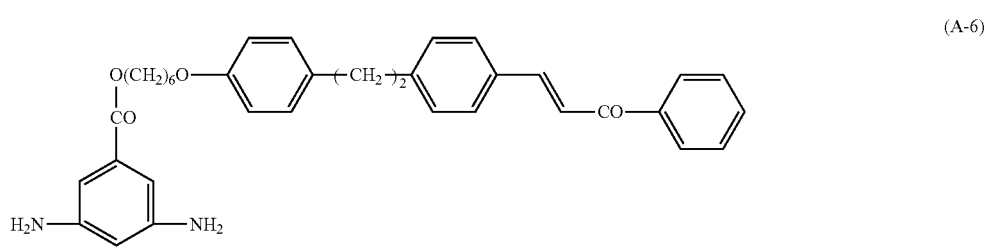
(A-6)
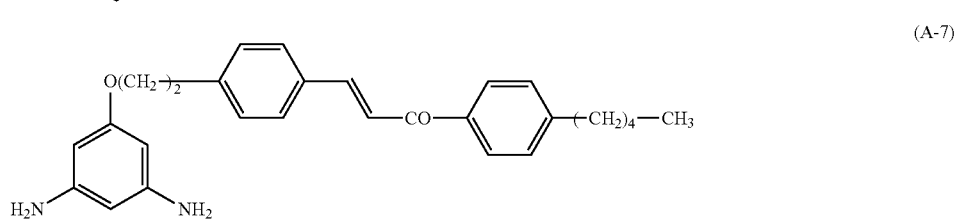
(A-7)

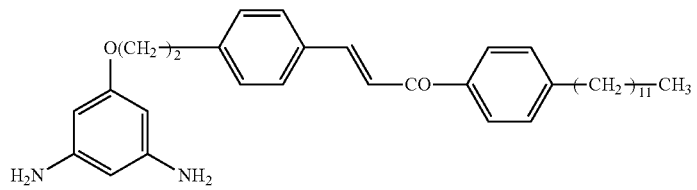
(A-8)
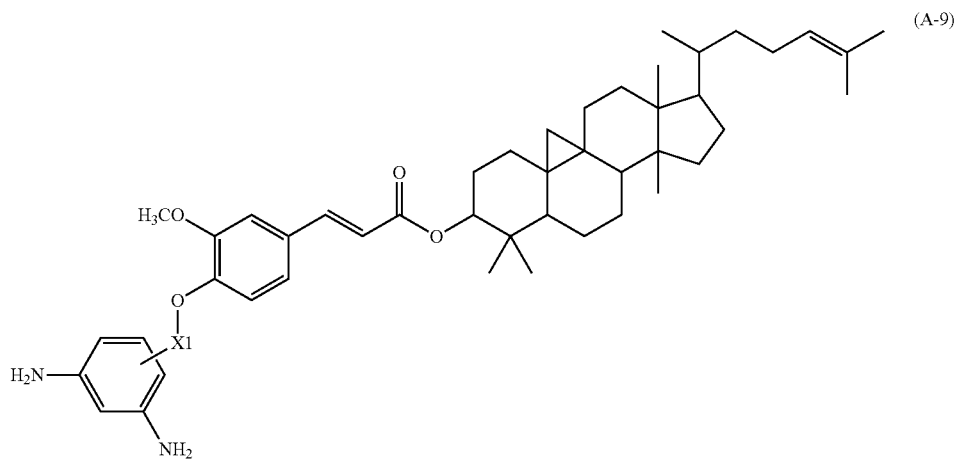
(A-9)
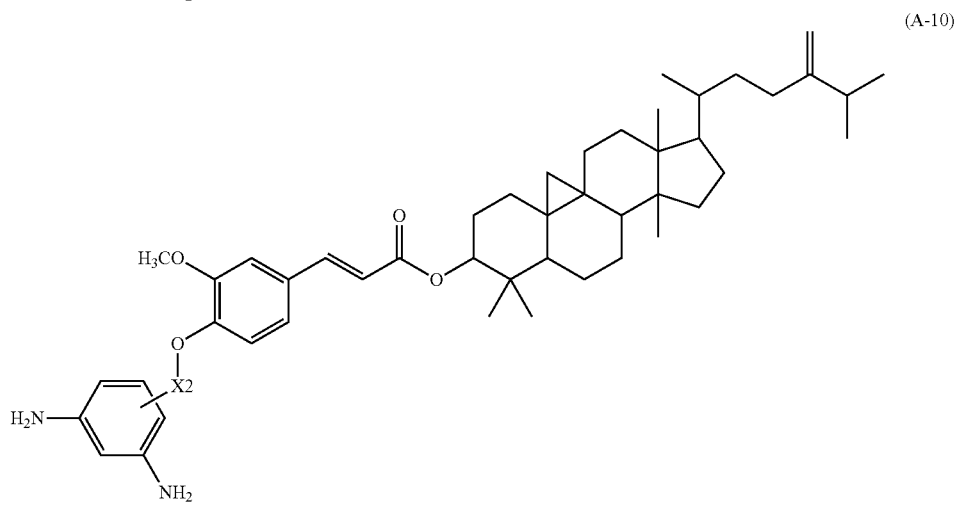
(A-10)
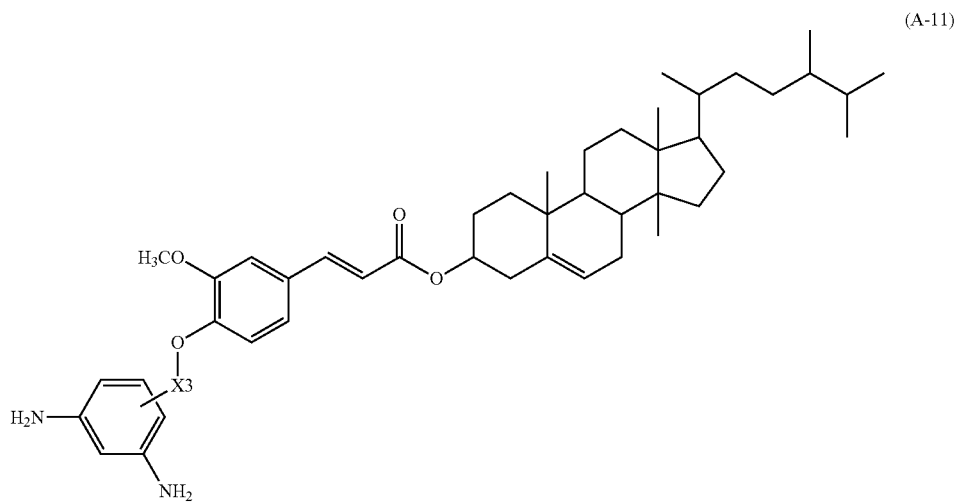
(A-11)

-continued
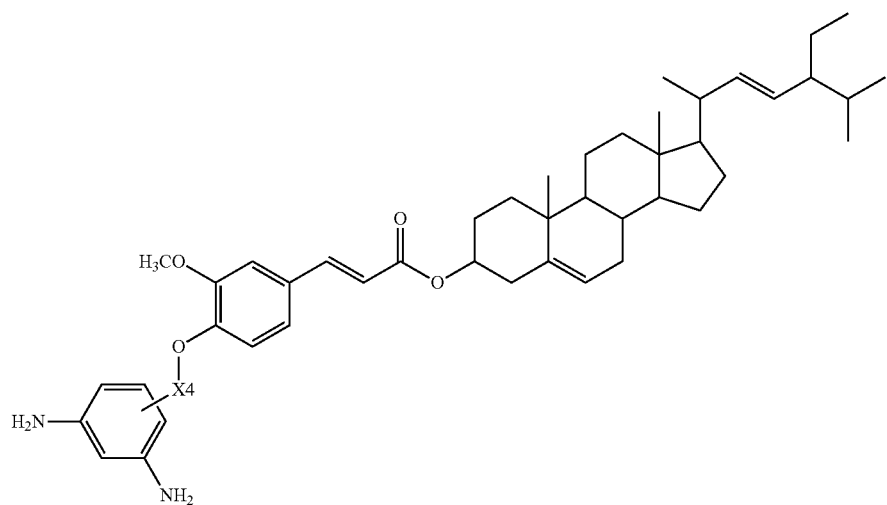
(A-12)
X1 to X4 each are a single bond, or a bivalent organic group.
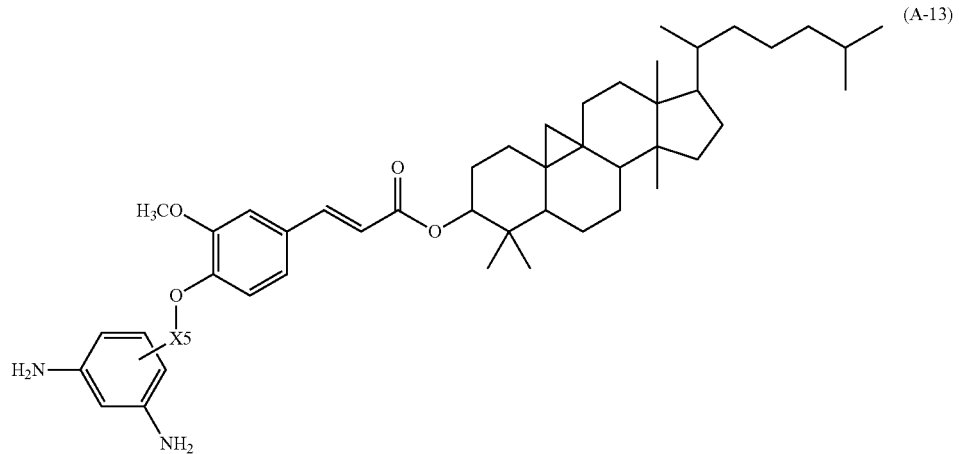
(A-13)
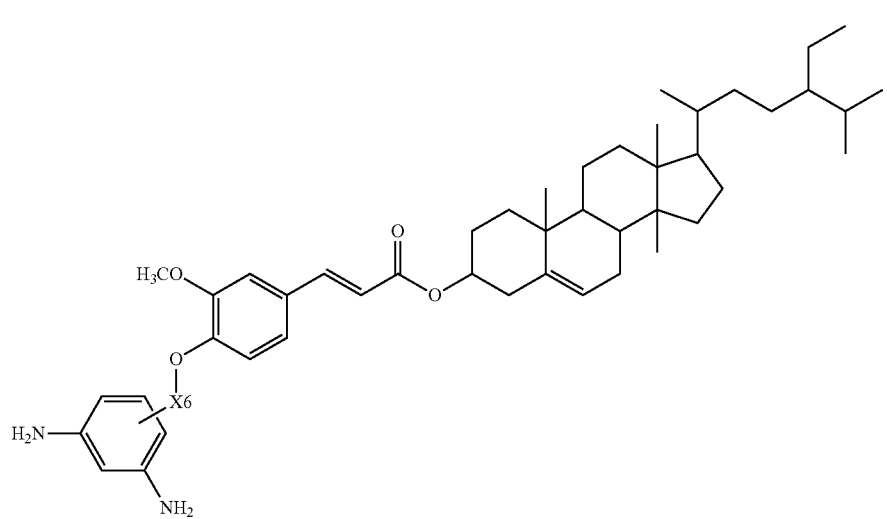
(A-14)

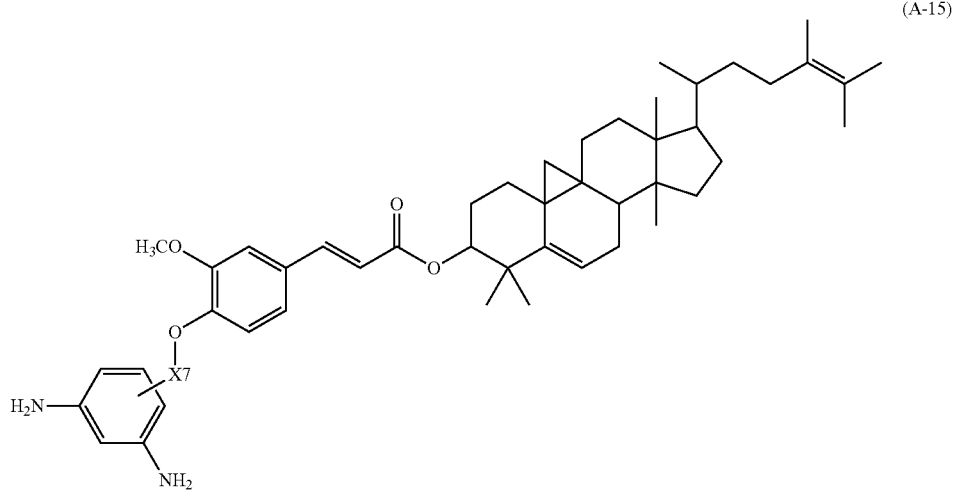
(A-15)
X5 to X7 each are a single bond, or a bivalent organic group.
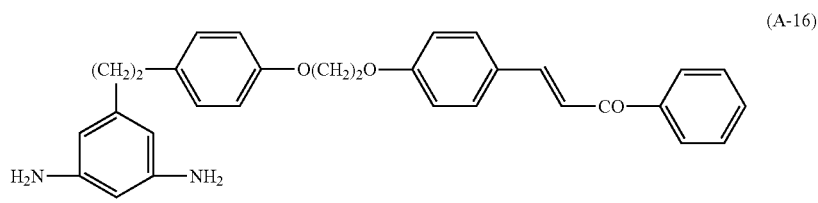
(A-16)
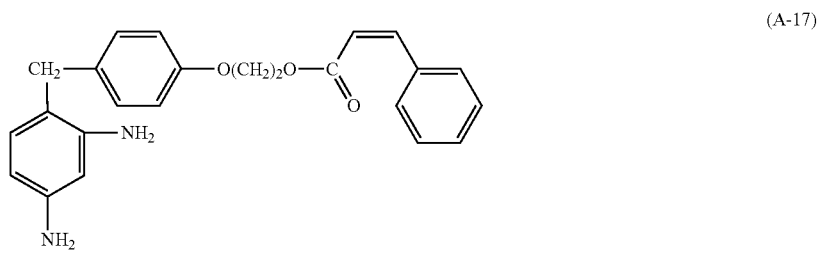
(A-17)
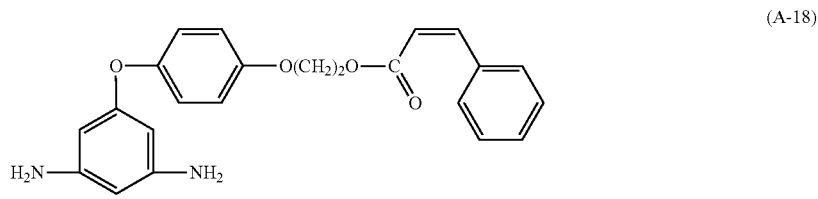
(A-18)
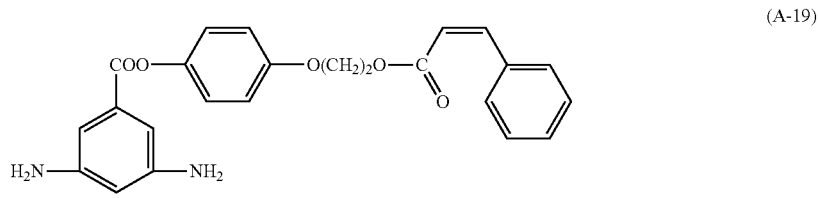
(A-19)

-continued
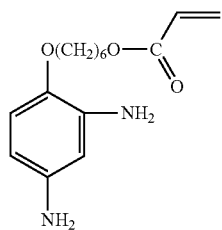
(A-20)
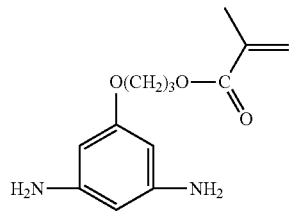
(A-21)
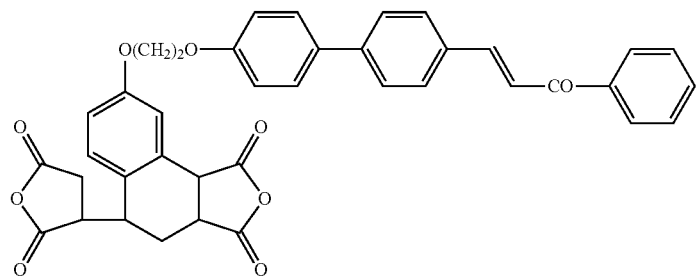
(A-22)
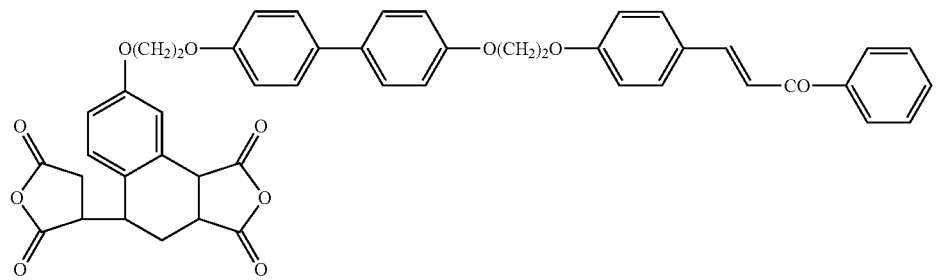
(A-23)
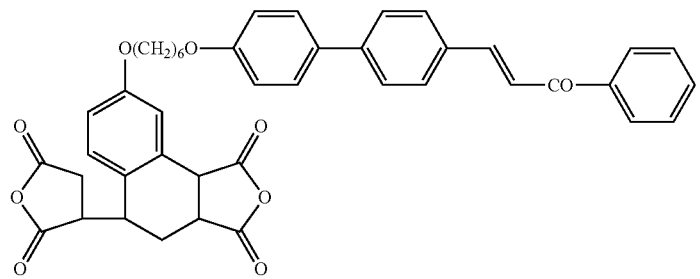
(A-24)
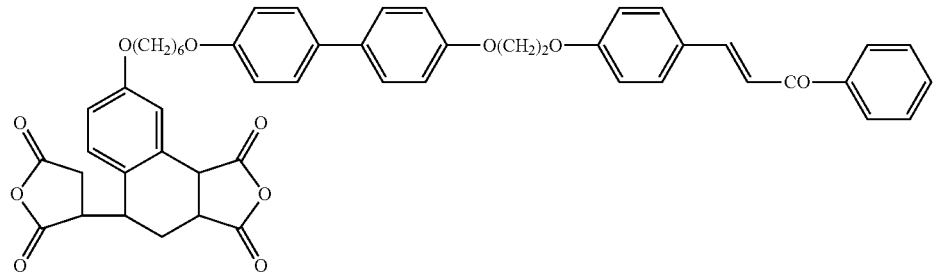
(A-25)

-continued
(A-26)
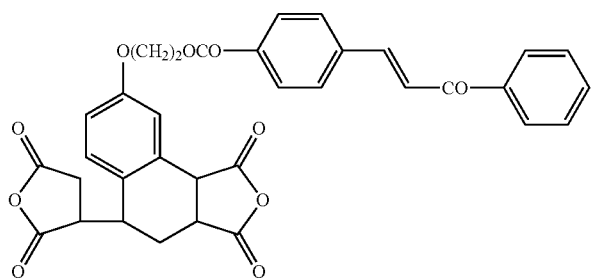
(A-27)
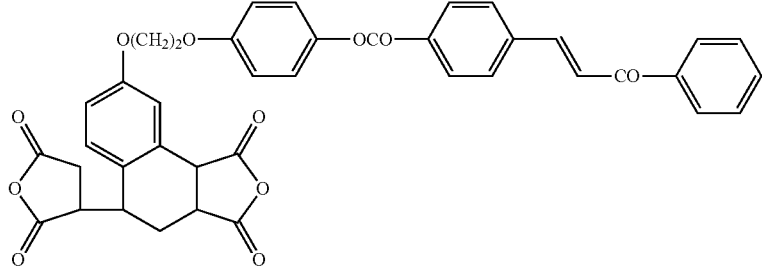
(A-28)
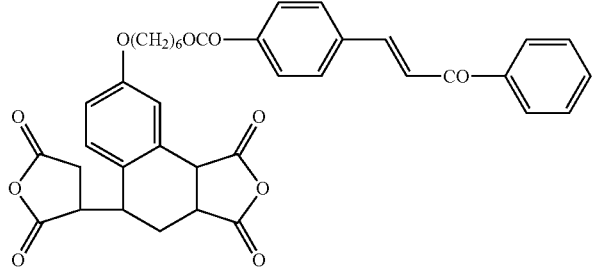
(A-29)
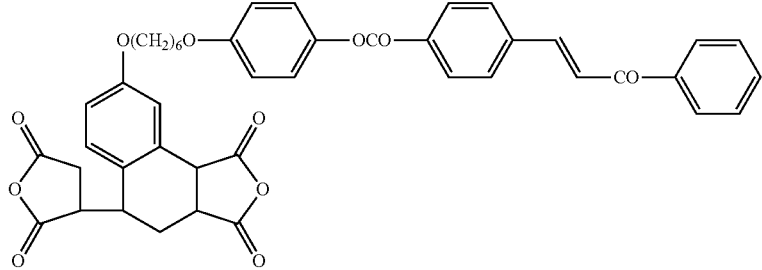
(A-30)
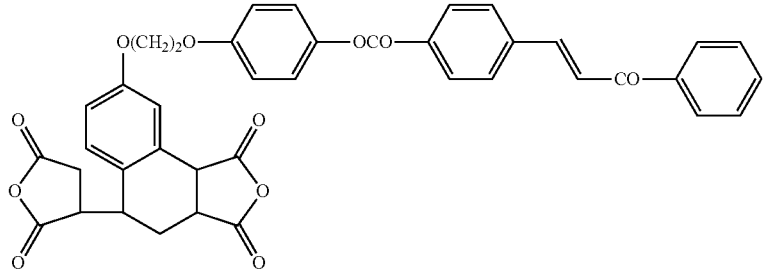

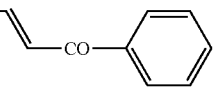
(A-31)
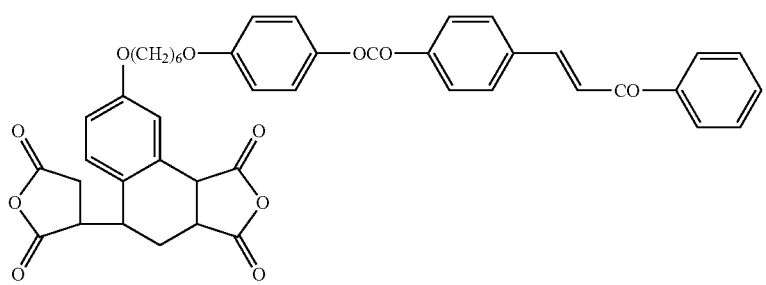

Further, in the case where the polyamic acid as the polymer compound precursor is synthesized so that the compound before the orientation treatment includes the vertical orientation inductive structure section, the compound having the vertical orientation inductive structure section represented by the formula B-1 to the formula B-36 may be used as the diamine compound, and the compound having the vertical orientation inductive structure section represented by the formula B-37 to the formula B-39 may be used as the tetracarboxylic acid dianhydride, in addition to the above-described compound having the crosslinkable functional group.

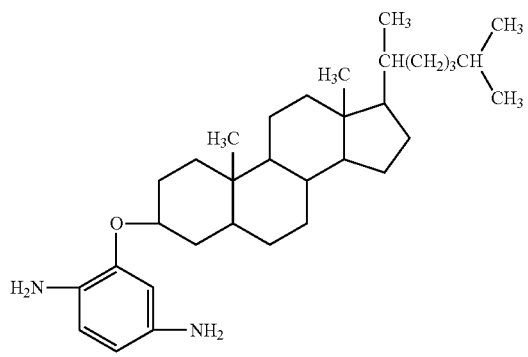
(B-1)

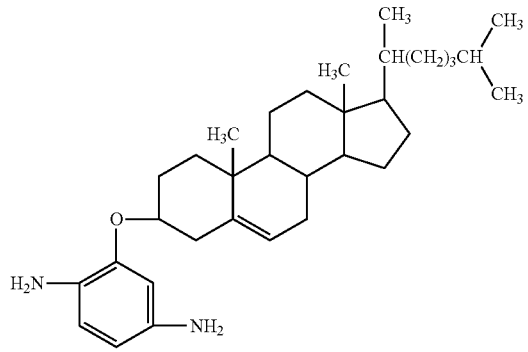
(B-2)

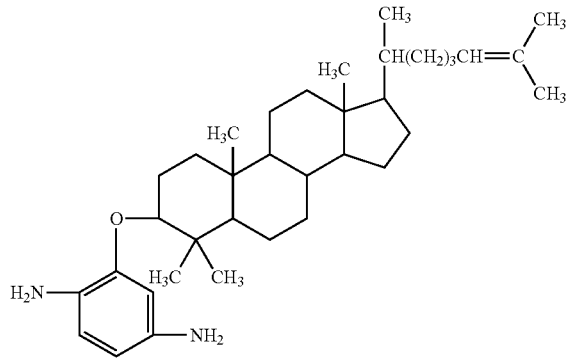
(B-3)

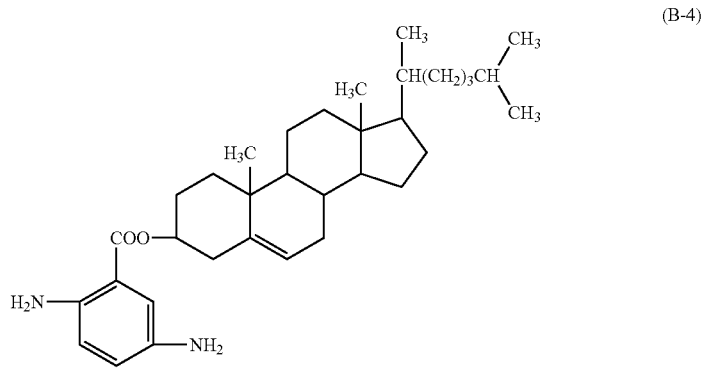
(B-4)
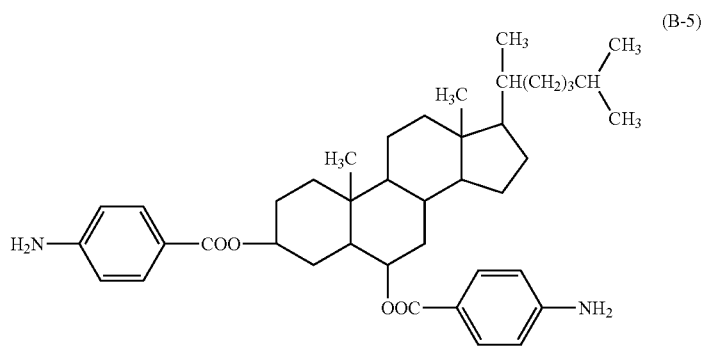
(B-5)
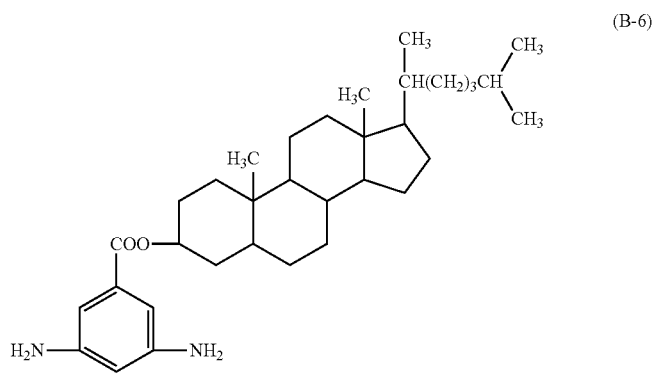
(B-6)
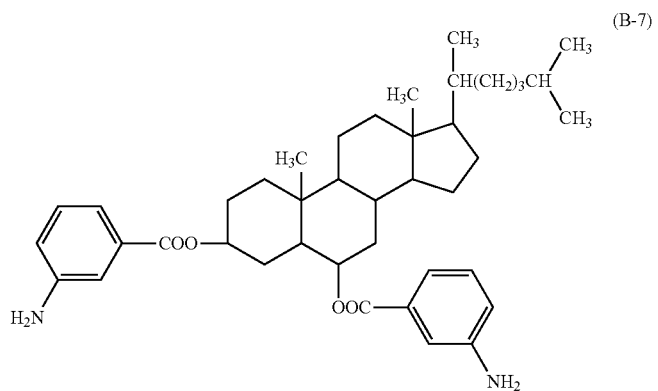
(B-7)

-continued
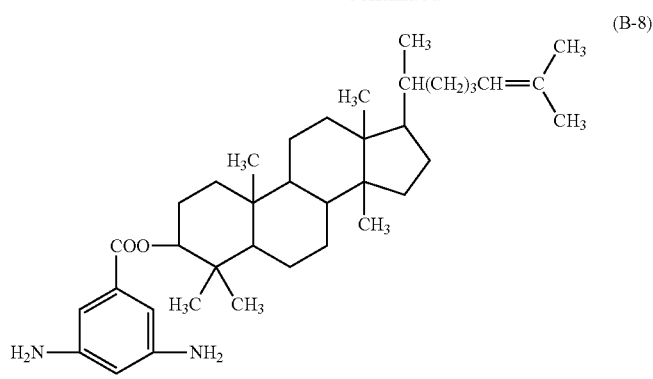
(B-8)
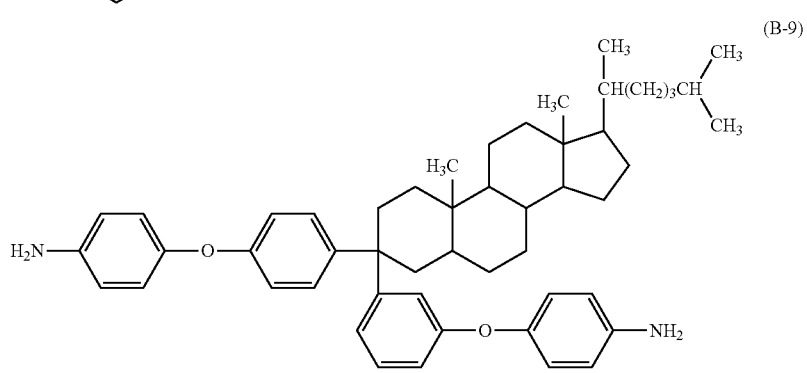
(B-9)
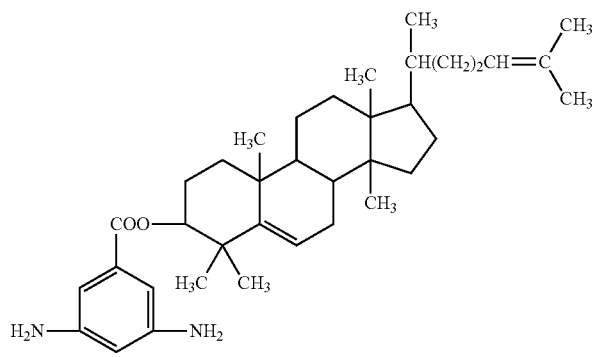
(B-10)
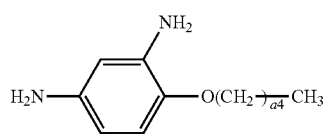
(B-11)
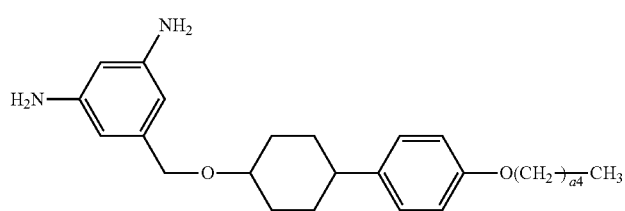
(B-12)
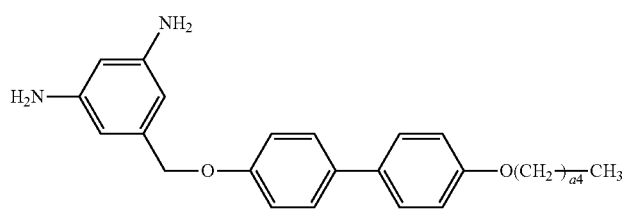
(B-13)

(B-14)
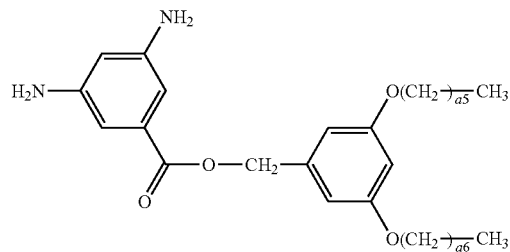
a4 to a6 each are an integer of 0 to 21 both inclusive.
a4 is an integer of 0 to 21 both inclusive.
(B-15)
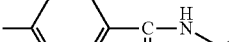
(B-20)
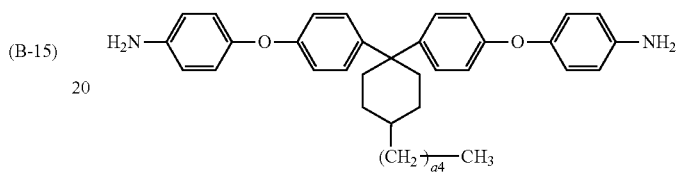
(B-16)
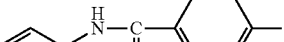
(B-21)
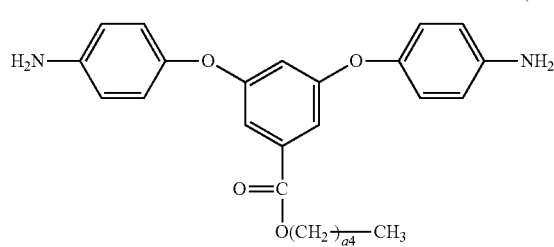
(B-17)
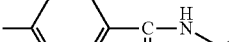
(B-22)
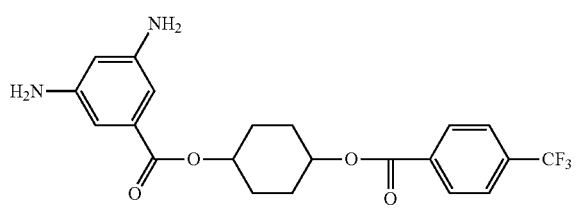
(B-18)
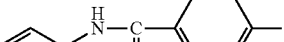
(B-23)
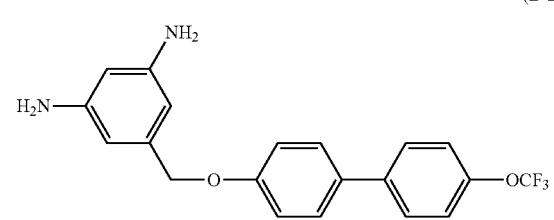
(B-19)
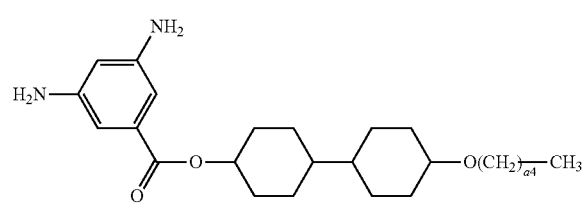
(B-24)
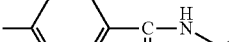
(B-25)
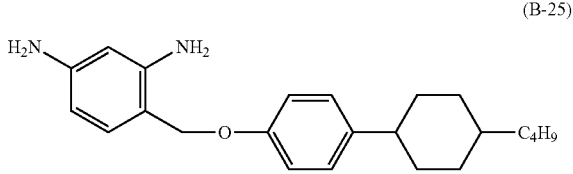

(B-26)
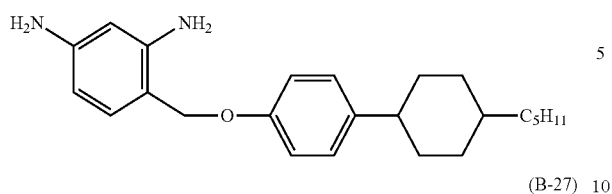
(B-27)
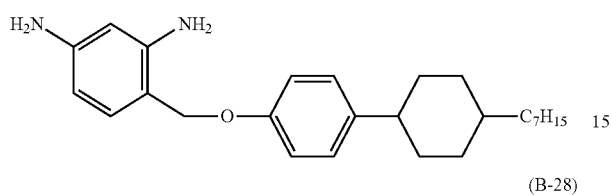
(B-28)
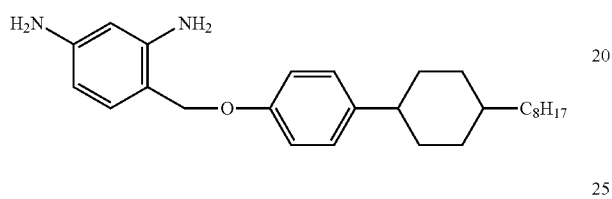
a4 is an integer of 0 to 21 both inclusive.
(B-29)
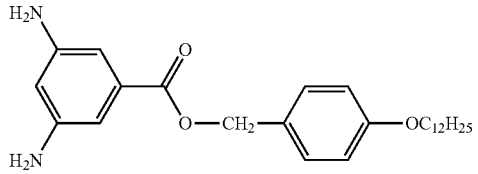
(B-30)
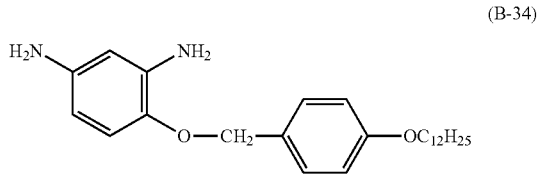
(B-31)
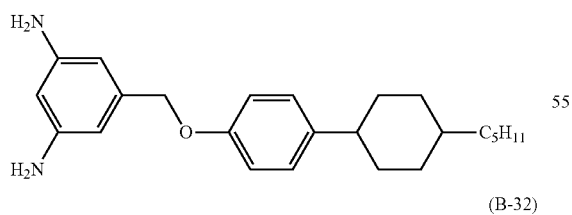
(B-32)
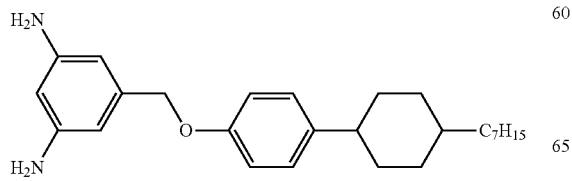
(B-33)
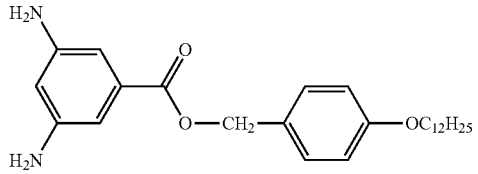
(B-34)
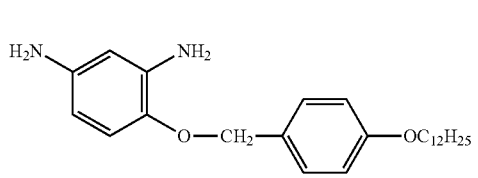
(B-35)
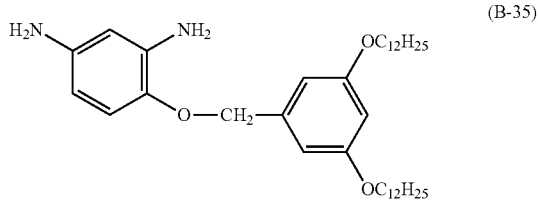
(B-36)
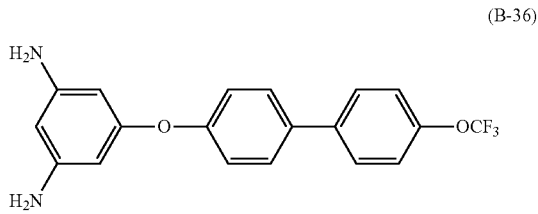
(B-37)
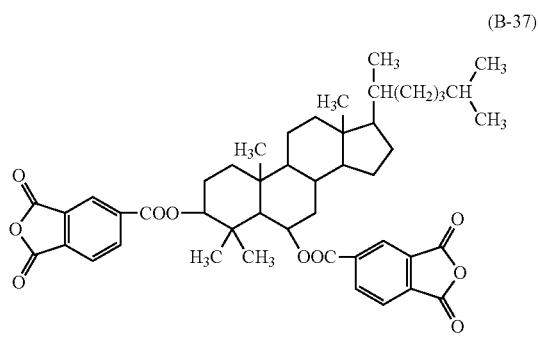

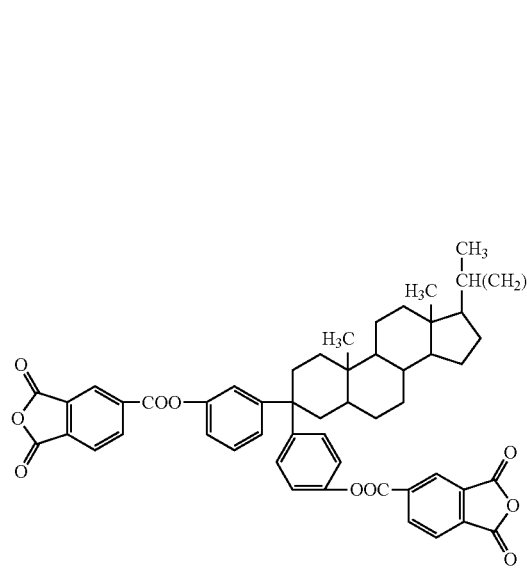
(B-38)

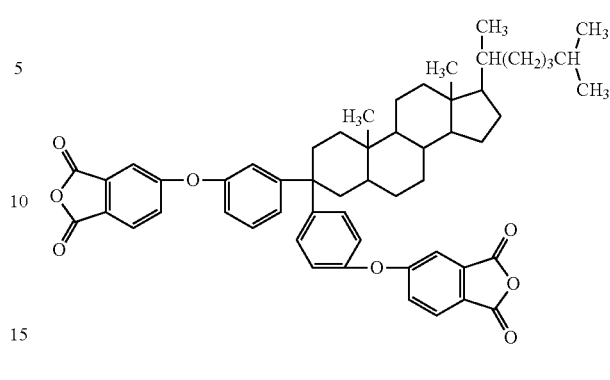
(B-39)

Further, in the case where the polyamic acid as the polymer compound precursor is synthesized so that the compound before the orientation treatment has the crosslinkable functional group and the group represented by the formula 7 as well, the compound having the group which may be along the liquid crystal molecule 41 represented by the formula C-1 to the formula C-24 may be used as the diamine compound, in addition to the above-described compound having the crosslinkable functional group.

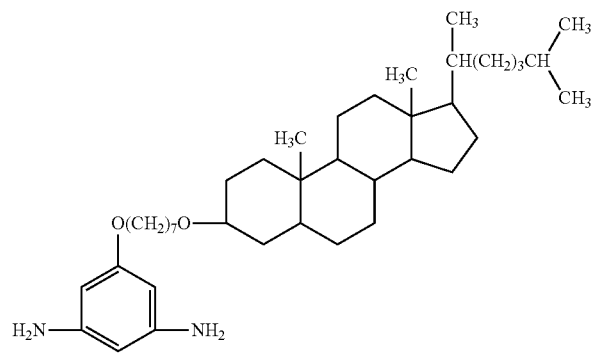
(C-1)

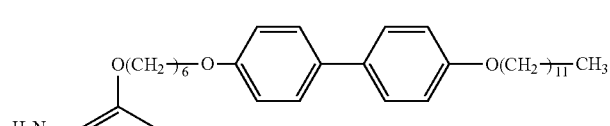
(C-2)

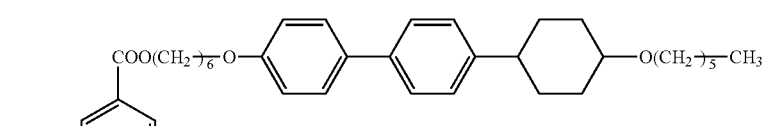
(C-3)

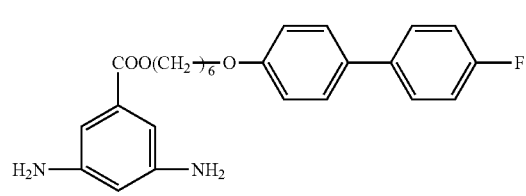
(C-4)

-continued
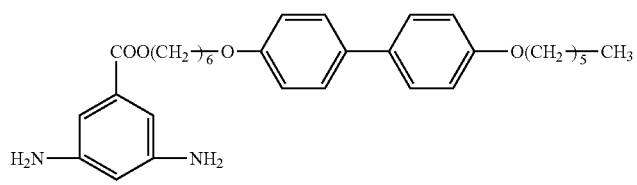
(C-5)
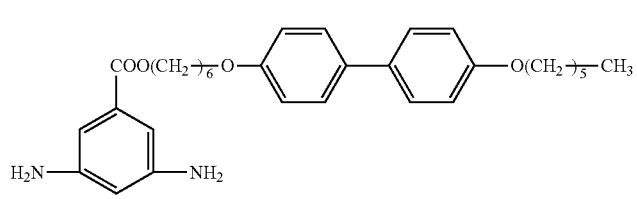
(C-6)
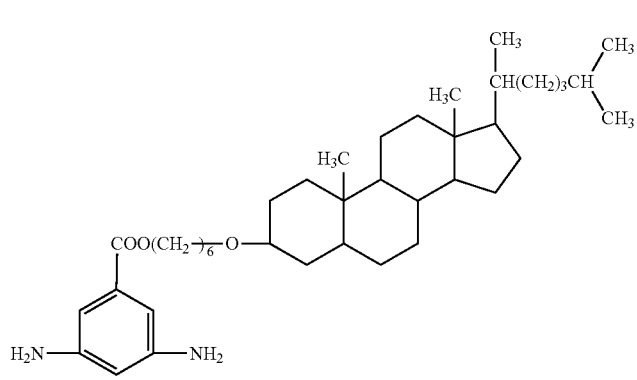
(C-7)
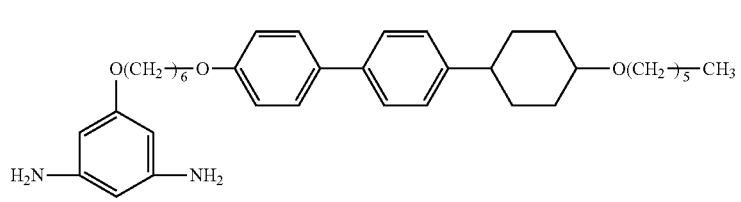
(C-8)
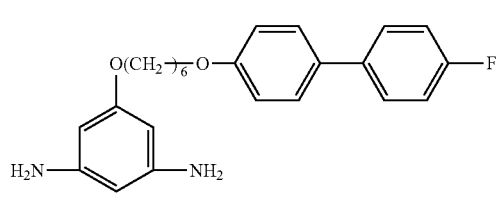
(C-9)
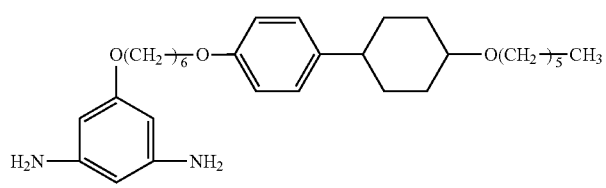
(C-10)
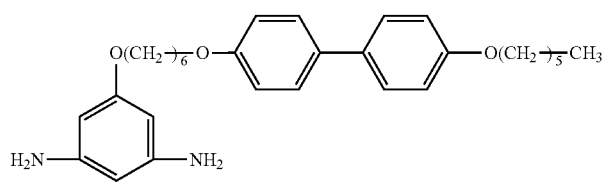
(C-11)

-continued
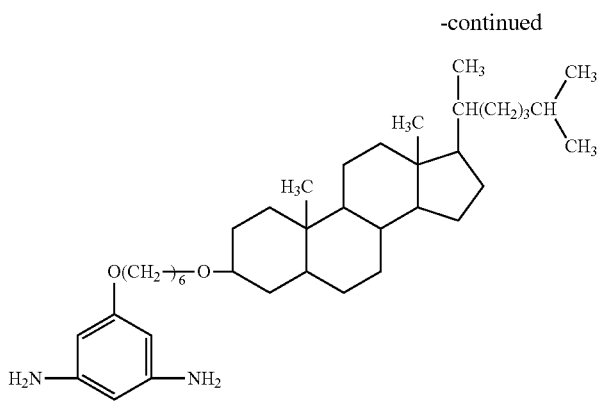
(C-12)
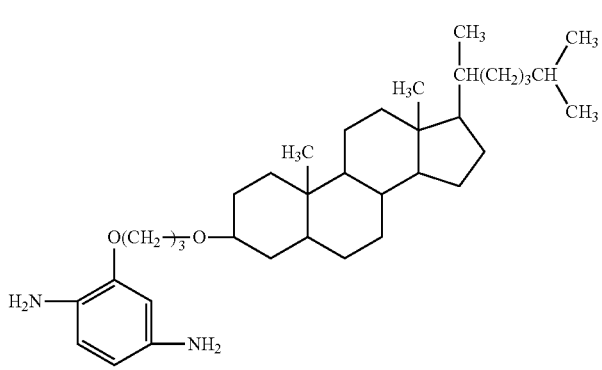
(C-13)
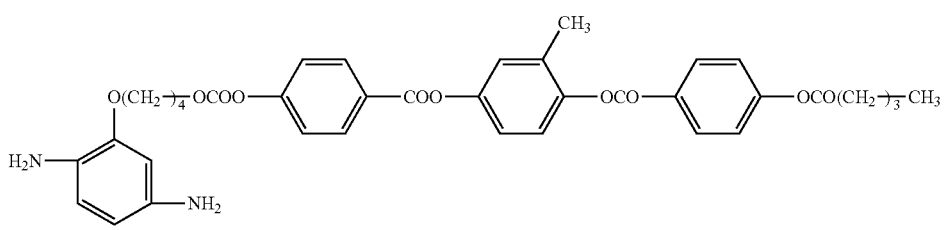
(C-14)
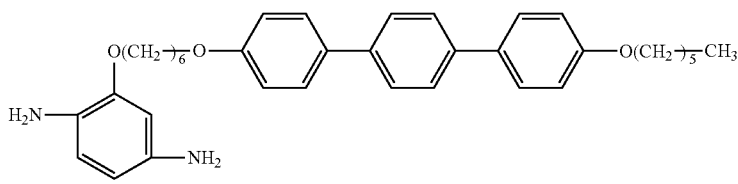
(C-15)
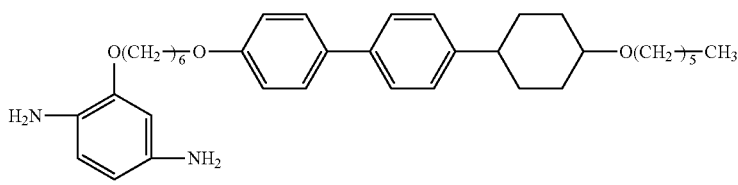
(C-16)
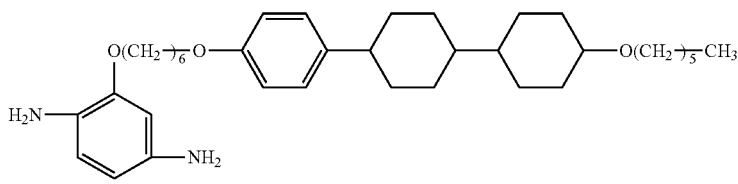
(C-17)

-continued

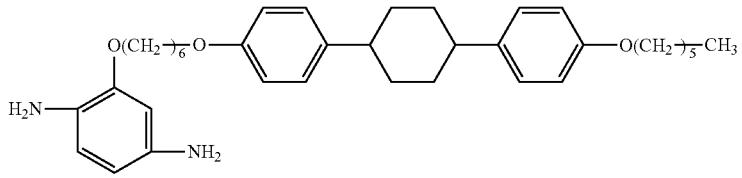
(C-18)

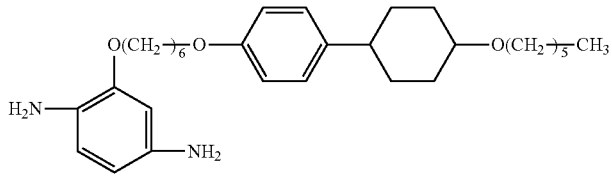
(C-19)

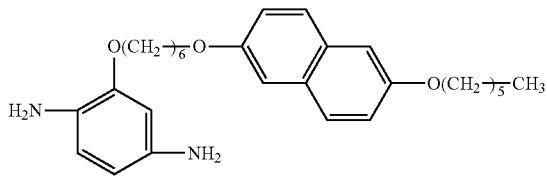
(C-20)

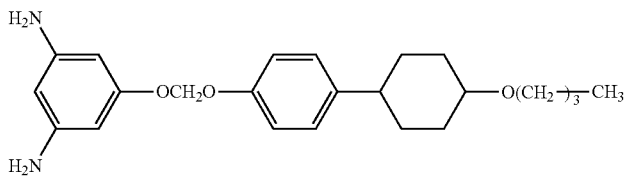
(C-21)

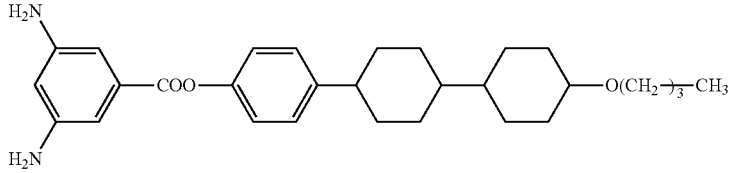
(C-22)

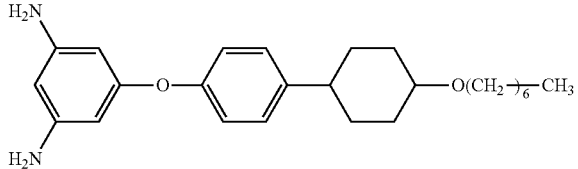
(C-23)

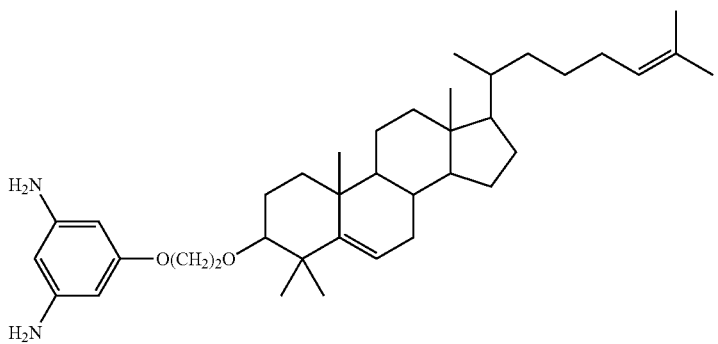
(C-24)

Further, in the case where the polyamic acid as the polymer compound precursor is synthesized so that the compound before the orientation treatment has the group represented by the formula 8, the compound having the crosslinkable functional group which may be along the liquid crystal molecule 41, represented by the formula D-1 to the formula D-12 may be used as the diamine compound, in substitution for the above-described compound having the crosslinkable functional group.
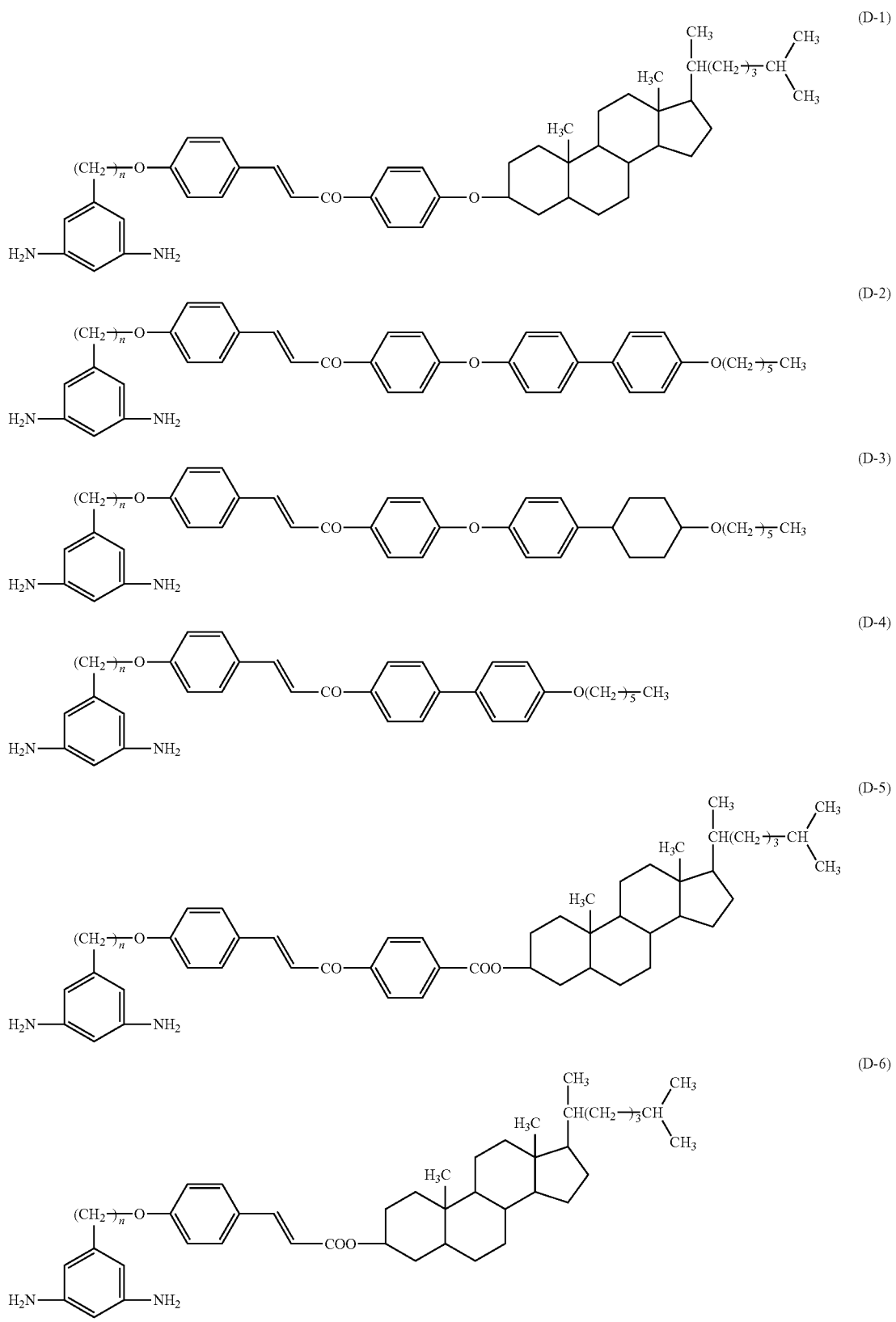

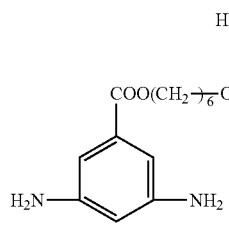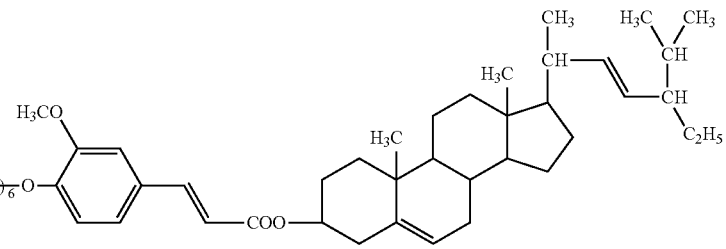 (D-7)
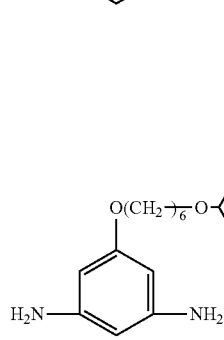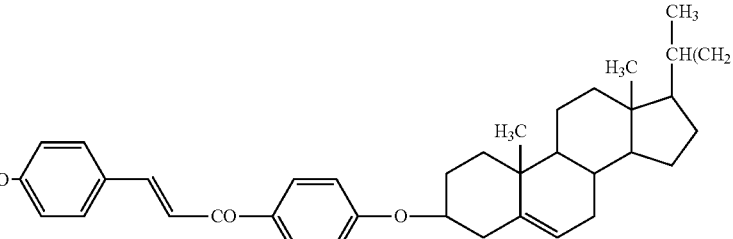 (D-8)
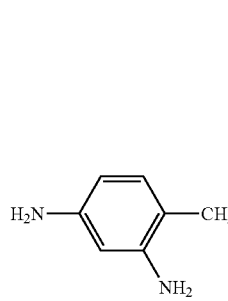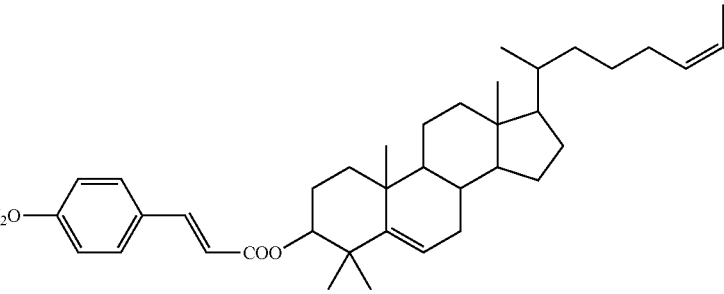 (D-9)
(D-10)
(D-11)
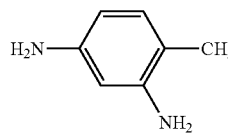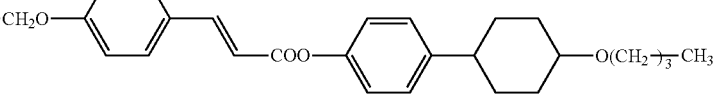
(D-12)
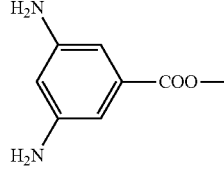
n is an integer of 3 to 20 both inclusive.

Further, in the case where the polyamic acid as the polymer compound precursor is synthesized so that the compound before the orientation treatment has two kinds of structures of the structure including the vertical orientation inductive structure section as R2 in the formula 1, and the structure including the crosslinkable functional group, for example, the diamine compound and the tetracarboxylic acid dianhydride are selected as follows. That is, one or more kinds of the compounds having the crosslinkable functional group represented by the formula A-1 to the formula A-21, one or more kinds of the compounds having the vertical orientation inductive structure section represented by the formula B-1 to the formula B-39, and one or more kinds of the tetracarboxylic acid dianhydride represented by the formula E-1 to the formula E-28 are used. In addition, R31 and R32 in the formula E-23 may be the same group, or different groups. Further, the type of a halogen group is arbitrary.

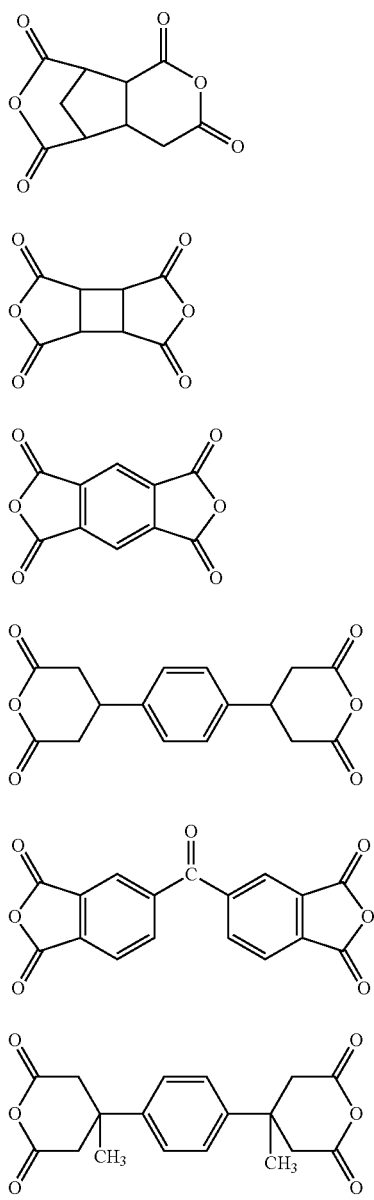

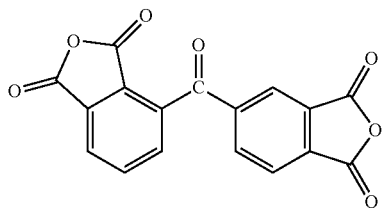

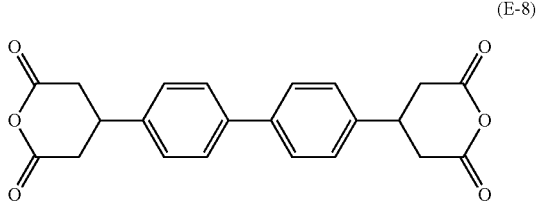

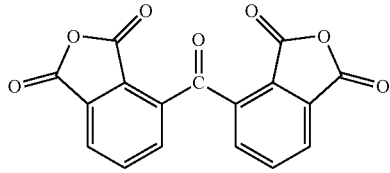

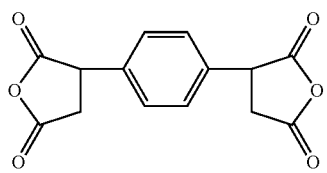

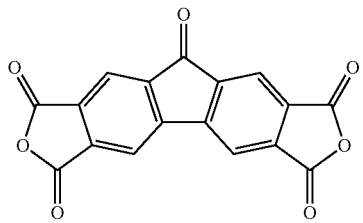

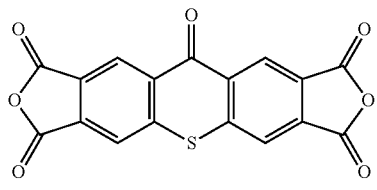

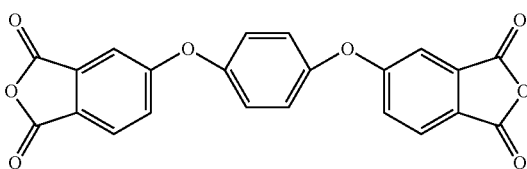

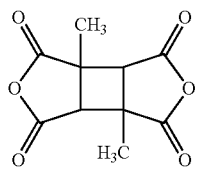

(E-15) 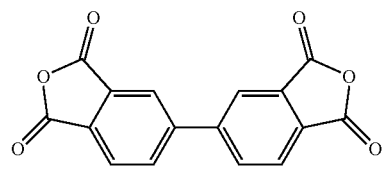

(E-16) 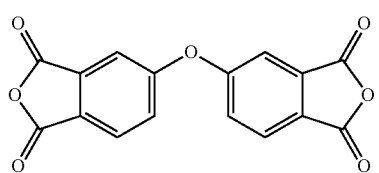

(E-17) 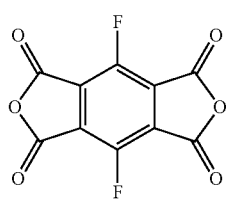

(E-18) 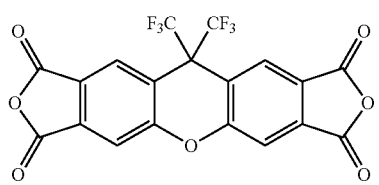

(E-19) 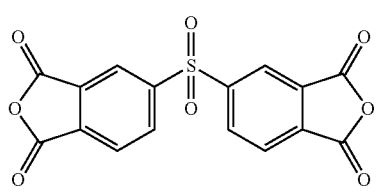

(E-20) 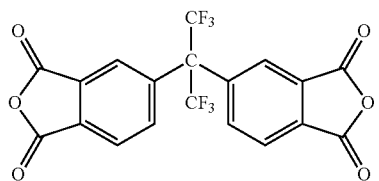

(E-21) 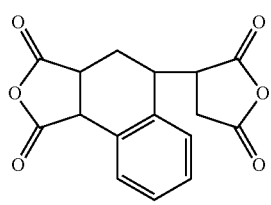

(E-22) 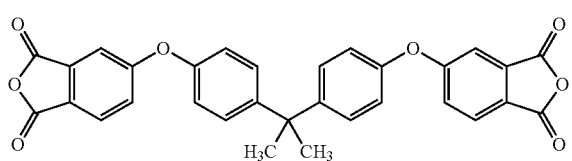

(E-23) 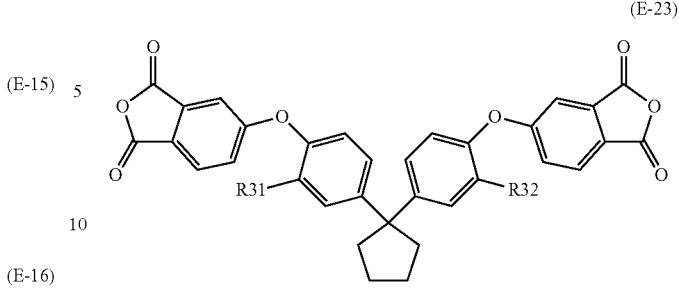

(E-24)

(E-25)

(E-26)

(E-27)

(E-28)

R31 and R32 each are an alktl group, an alkoxy group, or a halogen group.

Further, in the case where the polyamic acid as the polymer compound precursor is synthesized so that the compound before the orientation treatment includes two kinds of structures of the structure containing the group represented by the formula 7 as R2 in the formula 1, and the structure containing the crosslinkable functional group, for example, the diamine compound and the tetracarboxylic acid dianhydride are selected as follows. That is, one or more kinds of the compounds having the crosslinkable functional group represented by the formula A-1 to the formula A-21, one or more kinds of the compounds represented by the formula C-1 to the formula C-24, and one or more kinds of the tetracarboxylic acid dianhydride represented by the formula E-1 to the formula E-28 are used.

Further, in the case where the polyamic acid as the polymer compound precursor is synthesized so that the compound before the orientation treatment includes the structure containing the group represented by the formula 8 as R2 in the formula 1, for example, the diamine compound and the tetracarboxylic acid dianhydride are selected as follows. That is, one or more kinds of the compounds having the crosslinkable functional group represented by the formula D-1 to the formula D-12, and one or more kinds of the tetracarboxylic acid dianhydride represented by the formula E-1 to the formula E-28 are used.

The content of the compound before the orientation treatment, or the polymer compound precursor in the orientation material is preferably 1 weight % to 30 weight % both inclusive, and more preferably 3 weight % to 10 weight % both inclusive. Further, a photopolymerization initiator or the like may be mixed into the orientation material, if necessary.

Next, the adjusted orientation material is applied or printed onto the CF substrate 30 to cover the facing electrode 30B, and then the heating treatment is performed. The temperature of the heating treatment is preferably 80° C. or higher, and more preferably from 150° C. to 200° C. both inclusive. Further, the heating temperature of the heating treatment may be changed in steps. Thereby, the solvent contained in the applied or printed orientation material is evaporated, and the orientation film 32 containing the polymer compound (the compound before the orientation treatment) having the crosslinkable functional group as the side chain is formed. Thereafter, the process such as rubbing may be performed, if necessary.

Next, the TFT substrate 20 and the CF substrate 30 are arranged so that the orientation film 22 and the orientation film 32 face each other, and the liquid crystal layer 40 including the liquid crystal molecule 41 is sealed between the orientation film 22 and the orientation film 32 (step S102). Specifically, on the face of one of the TFT substrate 20 or the CF substrate 30, on which the orientation film 22 or the orientation film 32 is formed, a spacer projection to ensure a cell gap, for example, plastic beads are dispersed, and a seal section is printed by using, for example, an epoxy adhesive through screen printing method. Thereafter, as illustrated in FIG. 5, the TFT substrate 20 and the CF substrate 30 are bonded through the spacer projection and the seal section so that the orientation films 22 and 32 face each other, and the liquid crystal material including the liquid crystal molecule 41 is injected. Thereafter, the seal section is cured by heating or the like, and the liquid crystal material is thus sealed between the TFT substrate 20 and the CF substrate 30. FIG. 5 illustrates the cross-sectional structure of the liquid crystal layer 40 sealed between the orientation film 22 and the orientation film 32.

Figure 6:
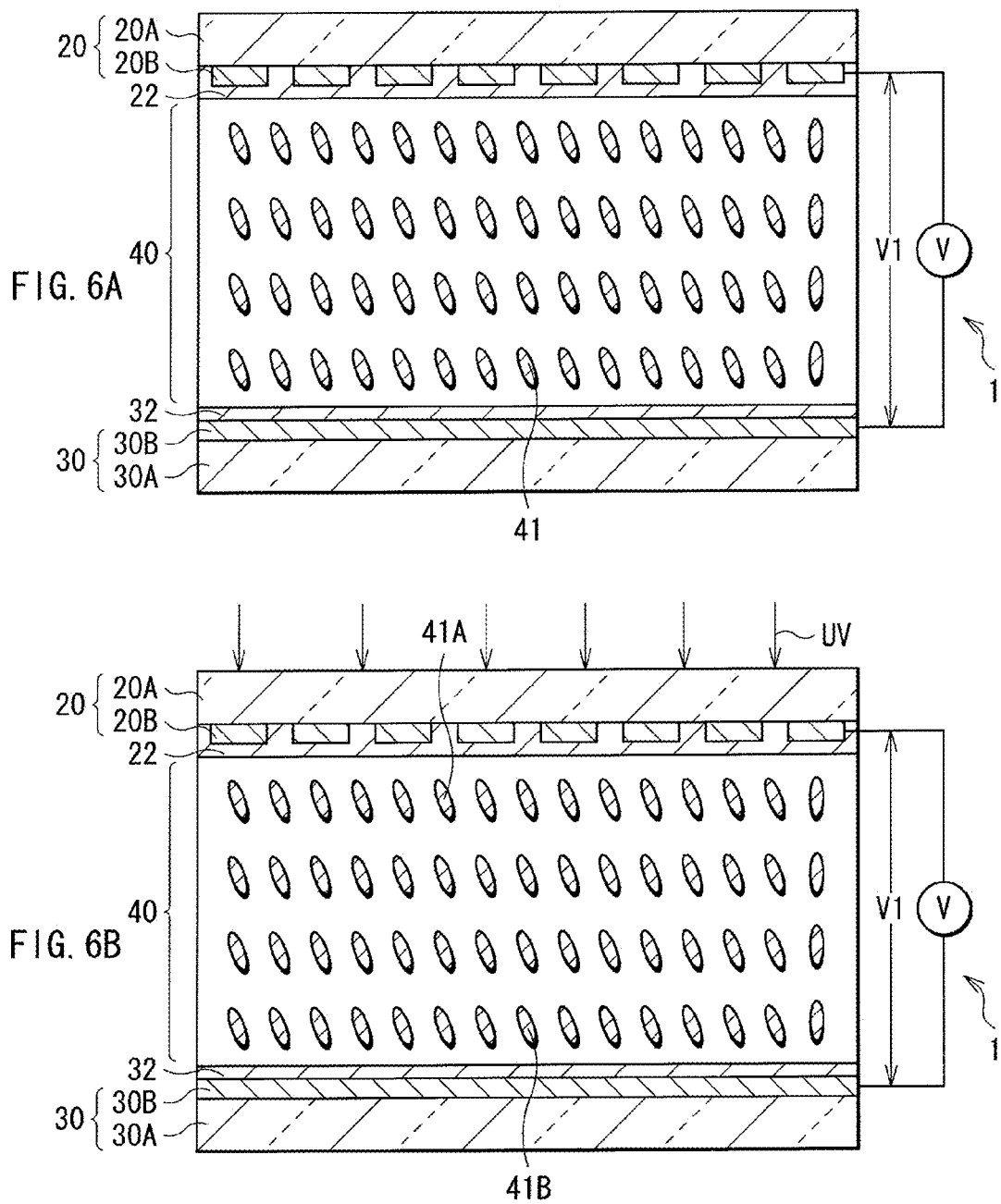
FIGS. 6A and 6B are cross-sectional schematic views for explaining a step subsequent to FIG. 5.

Next, as illustrated in FIG. 6A, a voltage V1 is applied between the pixel electrode 20B and the facing electrode 30B by using a voltage application circuit 1 (step S103). The voltage V1 is, for example, applied with a magnitude of 5 (V) to 40 (V). Thereby, the electric field is generated in the direction forming the predetermined angle to the surfaces of the glass substrates 20A and 30A, and the liquid crystal molecule 41 is oriented to tilt in the predetermined direction from the vertical direction to the glass substrates 20A and 30A. The magnitude of the voltage V1 at this time, and the pre-tilt θ2 applied to the liquid crystal molecule 41B in the subsequent step are correlated with each other. Thus, it is possible to control the angle of the pre-tilt θ2 of the liquid crystal molecule 41B by appropriately adjusting the magnitude of the voltage V1.

Further, as illustrated in FIG. 6B, in the state where the voltage V1 is applied, ultraviolet light UV is, for example, irradiated to the orientation film 32 from outside of the TFT substrate 20 so that the crosslinkable functional group held by the polymer compound in the orientation film 32 is reacted, and the polymer compound is crosslinked (step S104). As a result, the compound after the orientation treatment is formed in the orientation film 32, and the liquid crystal molecule 41B located in the vicinity of the interface of the orientation film 32 and the liquid crystal layer 40 is provided with the pre-tilt θ2 larger than 0° in the non-drive state. As the ultraviolet light UV, the ultraviolet light containing a large amount of optical components with a wavelength of about 300 nm to about 365 nm is preferable. If the ultraviolet light containing a large amount of optical components with a short wavelength range is used, there is a risk that the liquid crystal molecule 41 is photolyzed and deteriorated. In addition, here, although the ultraviolet light UV is irradiated from outside of the TFT substrate 20, the ultraviolet light UV may be irradiated from outside of the CF substrate 30, or may be irradiated from outside of the TFT substrate 20 and outside of the CF substrate 30. In this case, the ultraviolet light UV is preferably irradiated from the substrate side having a higher transmittance. Further, in the case where the ultraviolet light UV is irradiated from outside of the CF substrate 30, there is a risk that the ultraviolet light UV is absorbed in the color filter and a crosslinking reaction is hardly obtained according to the wavelength range of the ultraviolet light UV. Therefore, it is preferable to irradiate the ultraviolet light UV from outside of the TFT substrate 20.

By the above-described steps, the liquid crystal display element illustrated in FIG. 1 is completed.

1-3. Structure of Liquid Crystal Display Device

Figure 7:
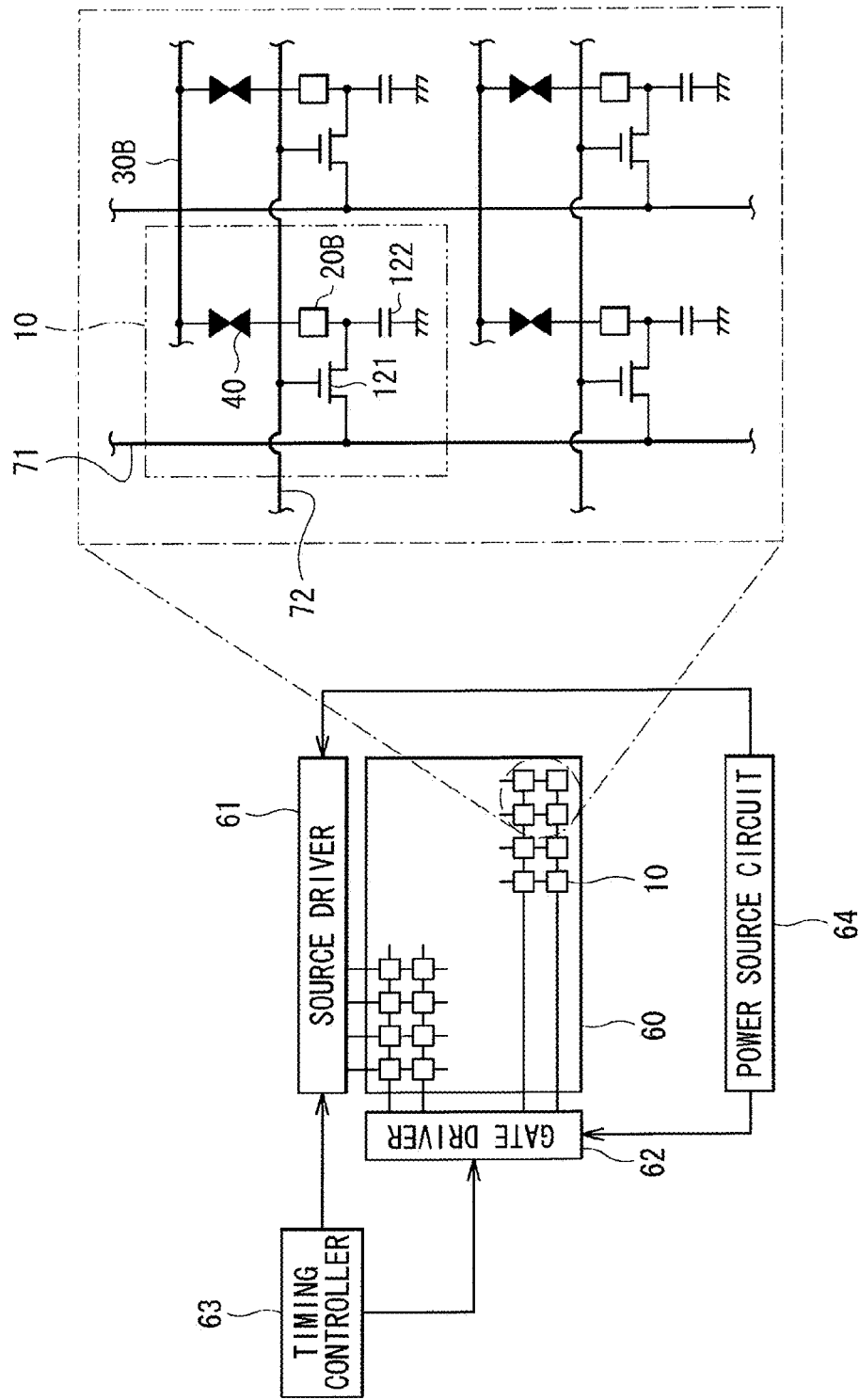
FIG. 7 is a circuit structural view of a liquid crystal display device including the liquid crystal display element illustrated in FIG. 1.

Next, with reference to FIG. 7, the structure of the liquid crystal display device including the above-described liquid crystal display element will be described. FIG. 7 illustrates the circuit structure of the liquid crystal display device including the liquid crystal display element illustrated in FIG. 1.

The liquid crystal display device of FIG. 7 includes the liquid crystal display element having the plurality of pixels 10 provided in a display region 60. In this liquid crystal display device, a source driver 61, a gate driver 62, a timing controller 63 controlling the source driver 61 and the gate driver 62, and a power source circuit 64 supplying electrical power to the source driver 61 and the gate driver 62 are provided in the surrounding of the display region 60.

The display region 60 is a region where a video is displayed, and a region where the video may be displayed by aligning the plurality of pixels 10 in the matrix. In addition, in FIG. 7, the display region 60 including the plurality of pixels 10 is illustrated, and the region corresponding to four of the pixels 10 is separately illustrated in an enlarged manner.

In the display region 60, a plurality of source lines 71 are aligned in a row direction, a plurality of gate lines 72 are aligned in a column direction, and the pixels 10 are arranged at positions where the source lines 71 and the gate lines 72 intersect each other, respectively. Each pixel 10 includes the pixel electrode 20B, the liquid crystal layer 40, a transistor 121, and a capacitor 122. In each transistor 121, a source electrode is connected to the source line 71, a gate electrode is connected to the gate line 72, and a drain electrode is connected to the capacitor 122 and the pixel electrode 20B. Each source line 71 is connected to the source driver 61, and an image signal is supplied from the source driver 61 to the source line 71. Each gate line 72 is connected to the gate driver 62, and a scanning signal is sequentially supplied from the gate driver 62 to the gate line 72.

The source driver 61 and the gate driver 62 select a specific pixel 10 in the plurality of pixels 10.

The timing controller 63 outputs, for example, the image signal (for example, each video signal of RGB corresponding to red, green, and blue), and the source driver control signal for controlling the operation of the source driver 61 to the source driver 61. Further, the timing controller 63 outputs, for example, the gate driver control signal for controlling the operation of the gate driver 62 to the gate driver 62. Examples of the source driver control single include a horizontal synchronization signal, a start pulse signal, or a clock signal for the source driver. Examples of the gate driver control signal include a vertical synchronization signal, and a clock signal for the gate driver.

In this liquid crystal display device, the video is displayed by applying the drive voltage between the pixel electrode 20B and the facing electrode 30B in the following manner. Specifically, with the input of the source driver control signal from the timing controller 63, the source driver 61 supplies the individual image signal to the predetermined source line 71 based on the image signal input from the timing controller 6. With the input of the gate driver control signal from the timing controller 63, the gate driver 62 sequentially supplies the scanning signal to the gate line 72 at the predetermined timing. Thereby, the pixel 10 located at the intersection of the source line 71 to which the image signal is supplied, and the gate line 72 to which the scanning signal is supplied is selected, and the drive voltage is applied to that pixel 10.

Figure 8:
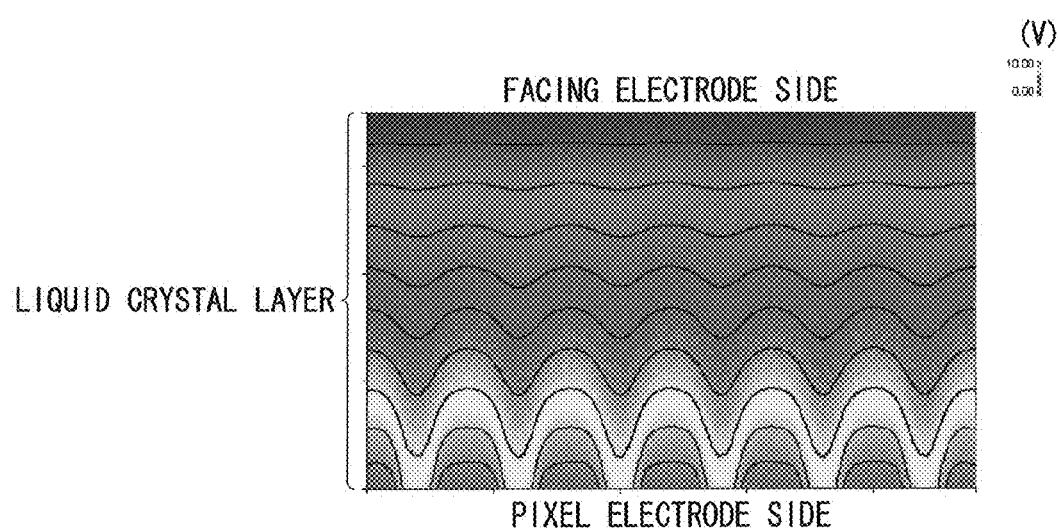
FIG. 8 is a schematic view illustrating a distribution of a potential generated in a liquid crystal layer in a cross-section along line VIII-VIII of FIG. 2.

In the selected pixel 10, when the drive voltage is applied, for example, the potential difference illustrated in FIG. 8 is generated between the pixel electrode 20B and the facing electrode 30B. FIG. 8 schematically illustrates the potential distribution of the liquid crystal layer 40 when the drive voltage is applied in the cross-section along line VIII-VIII in FIG. 2. For more detail, on the pixel electrode 20B side, the electric field is generated from the base 20B1 and the liner portion 20B2, and the non-uniform potential (electric field) distribution is thus generated in the parallel direction to the surface of the glass substrate 20A by the plurality of slits 21. In other words, on the pixel electrode 20B side, the distortion in the electric field is generated by the slits 21. Since the non-uniform potential distribution on the pixel electrode 20B side in the parallel direction to the substrate surface is provided on the whole region where the facing electrode 30B face the pixel electrode 20B, the non-uniformity in the potential distribution is reduced toward the facing electrode 30B side, and the distribution is substantially uniform in the vicinity of the facing electrode 30B. By this non-uniform potential distribution on the pixel electrode 20B side, the electric field containing the component in the oblique direction to the faces of the glass substrates 20A and 30A is applied to the liquid crystal layer 40.

The orientation state of the liquid crystal molecule 41 included in the liquid crystal layer 40 is changed according to the potential difference between the pixel electrode 20B and the facing electrode 30B. Specifically, in the liquid crystal layer 40, from the state before the drive voltage is applied as illustrated in FIG. 1, the liquid crystal molecules 41A and 41C are tilted in the tilt direction of the liquid crystal molecule 41B together with the liquid crystal molecule 41B located in the vicinity of the orientation film 32 by the applied drive voltage. As a result, the liquid crystal molecule 41 responds to take a posture approximately horizontal (parallel) to the TFT substrate 20 and the CF substrate 30. Thereby, the optical characteristics of the liquid crystal layer 40 are changed, and the light incident on the liquid crystal display element becomes the modulated emission light. A gradation is expressed based on that emission light, and the video is thus displayed.

Next, actions and effects of the liquid crystal display element and the liquid crystal display device of this embodiment will be described in comparison with the liquid crystal display element and the liquid crystal display device of the related art.

In the liquid crystal display element and the liquid crystal display device including the same of the related art on which the process to provide the pre-tilt angle larger than 0° is not performed at all (hereinafter, simply referred to as a pre-tilt treatment), even if the substrate including the electrode (hereinafter, referred to as a slit electrode) like the pixel electrode 20B, in which the slits for regulating the orientation of the liquid crystal molecule by the distortion of the electric field is provided, when the drive voltage is applied, the liquid crystal molecule oriented in the vertical direction to the substrate is tilted so that the director of the liquid crystal molecule is directed in the arbitrary direction in the in-plane direction of the substrate.

Figure 20:
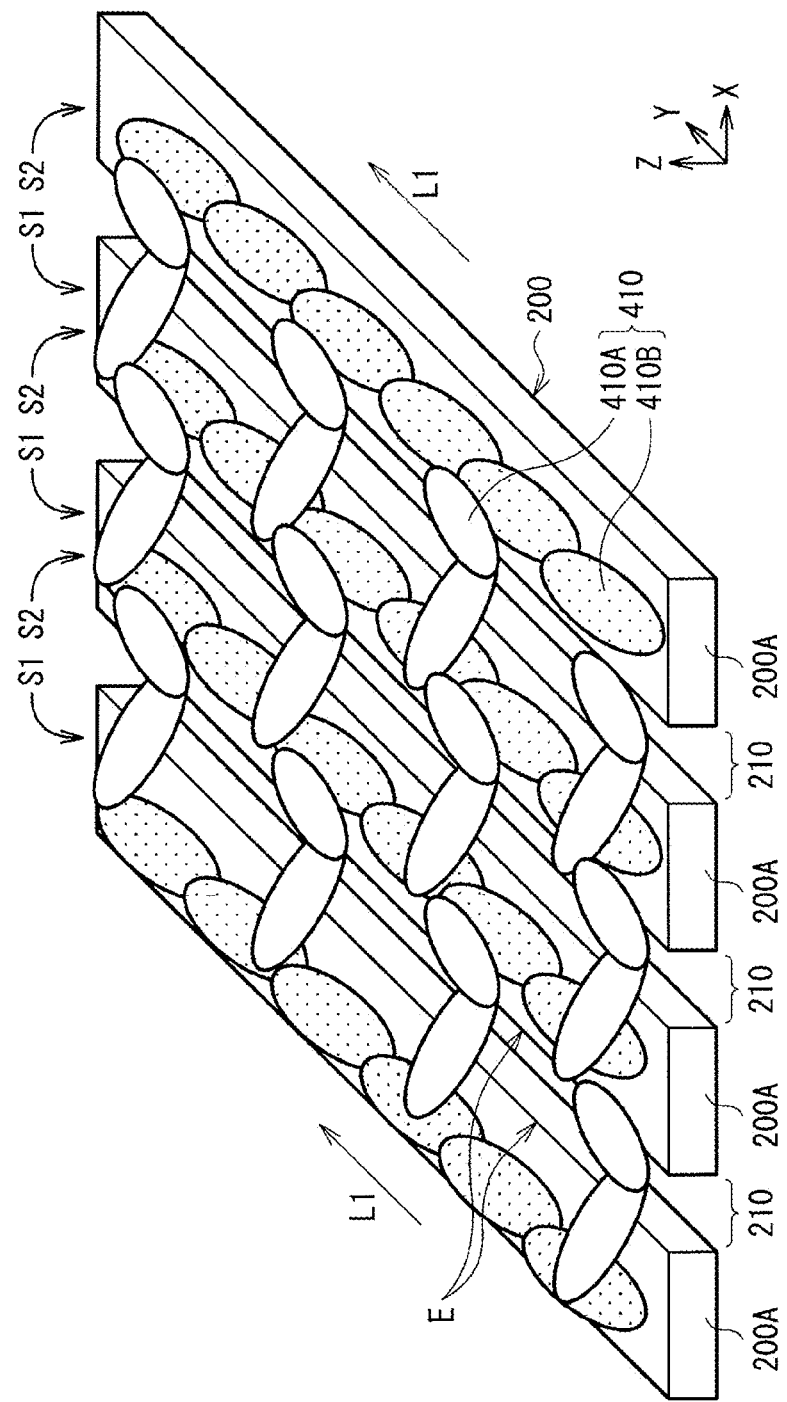
FIG. 20 is a perspective view for explaining movement of a liquid crystal molecule in the vicinity of a slit electrode in a liquid crystal display element of the related art.

Specifically, as illustrated in FIG. 20, a liquid crystal molecule 410 in the vicinity of a slit electrode 200 is classified into a liquid crystal molecule 410A located in the vicinity of a slit 210, and a liquid crystal molecule 410B located in the vicinity of a linear portion 200A of the slit electrode 200, and it is considered that the liquid crystal molecules 410A and 410B are tilted toward the orientations different from each other when the drive voltage is applied. The liquid crystal molecule 410A located in the vicinity of the slit 210 is tilted in a width direction (a direction S1 or a direction S2) of the slit 210 by the oblique electric field generated from an edge portion E of the linear portion 200A. At this time, the liquid crystal molecule 410B located in the vicinity of the linear portion 200A is tilted along the extending direction (direction L1) of the linear portion 200A, and the director of the liquid crystal molecule 410B is oriented along the direction L1. Thereafter, the liquid crystal molecule 410A tilted in the direction S1 or the direction S2 is aligned with the orientation of the liquid crystal molecule 410B so that the director of the liquid crystal molecule 410A is rotated to be parallel to the direction L1. In other words, when the drive voltage is applied, the liquid crystal molecule 410B located in the vicinity of the linear portion 200A is oriented so that the director of the liquid crystal molecule 410B is tilted to be parallel to the direction L1. Meanwhile, the liquid crystal molecule 410A located in the vicinity of the slit 210 is oriented to tilt while being twisted and rotated so that the director of the liquid crystal molecule 410A is parallel to the direction L1. In addition, in the same manner as the liquid crystal display element of this embodiment, in the case where the pixel electrode is the slit electrode, and the facing electrode is the electrode not provided with the slits (hereinafter, referred to as a solid electrode), since the oblique components of the electric field are reduced on the facing electrode side, the liquid crystal molecule located in the vicinity of the facing electrode is tilted so that the director of the liquid crystal molecule is directed in the arbitrary orientation, and then the liquid crystal molecule is oriented in the extending direction (corresponding to the direction L1 illustrated in FIG. 20) of the linear portion in the slit electrode. In this manner, in the liquid crystal molecule responding to the drive voltage, the orientation of the director of each liquid crystal molecule is shifted, and the orientation is disordered as a whole. Thereby, the response speed until the liquid crystal molecule takes the predetermined orientation corresponding to the drive voltage is reduced, and the display characteristics are deteriorated. As a result, the response characteristics are deteriorated.

Further, in other liquid crystal display elements, and other liquid crystal display devices of the related art, the liquid crystal molecules located in the vicinity of the both substrates are provided with the same pre-tilt angles larger than 0°. By performing the pre-tilt treatment, the disorder of the orientation of the whole liquid crystal molecules responding to the drive voltage is more controlled in comparison with the liquid crystal display element of the related art on which the pre-tilt treatment is not performed, and the response speed is improved. However, in this liquid crystal display element, since the liquid crystal molecule is oriented to slightly tilt to the substrate normal even in the non-drive state (black display state), although the response speed is improved, the light slightly transmits at the time of the black display, and the contrast is reduced. Further, in the method of manufacturing the liquid crystal display element, after the liquid crystal layer is formed by using the liquid crystal material containing a monomer or the like having the photo-polymerizability, the monomer is polymerized by the light irradiation while the liquid crystal molecule in the liquid crystal layer is oriented in the predetermined direction while containing the monomer. The polymer formed in this manner provides the pre-tilt angle larger than 0° to the liquid crystal molecule. However, in the manufactured liquid crystal display element, the unreacted monomer having the photo-polymerizability remains in the liquid crystal layer, and the reliability is reduced. Further, it is necessary to increase the light irradiation time to reduce the unreacted monomer, and this increases the time (tact) for the manufacture.

On the other hand, in the liquid crystal display element and the liquid crystal display device of this embodiment, the TFT substrate 20 includes the pixel electrode 20B provided with the plurality of slits 21, as the structure generating the distortion in the electric field, and the CF substrate 30 includes the facing electrode 30B provided in the whole region facing the pixel electrode 20B. The liquid crystal molecule 41A located on the TFT substrate 20 side is oriented in the vertical direction to the glass substrates 20A and 30A, and the liquid crystal molecule 41B located on the CF substrate 30 side has the pre-tilt $\theta2$ ($\theta2>0°$). The liquid crystal molecule 41B is provided with the pre-tilt $\theta2$, and the response speed to the drive voltage is thus improved. The liquid crystal molecule 41A is oriented in the vertical direction to the glass substrates 20A and 30A, and the transmittance of the light in the black display state is thus reduced. Therefore, the response characteristics are more ensured, and the contrast may be more improved in comparison with the liquid crystal display element of the related art in which the pre-tilt treatment is not performed, and other liquid crystal display elements of the related art in which the liquid crystal molecule located in the vicinity of both of the substrates are provided with the pre-tilt angle larger than 0°.

In this case, the orientation film 32 contains the compound after the orientation treatment in which the polymer compound having the crosslinkable functional group as the side chain is crosslinked or the like, and the liquid crystal molecule 41B is provided with the pre-tilt $\theta2$ by this compound after the orientation treatment. Thus, even if the liquid crystal layer 40 is formed without using the liquid crystal material to which the monomer is added as described above, the orientation film 32 may provide the pre-tilt $\theta2$ to the liquid crystal molecule 41B, and the reliability may be improved. It is possible to suppress the tact from being long. Further, the liquid crystal molecule 41B may be favorably provided with the pre-tilt $\theta2$ without using the technique of the related art for providing the pre-tilt $\theta2$ to the liquid crystal molecule, such as the rubbing process. Thus, the reduction of the contrast caused by rubbing scratches on the orientation film, disconnection of the wiring caused by static electricity during the rubbing, the reduction of the reliability caused by a foreign material, and the like as being the issues of the rubbing process are hardly generated.

Here, as a reference example, the case of the liquid crystal display element in which the liquid crystal molecule located on the substrate side including the pixel electrode (slit electrode) with the plurality of slits is provided with the pre-tilt angle larger than 0°, and the liquid crystal molecule located on the substrate side having the facing electrode (solid electrode) provided in the whole region facing that pixel electrode is vertically oriented to the substrate surface will be described. In the liquid crystal display element of the reference example, the liquid crystal molecule located in the vicinity of the pixel electrode is provided with the pre-tilt angle larger than 0°, and the response speed to the drive voltage is thus faster compared with the case where the pre-tilt treatment is not performed (the liquid crystal display element of the related art). However, even if the liquid crystal molecule located in the vicinity of the pixel electrode is provided with the pre-tilt angle larger than 0°, it is considered that this liquid crystal molecule operates in the same manner as illustrated in FIG. 20 when the drive voltage is applied. As a result, the orientation is disordered as a whole, and the sufficient response speed is unlikely to be obtained in the liquid crystal molecule responding to the drive voltage. The disorder of the orientation of the liquid crystal molecules as a whole when the drive voltage is applied is conspicuously generated in the case where a high drive voltage is applied in particular. Further, in the liquid crystal display element of the reference example, for example, even if the pre-tilt treatment is performed on the liquid crystal molecule located in the vicinity of the pixel electrode by using the above-described orientation agent of the orientation film 32 in the same manner as this embodiment, the movement of the tilted liquid crystal molecule is different in the vicinity of the slit, and in the vicinity of the liner portion of the pixel electrode, and the tilt direction of the pre-tilt angle thus tends to be in the arbitrary direction. Thereby, the sufficient response characteristics are hardly obtained, and the disorder in the orientation of the liquid crystal molecules as a whole is caused in the black display state. This results in the reduction of the contrast.

On the other hand, in this embodiment, the liquid crystal molecule 41B located on the CF substrate 30 side is provided with the pre-tilt $\theta2$ by the orientation film 32. Thereby, the tilt direction of the pre-tilt $\theta2$ of the liquid crystal molecule 41B is easily aligned, and the disorder of the orientation of the liquid crystal molecules 41 as a whole is more hardly generated when the drive voltage is applied, and in the non-drive state, and the response characteristics and the contrast may be improved, in comparison with the reference example. Anchoring effects to the liquid crystal molecule 41B is more strongly exhibited when the liquid crystal molecule 41B is provided with the pre-tilt $\theta2$ compared with the case where the liquid crystal molecule 41A is provided with the pre-tilt angle larger than 0° in particular, and the response speed (the fall response speed) of the liquid crystal molecule 41 in the case where the drive voltage is applied and then the non-drive state is adopted.

1-4. Another Structure of Liquid Crystal Display Element

Figure 9:
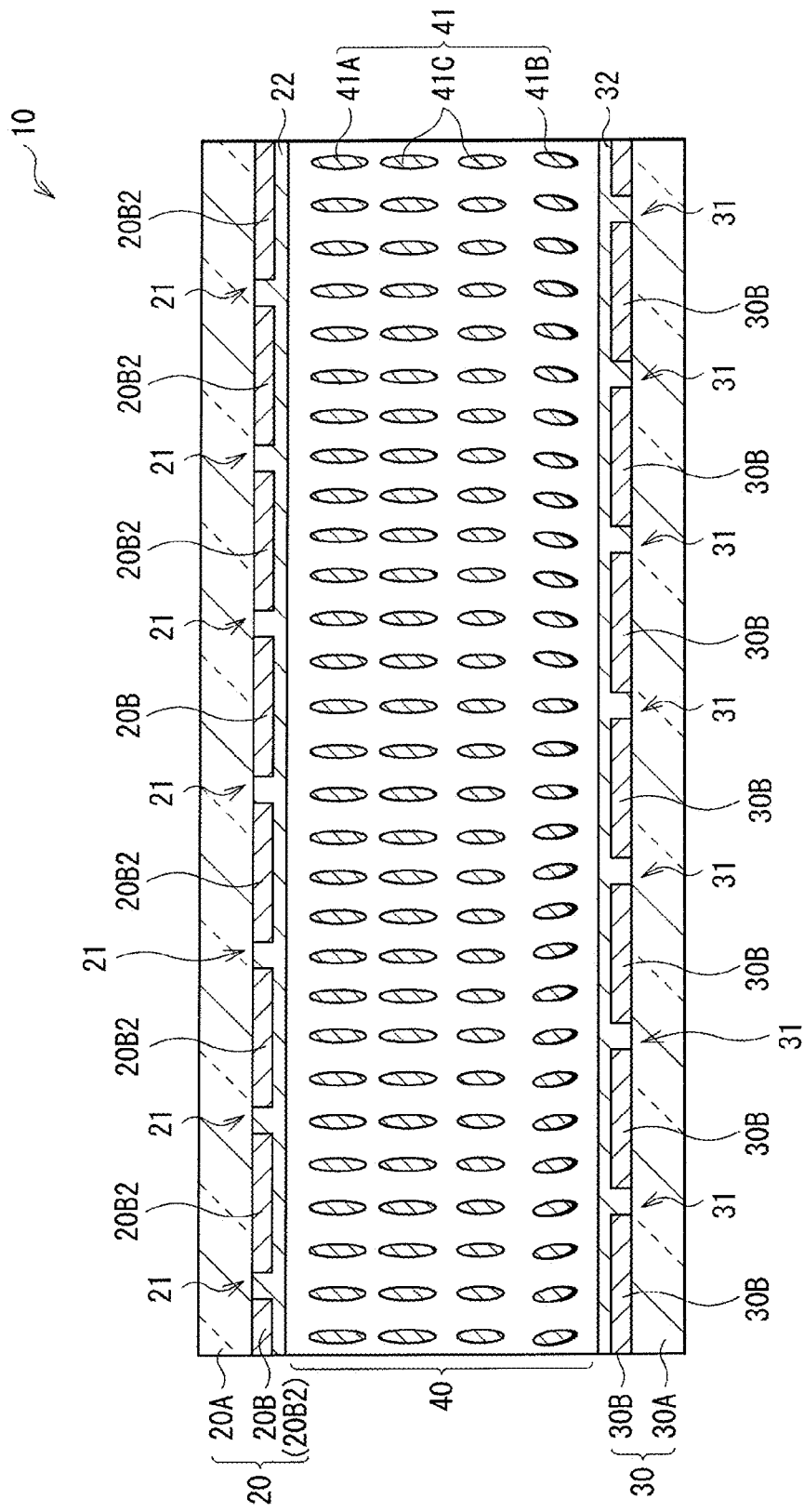
FIG. 9 is another cross-sectional schematic view of the liquid crystal display element in the first embodiment.
Figure 10A:
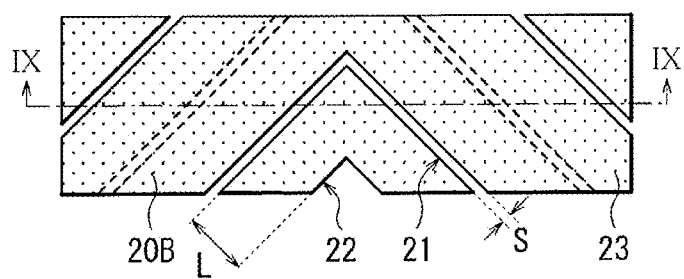
FIGS. 10A and 10B are schematic views illustrating the plan structure of the pixel electrode and a facing electrode illustrated in FIG. 9.
Figure 10B:
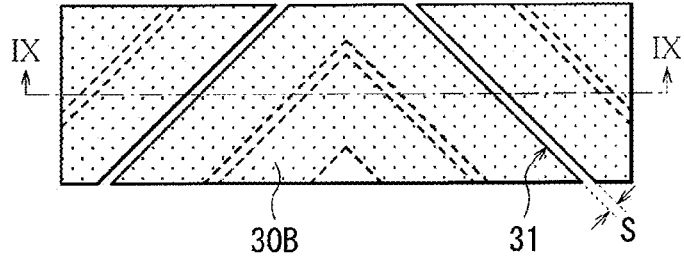

FIG. 9 illustrates another structure of the liquid crystal display element according to this embodiment, and illustrates a cross-section corresponding to FIG. 1. FIG. 10 schematically illustrates a plan structure of a main part of the pixel electrode (A) and the facing electrode (B) in FIG. 9. In addition, FIG. 9 corresponds to the cross-section along line IX-IX in FIGS. 10A and 10B. This liquid crystal display element has the same structure as the liquid crystal display element illustrated in FIG. 1 except that the structures of the pixel electrode 20B provided in the TFT substrate 20 and the facing electrode 30B provided in the CF substrate 30 are different. Here, not only the pixel electrode 20B is provided with the slit 21, but also the facing electrode 30B is provided with the slit 31.

As illustrated in FIG. 10A, in the pixel electrode 20B, the plurality of slits 21 extending in the oblique direction (the direction tilted to the longitudinal direction) in the plane of the TFT substrate 20 is provided in each pixel. Part of the slits 21 of the plurality of slits 21 have V-shaped formation patterns, and the other slits 21 are aligned in parallel to the V-shaped slits 21. However, in the pixel electrode 20B, a depression 22 controlling the orientation of the liquid crystal molecule 41 is provided inside of the V-shaped slit 21. In this manner, by providing the plurality of slits 21, the distortion is generated in the electric field when the drive voltage is applied as described above. In addition, the width S of the slit 21, the number of slits 21, and the width L of the pixel electrode 20B (portion where the slit 21 is not provided) may be arbitrarily set. Among them, the width S is preferably 2 μm to 10 μm both inclusive, and the width L is preferably 30 μm to 180 μm both inclusive.

As illustrated in FIG. 10B, in the facing electrode 30B, the plurality of slits 31 extending in the oblique direction in the plane of CF substrate 30 are provided in each pixel. The formation pattern (including the width S of the slit 31) of this slit 31 is, for example, the same as the formation pattern of the slit 21 provided in the pixel electrode 20B. Accordingly, the orientation film 32 is provided on the surface on the liquid crystal layer 40 side of the CF substrate 30, to cover the facing electrode 30B and the slit 31.

The positional relationship of the slit 21 provided in the pixel electrode 20B, and the slit 31 provided in the facing electrode 30B is not specifically limited. In other words, as illustrated in FIGS. 9, 10A, and 10B, the positions of the slits 21 and 31 may be shifted in the substrate surfaces of the TFT substrate 20 and the CF substrate 30, or may be coincident with each other. If the slits 21 and 31 exist, the distortion in the electric field is generated without depending on the positional relationship of the slits 21 and 31. In addition, the expression "the positions of the slits 21 and 31 may be shifted" means that the slits 21 and 31 do not face each other with the liquid crystal layer 40 in between. Meanwhile, the expression "the positions of the slits 21 and 31 may be coincident with each other" means that the slits 21 and 31 face each other with the liquid crystal layer 40 in between.

As illustrated in FIGS. 9, 10A, and 10B, the positions of the slits 21 and 31 are preferably shifted. Thereby, the distortion in the electric field is likely to be generated, and the oblique electric field is likely to be applied to the liquid crystal molecule 41 in the longitudinal direction. In addition, the slit 31 provided in the facing electrode 30B is illustrated with a broken line in FIG. 10A, and the slit 21 provided in the pixel electrode 20B is illustrated with a broken line in FIG. 10B. The shaded regions in FIGS. 10A and 10B represent the region where the pixel electrode 20B (the portion provided with the slit 21), and the facing electrode 30B (the portion provided with the slit 31) are overlapped with each other.

Figure 11:
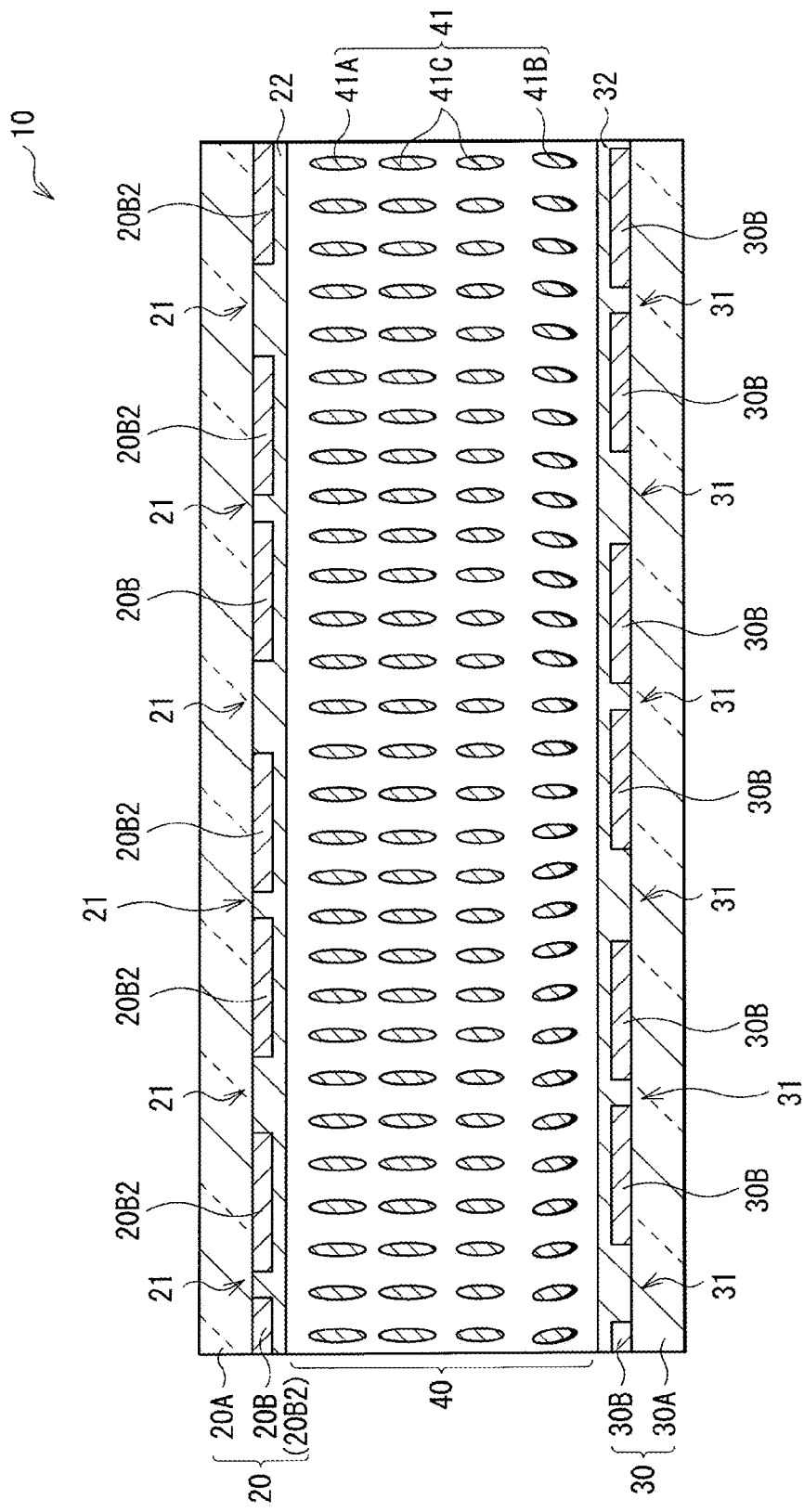
FIG. 11 is a cross-sectional schematic view of the liquid crystal display element according to another structural example of FIG. 9.

In addition, in the case where the positions of the slits 21 and 31 are coincident with each other, the width S of the slit 21 and the width S of the slit 31 are preferably different from each other. Thereby, the position of the edge of the pixel electrode 20B, and the position of the edge of the facing electrode 30B are shifted, and the oblique electric field is likely to be applied to the liquid crystal molecule 41. In this case, the width S of the slit 21 may be wider than the width S of the slit 31, may be the other way around, or aspects of these may be mixed. As illustrated in FIG. 11, the size relation between the width S of the slit 21 and the width S of the slit 31 is preferably alternately reversed. Thereby, the oblique electric field or the like is likely to be easily applied to the liquid crystal molecule 41 uniformly.

This liquid crystal display element may be manufactured in the same manner as the liquid crystal display element illustrated in FIG. 1 except that the pixel electrode 20B and the facing electrode 30B illustrated in FIGS. 9, 10A, and 10B are used in substitution for the pixel electrode 20B and the facing electrode 30B illustrated in FIGS. 1 and 2. This liquid crystal display element is applicable to the liquid crystal display device illustrated in FIG. 7.

In the liquid crystal display element and the liquid crystal display device, the TFT substrate 20 includes the pixel electrode 20B provided with the plurality of slits 21, as the structure generating the distortion in the electric field, and in the same manner, the CF substrate 30 includes the facing electrode 30B provided with the plurality of slits 31. The liquid crystal molecule 41A located on the TFT substrate 20 side is oriented in the vertical direction to the glass substrates 20A and 30A, and the liquid crystal molecule 41B located on the CF substrate 30 side has the pre-tilt θ2 (θ2>0°). Thereby, the response speed to the drive voltage is improved, and the transmittance of the light in the black display state is reduced, in the same manner as the case where only the pixel electrode 20B is provided with the plurality of slits 21. Therefore, the response characteristics are ensured, and the contrast may be improved.

In particular, only the pixel electrode 20B is provided with the plurality of slits 21, but also the facing electrode 30B is provided with the plurality of slits 31, and the oblique electric field is thus more easily applied to the liquid crystal molecule 41 compared with the case where only the pixel electrode 20B is provided with the plurality of slits 21. Therefore, the response characteristics may be more improved.

Actions and effects of the liquid crystal display element and the liquid crystal display device other than those described here are the same as the case where only the pixel electrode 20B is provided with the plurality of slits 21.

Next, other embodiments and modifications will be described. Same reference numerals as in the first embodiment will be used for substantially identical components, and therefore description will be omitted.

2. Second Embodiment (Example of Another Liquid Crystal Display Element and Another Liquid Crystal Display Device)

2-1. Structure or the Like of Liquid Crystal Display Element

Figure 12:
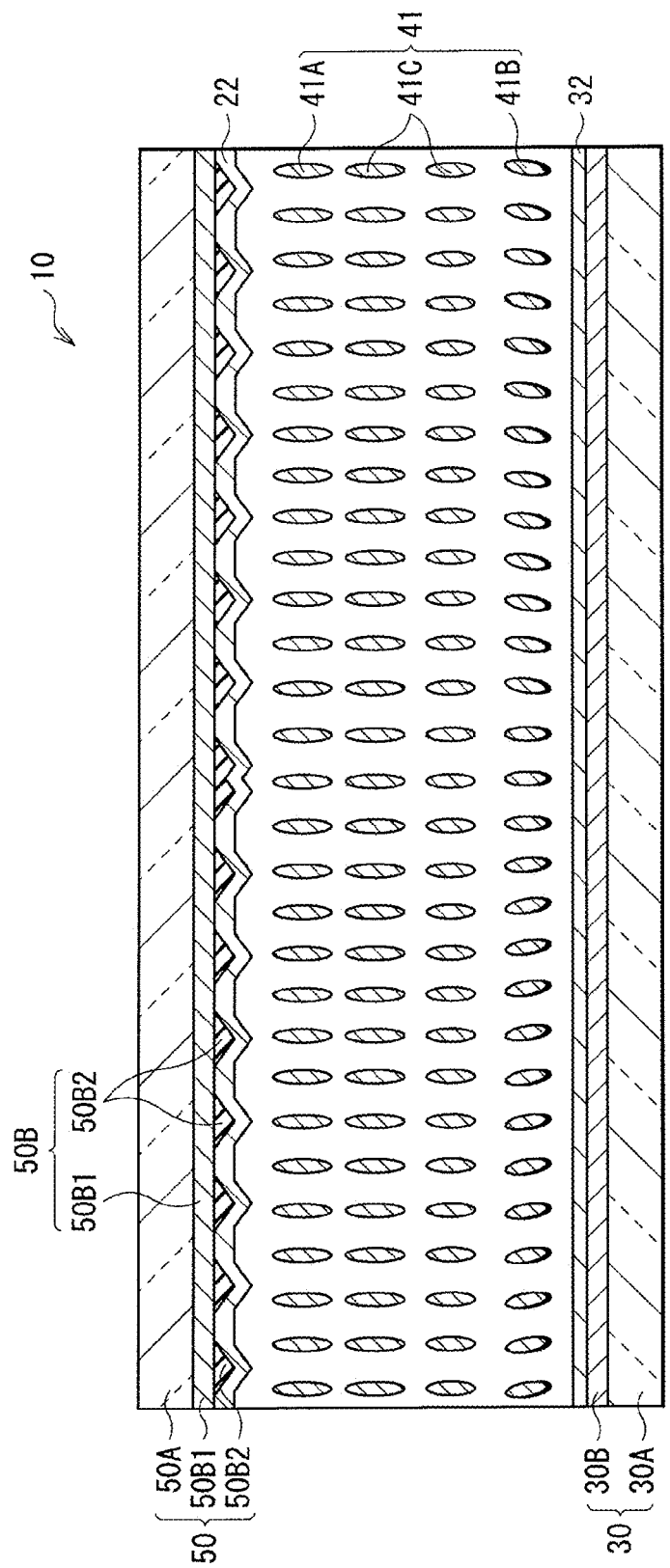
FIG. 12 is a cross-sectional structural view of the liquid crystal display element according to a second embodiment.
Figure 13:
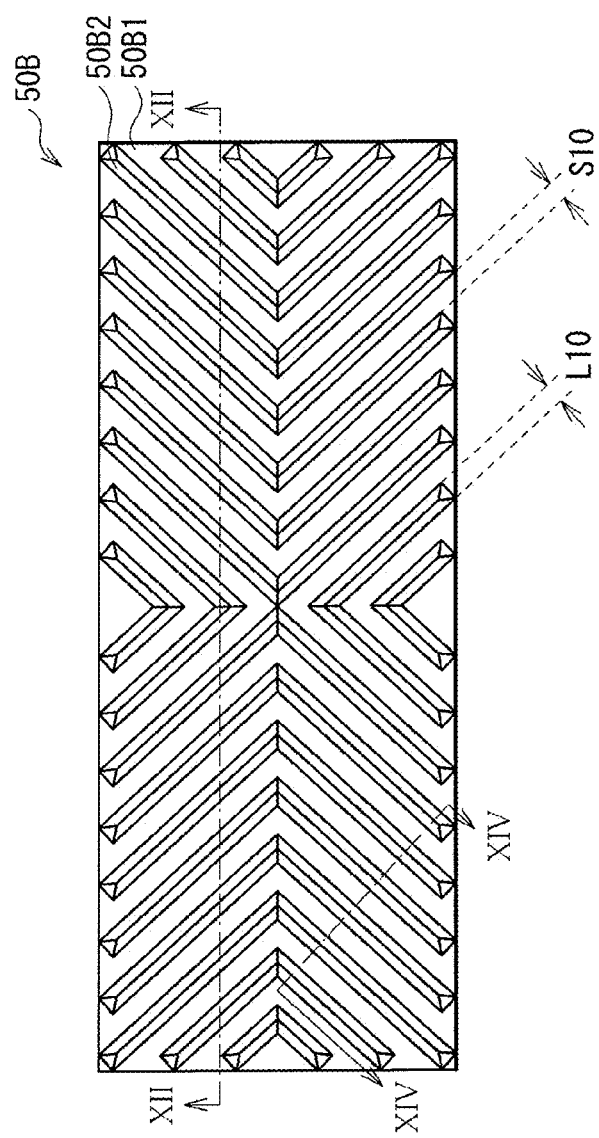
FIG. 13 is a schematic view illustrating the plan structure of the pixel electrode illustrated in FIG. 12.
Figure 14:
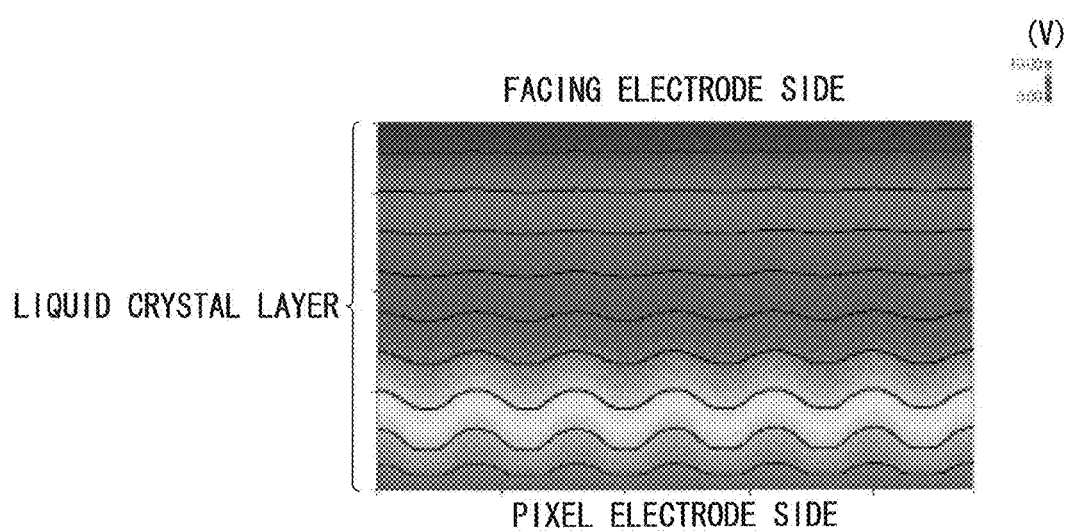
FIG. 14 is a schematic view illustrating the distribution of the potential generated in the liquid crystal layer in the cross-section along line XIV-XIV of FIG. 13.

FIG. 12 schematically illustrates a cross-sectional structure of a liquid crystal display element according to a second embodiment. FIG. 13 schematically illustrates a plan structure of the pixel electrode illustrated in FIG. 12. In addition, FIG. 12 corresponds to the cross-section along line XII-XII in FIG. 13. FIG. 14 schematically illustrates the potential distribution of the liquid crystal layer when the drive voltage is applied in the cross-section along line XIV-XIV in FIG. 13. In this embodiment, the structure is the same as that of the above-described embodiment except that the structure of a pixel electrode 50B provided in a TFT substrate 50 is different.

In the TFT substrate 50, for example, the plurality of pixel electrodes 50B are arranged in the matrix on the surface of a glass substrate 50A, facing the CF substrate 30 in each pixel

10. Further, in the TFT substrate 50, like the TFT substrate 20, the TFT switching elements for driving the plurality of pixel electrodes 50B, respectively, and the gate lines, the source lines, and the like (not illustrated in the figure) connected to the TFT switching element are provided.

The pixel electrode 50B includes a conductive layer 50B1 provided over the whole surface in each pixel 10, and a plurality of projections 50B2 provided to partially cover the conductive layer 50B1 with a predetermined pattern in this order from the glass substrate 50A side. The conductive layer 50B1 is constituted of a conductive material having transparency, such as ITO, and the projection 50B2 is constituted of one or more kinds of dielectric bodies. Thereby, when the drive voltage is applied, the stronger electric field is generated in an exposed face (a region not covered with the projection 50B2) of the conductive layer 50B1 compared with a region covered with the projection 50B2. Thus, in the vicinity of the pixel electrode 50B, the non-uniform potential distribution is generated in the parallel direction to the surface of the glass substrate 50A and the distortion in the electric field is generated. By this distortion of the electric field, the oblique electric field is applied to the liquid crystal molecule 41 in the long axis direction.

The formation pattern of the projection 50B2 is not specifically limited. For example, the cross-sectional shape of each projection 50B2 in the width direction may be a triangle or a rectangular, or a contour of the cross-section may be rounded. Further, for example, the plan shape of each projection 50B2 may be a straight line, or a V-shape. Further, for example, the plurality of projections 50B2 may be arranged in stripes, or may be radially arranged from the middle of the conductive layer 50B1 toward the parallel direction to the surface of the conductive layer 50B1. In FIG. 13, the cross-sectional shape of each projection 50B2 in the width direction is the triangle, the plan shape of each projection 50B2 extends in the V-shape on the surface of the conductive layer 50B1 on the liquid crystal layer 40 side, and the plurality of projections 50B2 are arranged to be away from each other with a predetermined interval S10 in between. Thereby, four regions including the exposed faces of the conductive layers 50B1 with different longitudinal directions are formed, and the regions each in which the orientation of the liquid crystal molecule 41 is different from each other when the drive voltage is applied are formed. In other words, the distortion of the electric field generated by the pixel electrode 50B also regulates the orientation of the liquid crystal molecule 41 when the drive voltage is applied.

A width L10, the height, and the number of the projection 50B2, or the interval (a width of the exposed face of the conductive layer 50B1) S10 of the projection 50B2 may be arbitrarily set. The width L10 of the projection 50B2 is preferably 1 μm to 20 μm both inclusive, and the interval S10 of the projection 50B2 is preferably 1 μm to 20 μm both inclusive. Thereby, in the case where the drive voltage is applied, the oblique electric field to favorably orient the whole liquid crystal molecules 41 is easily applied, and processing the projection 50B2 is easy, thereby ensuring the sufficient yield rate. Specifically, when the width L10 and the interval S10 are smaller than 1 μm, it is difficult to form the projection 50B2, and it is difficult to ensure the sufficient yield rate. Meanwhile, when the width L10 and the interval S10 are larger than 20 μm, the favorable oblique electric field is hard to be generated between the pixel electrode 50B and the facing electrode 30B in the case where the drive voltage is applied, and the orientation of the whole liquid crystal molecules 41 is easily slightly disordered. In particular, the width L10 is preferably 2 μm to 10 μm both inclusive, and the interval S10 is preferably 2 μm to 10 μm both inclusive. The width L10 and the interval S10 are more preferably 4 μm. Thereby, the sufficient yield rate may be ensured, and the orientation of the whole liquid crystal molecules 41 in the case where the drive voltage is applied becomes favorable.

Further, the height of the projection 50B2 is preferably 0.2 μm to 1 μm both inclusive. Thereby, it is possible to obtain more excellent response characteristics and contrast within that range. Specifically, when the height of the projection 50B2 is smaller than 0.2 μm, the sufficient distortion of the electric field is hard to be generated when the drive voltage is applied, and the response characteristics are likely to be reduced in comparison with the case where the height of the projection 50B2 is 0.2 μm or larger. Further, when the height of the projection 50B2 is larger than 1 μm, a large concavo-convex is easily generated on the surface of the orientation film 22, and the pre-tilt θ1 of the liquid crystal molecule 41 is likely to be larger than 0°. Thus, there is a risk that the transmittance of the light in the black display state is increased, and the contrast is likely to be reduced.

Although the projection 50B2 may be constituted of the dielectric body, the projection 50B2 may contain materials other than the dielectric body as long as the projection 50B2 serves as the dielectric body (that is, as long as the projection 50B2 has insulating properties). Examples of the dielectric body contained in the projection 50B2 include an inorganic insulating material and an organic insulating material. These materials may be porous, or may not be porous. Examples of the inorganic material include the following materials. They are silicon oxide ($SiO_2$ (relative dielectric constant≅4 to 5, heat resistance temperature>1000° C.)), fluorine-containing silicon oxide (SiOF:FSG (relative dielectric constant=3.4 to 3.6, heat resistance temperature>750° C.)), silicon nitride ($Si_3N_4$ (relative dielectric constant≅6)), borosilicate glass ($SiO_2$—$B_2O_3$ to SiOB:BSG (relative dielectric constant=3.5 to 3.7)), Si—H containing silicon oxide (HSQ (relative dielectric constant=2.8 to 3.0 or <2.0, heat resistance temperature≅400° C.), or porous silica (carbon-containing silicon oxide (relative dielectric constant<3.0)). Examples of the organic material include the following materials. They are a silicon oxide material such as carbon-containing silicon oxide (SiOC (relative dielectric constant=2.7 to 2.9, heat resistance temperature≅700° C.)), a methyl group containing silicon oxide (MSQ (relative dielectric constant=2.7 to 2.9, heat resistance temperature≅700° C.)), or porous methyl group containing silicon oxide (porous MSQ (relative dielectric constant=2.4 to 2.7)), an organic polymer material such as a fluorine resin such as polytetrafluoroethylene (relative dielectric constant 2.0 to 2.4), polyimide (relative dielectric constant=3.0 to 3.5, heat resistance temperature≅450° C.), polyallylether (relative dielectric constant≅2.8, heat resistance temperature>400° C.), or a parylene polymer compound (relative dielectric constant=2.7 to 3.0, heat resistance temperature≅400° C.), and fluorine-doped amorphous carbon (relative dielectric constant<2.5). The dielectric body may be a photoresist material or a printing resist material.

As the dielectric body, the following materials may be specifically cited. Examples of the carbon-containing silicon oxide include HSG-R7 (non-dielectric constant=2.8, heat resistance temperature=650° C.) manufactured by Hitachi Chemical Co., Ltd, Black Diamond (relative dielectric constant=2.4 to 3.0, heat resistance temperature=450° C.) manufactured by Applied Materials, Inc., p-MTES (relative dielectric constant=3.2) manufactured by Hitachi Development Co., Ltd, CORAL (relative dielectric constant=2.4 to 2.7, heat resistance temperature=500° C.) manufactured by Novellus Systems, Inc., or Aurora (relative dielectric constant=2.7, heat resistance temperature=450° C.) manufactured by ASM Japan K.K. Examples of a methyl group containing silicon oxide include OCDT-9 (relative dielectric constant=2.7, heat resistance temperature=600° C.) manufactured by Tokyo Ohka Kogyo Co., Ltd., LKD-T200 (relative dielectric constant=2.5 to 2.7, heat resistance temperature=450° C.) manufactured by JSR Co., Ltd., HOSP (relative dielectric constant=2.5, heat resistance temperature=550° C.) manufactured by Honeywell Electronic Materials, Inc., HSG-RZ25 (relative dielectric constant=2.5, heat resistance temperature=650° C.) manufactured by Hitachi Chemical Co., Ltd., OCLT-31 (relative dielectric constant=2.3, heat resistance temperature=500° C.) manufactured by Tokyo Ohka Kogyo Co., Ltd., or LKD-T400 (relative dielectric constant=2.0 to 2.2, heat resistance temperature=450° C.) manufactured by JSR Co., Ltd. Examples of the porous methyl group containing silicon oxide include HSG-6211X (relative dielectric constant=2.4, heat resistance temperature=650° C.) or HSG-6210X (relative dielectric constant=2.1, heat resistance temperature=650° C.) manufactured by Hitachi Chemical Co., Ltd., ALCAP-S (dielectric constant=1.8 to 2.3, heat resistance temperature=450° C.) manufactured by Asahi Kasei Co., OCLT-77 (relative dielectric constant=1.9 to 2.2, heat resistance temperature=600° C.) manufactured by Tokyo Ohka Kogyo Co., Ltd., or silica aerogel (relative dielectric constant 1.1 to 1.4) manufactured by Kobe Steel, Ltd. Examples of the organic polymer material include SiLK (non-dielectric constant=2.7, heat resistance temperature>490° C., dielectric breakdown resistance=4.0 MV/Vm to 5.0 MV/Vm) manufactured by The Dow Chemical Co., FLARE (polyallylether material, non-dielectric constant=2.8, heat resistance temperature>400° C.) manufactured by Honeywell Electronic Materials, Inc. In addition to those described above, the examples of the porous organic material include PolyELK (relative dielectric constant<2, heat resistance temperature=490° C.) manufactured by Air Productsand Chemicals, Inc.

The dielectric body constituting the projection 50B2 preferably has the dielectric constant smaller than the dielectric constant $\in\perp$ in the whole liquid crystal molecules 41. Thereby, when the drive voltage is applied, the orientation of the liquid crystal molecule 41 is more preferable, and more excellent response characteristics may be obtained. Specifically, if the dielectric constant of the dielectric body is larger than the dielectric constant $\xi\perp$ of the liquid crystal molecule 41, the orientation of the liquid crystal molecule 41 is likely to be disordered when the drive voltage is applied.

Further, the dielectric body constituting the projection 50B2 is preferably the photoresist material and the printing resist material. Thereby, the manufacture steps may be simplified. Moreover, the spacer projection for ensuring the cell gap may be formed together with the projection 50B2, and the manufacture steps may be more simplified. In the case where the projection 50B2 and the spacer projection are formed together, the dielectric body is preferably a positive photosensitive resin.

The liquid crystal display element of this embodiment may be manufactured in the same manner as the liquid crystal display element of the first embodiment except that the formation method of the TFT substrate 50 is different. This liquid crystal display element is applicable to the liquid crystal display device.

When the TFT substrate 50 is formed, first, for example, the conductive layer 50B1 is provided in the matrix on the surface of the glass substrate 50A. Next, the dielectric film is formed to cover the conductive layer 50B1 through coating method, heat CVD (chemical vapor deposition) method, or plasma CVD method. Next, after the predetermined resist pattern is formed on the dielectric film through photolithography method or the like, the dielectric film is selectively removed, for example, through ion etching by using that resist pattern as a mask. Finally, the plurality of projections 50B2 are formed by removing the resist pattern, and the TFT substrate 50 is thereby manufactured.

Also in this embodiment, the pixel 10 is selected in the same manner as the first embodiment. In the selected pixel 10, when the drive voltage is applied, for example, the potential difference as illustrated in FIG. 14 is generated between the pixel electrode 50B and the facing electrode 30B. For more detail, on the pixel electrode 50B side, in the electric field generated from the conductive layer 50B1, the non-uniform potential distribution is generated in the parallel direction to the glass substrate 50A by the plurality of projections 50B2. In other words, on the pixel electrode 50B side, the projection 50B2 provided on the liquid crystal layer side of the conductive layer 50B1 is constituted of the dielectric body, and the distortion in the electric field is thereby generated. In the non-uniform potential distribution on the pixel electrode 50B side in the parallel direction to this substrate, since the facing electrode 30B is provided in the whole region facing the pixel electrode 50B, the non-uniformity in the potential distribution is reduced toward the facing electrode 30B side, and the potential is substantially uniformly distributed in the vicinity of the facing electrode 30B. By the non-uniform potential distribution on the pixel electrode 50B side, the electric field containing the component in the oblique direction to the in-plane direction of the glass substrates 50A and 30A is applied to the liquid crystal layer 40.

The orientation state of the liquid crystal molecule 41 contained in the liquid crystal layer 40 corresponding to the potential difference between the pixel electrode 50B and the facing electrode 30B is changed in the same manner as the first embodiment, the incident light on the liquid crystal display element becomes the modulated emission light, and the gradation is expressed based on that emission light. Thereby, the video is displayed.

In the liquid crystal display element and the liquid crystal display device of this embodiment, the TFT substrate 50 includes the pixel electrode 50B including the plurality of projections 50B2 provided on the conductive layer 50B1, as the structure generating the distortion in the electric field, and the CF substrate 30 includes the facing electrode 30B provided in the whole region facing the pixel electrode 50B. The liquid crystal molecule 41A located on the TFT substrate 50 side is oriented in the vertical direction to the glass substrates 50A and 30A. The liquid crystal molecule 41B located on the CF substrate 30 side has the pre-tilt θ2 (θ2>0° C.). The liquid crystal molecule 41B has the pre-tilt θ2, and the response speed to the drive voltage is thus improved. The liquid crystal molecule 41A is oriented in the vertical direction to the glass substrates 50A and 30A, and the transmittance of the light in the black display state is thus reduced. Therefore, according to this embodiment, in the same manner as the first embodiment, the response characteristics are more ensured, and the contrast may be more improved in comparison with the liquid crystal display element of the related art in which the pre-tilt treatment is not performed, and other liquid crystal display elements of the related art in which the liquid crystal molecule located in the vicinity of both of the substrates is provided with the pre-tilt angle larger than 0°. Other actions and effects in this embodiment are same as the first embodiment.

Figure 15A:
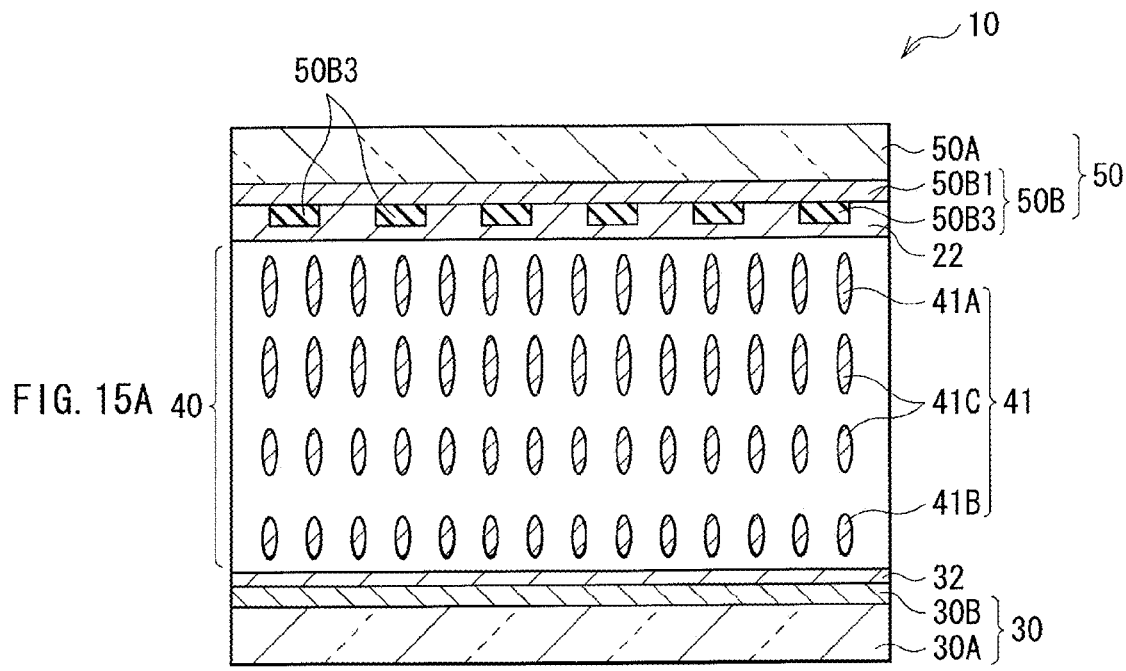
FIG. 15A is a cross-sectional schematic view of the liquid crystal display element according to another structural example of FIG. 12.
Figure 15B:
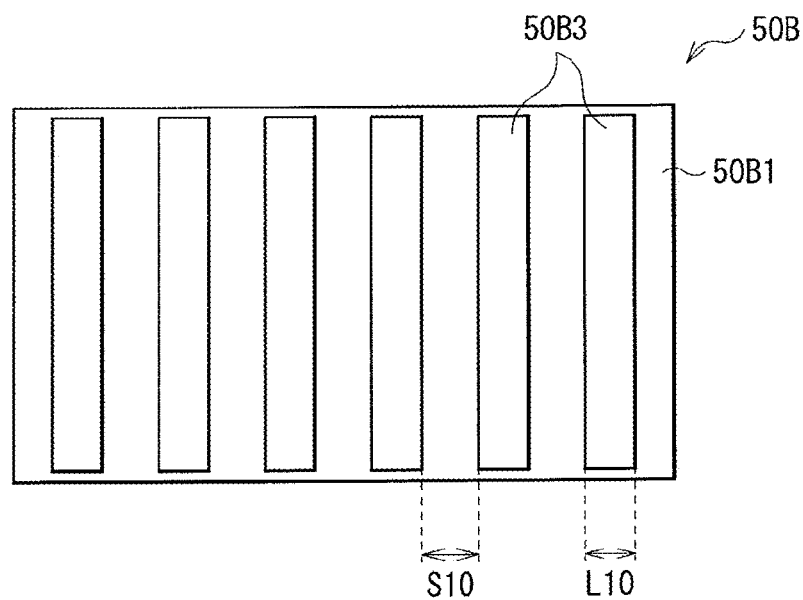
FIG. 15B is a plan schematic view of the pixel electrode.

In this embodiment, in each projection 50B2, the cross-sectional shape in the width direction is the triangle, the plan shape extends in the V-shape on the surface of the conductive layer 50B1 on the liquid crystal layer 40 side, and the plurality of projections 50B2 are arranged to be away from each other with the predetermined interval S10 in between. However, it is not limited to this. For example, as illustrated in FIGS. 15A and 15B, the cross-sectional shape of each projection 50B3 in the width direction may have the rectangular shape, the plane shape of each projection 50B3 may linearly extend on the surface of the conductive layer 50B1 on the liquid crystal layer 40 side, and the plurality of projections 50B3 may be away from each other and arranged in stripe with the predetermined interval S10 in between. Also in this case, the same actions and effects as this embodiment may be obtained. In addition, FIG. 15A schematically illustrates the cross-sectional structure of the modification of the liquid crystal display element illustrated in FIG. 12, and FIG. 15B schematically illustrates the plan structure of the pixel electrode illustrated in FIG. 15A.

2-2. Another Structure or the Like of Liquid Crystal Display Element

Figure 16:
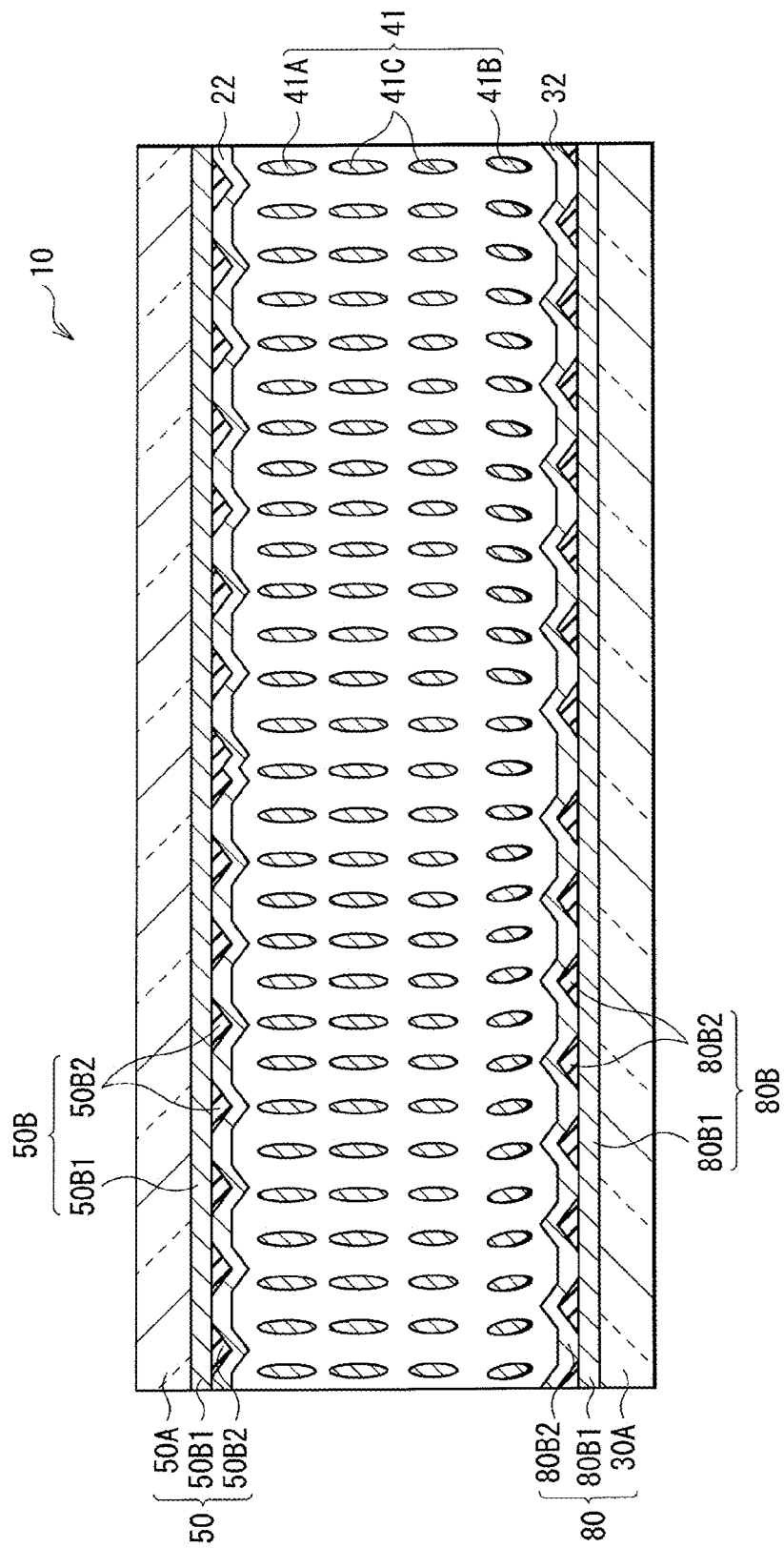
FIG. 16 is another cross-sectional schematic view of the liquid crystal display element in the second embodiment.

FIG. 16 illustrates another structure of the liquid crystal display element according to this embodiment, and illustrates the cross-section corresponding to FIG. 12. This liquid crystal display element has the same structure as the liquid crystal display element illustrated in FIG. 12 except that the liquid crystal display element includes a CF substrate 80 in substitution for the CF substrate 30. Here, the CF substrate 80 includes a conductive layer 80B1 and a plurality of projections 80B2 in this order from the glass substrate 30A side in the same manner as the TFT substrate 50.

The conductive layer 80B1 and the plurality of projections 80B2 in the CF substrate 80 have the same structures as the conductive layer 50B1 and the plurality of projections 50B2 in the TFT substrate 50. Thereby, as described above, the distortion is generated in the electric field when the drive voltage is applied, and the oblique electric field is thus applied to the liquid crystal molecule 41 in the long axis direction. In addition, although the formation pattern of the projection 80B2 is not specifically limited, for example, it is the same as the formation pattern (the V-shape illustrated in FIG. 13) of the projection 50B2. Accordingly, the orientation film 32 is provided on the surface of the CF substrate 80 on the liquid crystal layer 40 side to cover the conductive layer 80B1 and the plurality of projections 80B2.

The positional relationship between the plurality of projections 50B2 of the pixel electrode 50B, and the plurality of projections 80B2 of a facing electrode 80B is not specifically limited. In other words, the positions of the projections 50B2 and the projections 80B2 may be shifted in the substrate surfaces of the TFT substrate 20 and the CF substrate 30, or may be coincident with each other. The distortion is generated in the electric field without depending on the positional relationship between the projections 50B2 and 80B2.

As illustrated in FIG. 16, the positions of the projections 50B2 and 80B2 are preferably shifted from each other. Thereby, in the same manner as the first embodiment where the positions of the slits 21 and 31 are shifted from each other, the distortion is easily generated in the electric field, and the oblique electric field is easily applied to the liquid crystal molecule 41 in the long axis direction.

This liquid crystal display element is manufactured in the same manner as the liquid crystal display element illustrated in FIG. 12 except that the CF substrate 80 illustrated in FIG. 16 is used in substitution for the CF substrate 30 illustrated in FIG. 12. The liquid crystal display element is applicable to the liquid crystal display device illustrated in FIG. 7.

In the liquid crystal display element and the liquid crystal display device, the TFT substrate 50 includes the pixel electrode 50B having the plurality of projections 50B2 provided on the conductive layer 50B1, as the structure generating the distortion in the electric field. The CF substrate 80 includes the facing electrode 80B including the plurality of projections 80B2 provided on the conductive layer 80B1, in the same manner as the TFT substrate 50. The liquid crystal molecule 41A located on the TFT substrate 80 side is oriented in the vertical direction to the glass substrates 50A and 30A. The liquid crystal molecule 41B located on the CF substrate 30 side has the pre-tilt $\theta_2$ ($\theta_2 > 0°$). Thereby, in the same manner as the case where only the pixel electrode 50B includes the conductive layer 50B1 and the plurality of projections 50B2, the response speed to the drive voltage is improved, and the transmittance of the light in the black display state is reduced. Therefore, the response characteristics are ensured, and the contrast may be improved.

In particular, not only the pixel electrode 50B includes the conductive layer 50B1 and the plurality of projections 50B2, but also the facing electrode 80B includes the conductive layer 80B1 and the plurality of projections 80B2. Thus, the oblique electric field is more easily applied to the liquid crystal molecule 41 in the latter case than the former case. Therefore, the response characteristics are more improved.

In the liquid crystal display element and the liquid crystal display device, actions and effects other than those described here are the same as the case where only the pixel electrode 50B includes the conductive layer 50B1 and the plurality of projections 50B2.

3. Modifications 3-1. First Modification

In the first and the second embodiments, although the pre-tilt $\theta_1$ of the liquid crystal molecule 41A is 0°, it is enough if the pre-tilt $\theta_1$ is smaller than the pre-tilt $\theta_2$ of the liquid crystal molecule 41B. In this case, the liquid crystal display element may be manufactured, for example, as will be described below. First, in the step S101, the orientation film 22 is formed by using the same material as the orientation agent used when forming the orientation film 32. Next, for example, an ultraviolet absorber is contained and sealed in the liquid crystal layer 40. Next, the predetermined voltage is applied between the pixel electrode 20B (50B) and the facing electrode 30B, and the ultraviolet ray is irradiated from the TFT substrate 20 (50) side to crosslink the compound before the orientation treatment in the orientation film 22. At this time, the ultraviolet absorber is contained in the liquid crystal layer 40, and the ultraviolet ray entering from the TFT substrate 20 (50) side is thus absorbed in the ultraviolet absorber in the liquid crystal layer 40, and hardly reaches on the CF substrate 30 side. Therefore, the compound after the orientation treatment is generated in the orientation film 22. Next, the voltage different from the predetermined voltage described above is applied between the pixel electrode 20B (50B) and the facing electrode 30B, and the compound before the orientation treatment in the orientation film 32 is reacted by irradiating the ultraviolet ray from the CF substrate 30 side to the orientation film 32. Thereby, the compound after the orientation treatment is formed. In response to the voltage applied in the case where the ultraviolet ray is irradiated from the TFT substrate 20 (50) side, and the voltage applied in the case where the ultraviolet ray is irradiated from the CF substrate 30 side, the pre-tilts $\theta_1$ and $\theta_2$ of the liquid crystal molecules 41A and 41B located in the vicinity of the orientation films 22 and 32 may be set. Therefore, it is possible to set the pre-tilt $\theta_1$ to be larger than 0°, and smaller than the pre-tilt $\theta_2$. Even in this case, the response characteristics are more ensured, and the contrast may be more improved compared with the case where the pre-tilt treatment is not performed, the case where the liquid crystal molecules located in the vicinity of both of the substrates are provided with the same pre-tilt angles, and the case where the pre-tilt $\theta 1$ is larger than the pre-tilt $\theta 2$.

3-2. Second Modification

In the first and the second embodiments, and the first modification, although the CF substrate 30 including the color filter is used as the facing substrate of the TFT substrate 20 (50) including the pixel electrode 20B (50B), the TFT substrate 20 (50) includes the TFT switching and the like, and the color filter, and the facing substrate may be provided as the glass substrate 30A provided with the facing electrode 30B. Thereby, the formation process of the substrate including the facing electrode 30B is simplified, and it is thus possible to suppress the manufacturing cost low. When the liquid crystal molecule 41B is provided with the pre-tilt $\theta 2$ by reacting the compound before the orientation treatment in the orientation film 32, if the ultraviolet ray is irradiated from the substrate side including the facing electrode 30B, absorption of the ultraviolet ray by the color filter in the case where the CF substrate 30 is used, and generation of a non-irradiation region caused by the TFT switching element or the like in the case where the ultraviolet ray is irradiated from outside of the TFT substrate 20 (50) may be suppressed. Therefore, the crosslinkable functional group which is not reacted in the orientation film 32 may be reduced, and the reliability is thus more improved.

3-3. Third Modification

In the first and the second embodiments, and the first and the second modifications, although the case where the orientation film 32 containing the compound before the orientation treatment which contains the main chain having the polyimide structure has been mainly described, the main chain contained in the compound before the orientation treatment is not limited to the compound having the polyimide structure. For example, the main chain may have a polysiloxane structure, a polyacrylate structure, a polymethacrylate structure, a malleinimide polymer structure, a styrene polymer structure, a styrene/mulleinimide polymer structure, a polysaccharide structure or a polyvinyl alcohol structure. Among them, the compound before the orientation treatment containing the main chain which has the polysiloxane structure is preferable because the same effects as the polymer compound having the polyimide structure may be obtained. Examples of the compound before the orientation treatment containing the main chain having the polysiloxane structure include the polymer compound having the polysilane structure represented by the formula 9. Although R40 and R41 in the formula 9 is arbitrary as long as it is a monovalent group containing the carbon, one of R40 and R41 preferably contains the crosslinkable functional group as the side chain because the sufficient orientation control function is easily obtained in the compound after the orientation treatment. Examples of the crosslinkable functional group in this case include the group represented by the formula 2.

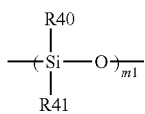

(9)

R40 and R41 each are a monovalent organic group. m1 is an integer of 1 or more.

Hereinafter, specific examples will be described.

Example 1

The liquid crystal display element illustrated in FIG. 1 was manufactured by the following procedure.

First, the TFT substrate 20 and the CF substrate 30 were prepared. As the TFT substrate 20, a substrate obtained by forming the pixel electrode 20B made of ITO which has a slit pattern of the slit 21 with a width of 10 μm, and the liner portion 20B2 with a width of 10 μm on one face side of the glass substrate 20A with a thickness of 0.7 mm was prepared. As the CF substrate 30, a substrate obtained by forming the facing electrode 30B made of ITO on the color filter of the glass substrate 30A which is provided with the color filter, and having a thickness of 0.7 mm was used. Next, the spacer projection of 3.5 μm was formed on the TFT substrate 20.

Next, after applying the orientation material (AL1H659 of JSR Co., LTD.) containing the vertical orientation agent onto the surface on the pixel electrode 20B side of the TFT substrate 20 by using a spin coater, a coat film was dried in a hot plate at 80° C. for 80 seconds. Next, the TFT substrate 20 was heated in an oven under a nitrogen atmosphere at 200° C. for 1 hour. Thereby, the orientation film 22 was formed.

Further, the orientation film 32 was formed. In this case, the orientation agent was prepared. First, the compound containing the crosslinkable functional group represented by the formula D-6 as a diamine compound, the compound represented by the formula F-1, and tetracarboxylic dianhydride represented by the formula E-2 were dissolved in N-methyl-2-pyrrolidone to obtain a mole ratio of 25:25:50 by (formula D-6: formula F-1: formula E-1). Next, after this solution was reacted at 60° C. for 6 hours, a large excess of purified water was poured into the reacted solution to deposit a reaction product. A deposited solid was separated, cleaned with the purified water, and dried under a reduced pressure of 40° C. for 15 hours, and a polyamic acid as the polymer compound precursor was synthesized. Finally, after the obtained polyamic acid was dissolved in the N-methyl-2-pyrrolidone, the polyamic acid solution was filtered with a filter of 0.2 μm.

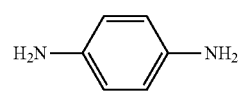

(F-1)

Next, after the prepared orientation material was applied onto the surface on the facing electrode 30B side of the CF substrate 30 by using the spin coater, the orientation film 32 was formed by drying and heating the coat film. In this case, the drying conditions and the heating conditions of the coat film were the same as the conditions when the orientation film 22 was formed.

Next, the seal was formed by applying the ultraviolet cure resin onto the periphery of the pixel section on the CF substrate 30, and a liquid crystal material of MLC-7029 (by Merck & Co., Inc.: $\in\perp=7.2$, $\in//=3.6$) as a negative liquid crystal was instilled into a portion surrounded by the seal. Thereafter, the TTF substrate 20 and the CF substrate 30 are bonded so that the pixel electrode 20B and the facing electrode 30B face each other, and the seal was cured. Next, the seal was completely cured by being heated in the oven at 120°

C. for 1 hour. Thereby, the liquid crystal layer 40 was sealed, and the liquid crystal cell was completed.

Next, in the state where an alternating electric field (60 Hz) having a rectangular wave with an effective voltage of 20V was applied to the liquid crystal cell, ultraviolet light with a wavelength of 300 nm was irradiated at 20 mW/cm² from outside of the TFT substrate 20 to react the compound before the orientation treatment in the orientation film 32. Thereby, the orientation film 32 containing the compound after the orientation treatment was formed on the CF substrate 30. The liquid crystal display element illustrated in FIG. 1 in which the liquid crystal molecule 41A on the TFT substrate 20 side was vertically oriented (pre-tilt $\theta1=0°$) to the substrate surface, and the liquid crystal molecule 41B on the CF substrate 30 side had the pre-tilt $\theta2$ was completed. Finally, the pair of polarizing plates was bonded to outside of the liquid crystal display element so that absorption axes were orthogonal to each other.

Here, the pre-tilts $\theta1$ and $\theta2$ in the completed liquid crystal display element were measured by using a tilt angle measurement device (by Otsuka Electronics Co., Ltd.; RETS-100), and $\theta1=0°$ and $\theta2=1\pm0.3°$.

Example 2

The same procedure as the example 1 was carried out except that the effective voltage was 40V when the alternating electric field having the rectangular wave was applied to the liquid crystal cell. In the same manner as the example 1, the pre-tilts $\theta1$ and $\theta2$ in the liquid crystal display element were measured, and $\theta1=0°$ and $\theta2=1.5\pm0.3°$ Comparative Example 1

The same procedure as the example 1 was carried out except that the orientation material containing the polymer compound precursor containing the crosslinkable functional group was used when forming the orientation film 22, and the orientation material containing the vertical orientation agent was used when forming the orientation film 32. In the same manner as the example 1, the pre-tilts $\theta1$ and $\theta2$ in the liquid crystal display element were measured, and $\theta1=1\pm0.3°$ and $\theta2=0°$ Comparative Example 2

The same procedure as the comparative example 1 was carried out except that the effective voltage was 40V when the alternating electric field having the rectangular wave was applied to the liquid crystal cell. In the same manner as the example 1, the pre-tilts $\theta1$ and $\theta2$ in the liquid crystal display element were measured, and $\theta1=1.5\pm0.3°$ and $\theta2=0°$.

Comparative Example 3

The same procedure as the example 1 was carried out except that the orientation material containing the polymer compound precursor containing the crosslinkable functional group was used when forming the orientation film 22, in substitution of the orientation material containing the vertical orientation agent. In the same manner as the example 1, the pre-tilts $\theta1$ and $\theta2$ in the liquid crystal display element were measured, and $\theta1=1\pm0.3°$ and $\theta2=1\pm0.3°$ ($=\theta1=\theta2$).

Comparative Example 4

The same procedure as the comparative example 3 was carried out except that the effective voltage was 40V when the alternating electric field having the rectangular wave was applied to the liquid crystal cell. In the same manner as the example 1, the pre-tilts $\theta1$ and $\theta2$ in the liquid crystal display element were measured, and $\theta1=1.5\pm0.3°$ and $\theta2=1.5\pm0.3°$ ($=\theta1=\theta2$).

In the liquid crystal display elements of the examples 1 and 2, and the comparative examples 1 to 4, the response time to the drive voltage and the contrast were measured. The results of the response time were indicated in FIG. 17, and the results of the contrast were indicated in FIG. 18.

When measuring the response time, LCD5200 (manufactured by Otsuka Electronics Co., Ltd.) was used as the measurement device, and the drive voltage (4V to 7.5V) was applied between the pixel electrode 20B and the facing electrode 30B. The time used until the luminance of 90% with the gradation according to that drive voltage is obtained from the luminance of 10% was measured.

When measuring the contrast, white light was irradiated from outside of the TFT substrate 20 of the liquid crystal display element in a dark room, and the luminance of the light emitted to the CF substrate 30 side was measured when the drive voltage was not applied, and when the drive voltage of 7.5V was applied. Thereby, the Contrast=(luminance when the drive voltage was not applied (dark state)/(luminance when the drive voltage of 7.5 V was applied (light state) was calculated. CS-2000 (manufactured by Konika Minolta holdings, Inc.,) was used as the measurement device when measuring the luminance.

Figure 17:
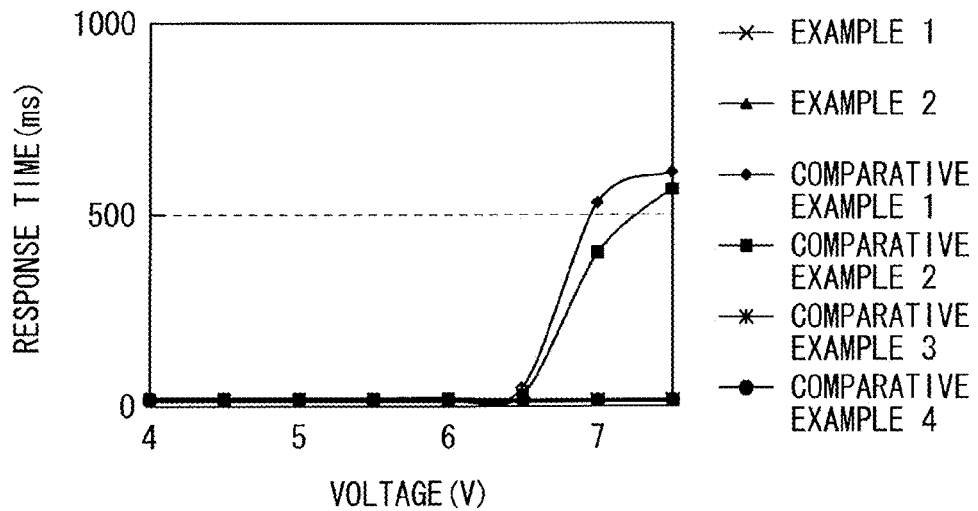
FIG. 17 is a characteristic view illustrating the relationship between an application voltage and a response time in examples 1 and 2, and comparative examples 1 to 4.
Figure 18:
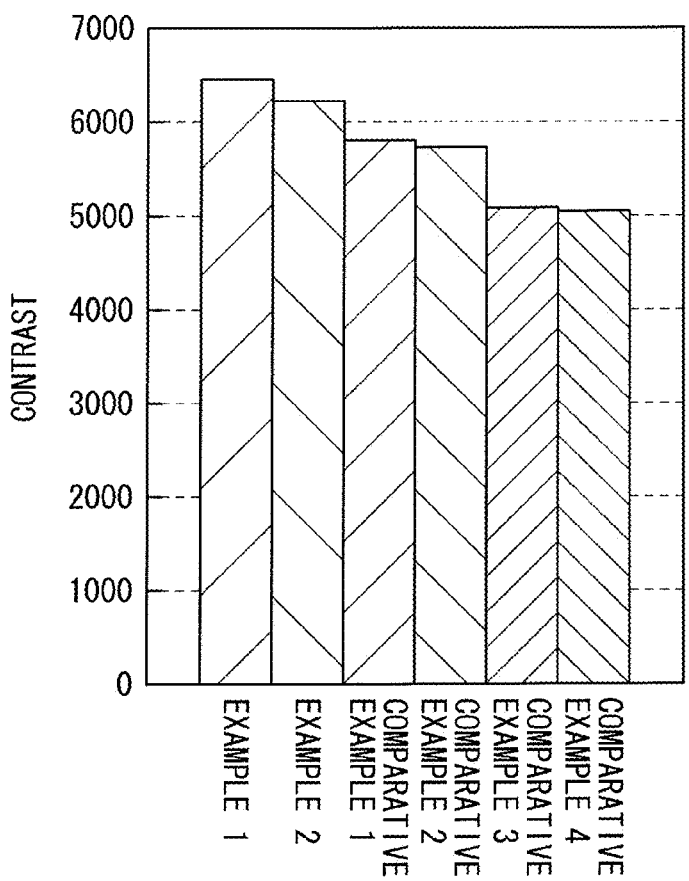
FIG. 18 is a characteristic view illustrating a contrast in the examples 1 and 2, and the comparative examples 1 to 4.

As illustrated in FIGS. 17 and 18, the response time to the drive voltage of 6.5 V or larger was remarkably shorter, and the contrast was higher in the examples 1 and 2 compared with the comparative examples 1 and 2. Further, although the response time to the drive voltage was approximately the same in the examples 1 and 2 compared with the comparative examples 3 and 4, the contrast was remarkably higher.

In the liquid crystal display element of the VA mode including the TFT substrate 20 having the pixel electrode 20B provided with the plurality of slits 21, and the CF substrate 30 having the facing electrode 30B (solid electrode) not provided with the slits, these results indicate the following. That is, the liquid crystal molecule 41A on the TFT substrate 20 side is vertically oriented (pre-tilt $\theta1=0°$) to the substrate surface, and the liquid crystal molecule 41B on the CF substrate 30 side has the pre-tilt $\theta(>0°)$, thereby enabling the transmittance of the light to be more reduced in the non-drive state (black display) compared with the case where the pre-tilts $\theta1$ and $\theta2$ are the same and larger than 0°. Further, the disorder of the orientation in the liquid crystal molecules 41 as a whole may be more suppressed when the drive voltage is applied and in the black display state, compared with the case where the pre-tilt $\theta1$ is larger than 0° and the pre-tilt $\theta2$ is 0°.

From this, it was confirmed that the response characteristics were ensured, and the contrast was improved without depending on the angle of the pre-tilt $\theta2$ in the liquid crystal display element of the VA mode of this example, since the liquid crystal molecule 41A on the TFT substrate 20 side is vertically oriented (pre-tilt) $\theta1=0°$) to the substrate surface, and the liquid crystal molecule 41B on the CF substrate 30 side has the pre-tilt $\theta2$ ($>0°$).

Example 3

The same procedure as the example 1 was carried out except that the TFT substrate 50 was used in substitution for the TFT substrate 20. After manufacturing the liquid crystal display element illustrated in FIG. 15, the pair of polarizing plates was bonded to outside of the liquid crystal display element so that absorption axes were orthogonal to each other. When the TFT substrate 50 was manufactured, the conductive layer 50B1 of ITO was formed in the matrix on one face side of the glass substrate 50A with a thickness of 0.7 mm. Next, the projection 50B3 was formed in stripe on the conductive layer 50B1, to a thickness of 0.2 μm, the width L10 of 4 μm, and the interval S10 of 4 μm by using S1808 (dielectric constant=approximately 4) manufactured by Shipley & Co. as the dielectric body.

The pre-tilts θ1 and θ2 in the liquid crystal display element were measured in the same manner as the example 1, and θ1=0° and θ2=1±0.3°.

Example 4

The same procedure as the example 3 was carried out except that the effective voltage was 40V when the alternating electric field having the rectangular wave was applied to the liquid crystal cell. In the same manner as the example 3, the pre-tilts θ1 and θ2 in the liquid crystal display element were measured, and θ1=0°, and θ2=1.5±0.3°.

Comparative Example 5

The same procedure as the example 3 was carried out except that the orientation material containing the polymer compound precursor containing the crosslinkable functional group was used when forming the orientation film 22, and the orientation material containing the vertical orientation agent was used when forming the orientation film 32. In the same manner as the example 3, the pre-tilts θ1 and θ2 in the liquid crystal display element were measured, and θ1=1±0.3° and θ2=0°.

Comparative Example 6

The same procedure as the comparative example 5 was carried out except that the effective voltage was 40V when the alternating electric field having the rectangular wave was applied to the liquid crystal cell. In the same manner as the example 3, the pre-tilts θ1 and θ2 in the liquid crystal display element were measured, and θ1=1.5±0.3° and θ2=0°.

In the liquid crystal display elements of the examples 3 and 4, and the comparative examples 5 and 6, the response time when applying the drive voltage of 7.5 V was measured in the same manner as the examples 1 and 2. The results illustrated in FIG. 19 were obtained.

Figure 19:
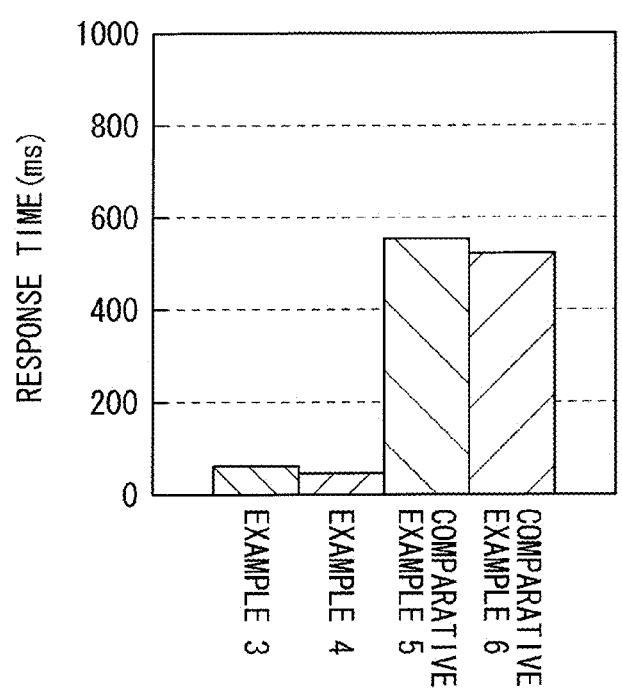
FIG. 19 is a characteristic view illustrating the response time in examples 3 and 4, and comparative examples 5 and 6.

As illustrated in FIG. 19, the response time to the drive voltage of 7.5 V was remarkably shorter in the examples 3 and 4 compared with the comparative examples 5 and 6. This result indicates that the same characteristics as the liquid crystal display element having the pixel electrode 20B provided with the plurality of slits 21 were obtained in the liquid crystal display element including the pixel electrode 50B provided with the plurality of projections 50B3 as the structure generating the distortion in the electric field.

From this, it was confirmed that the response characteristics were ensured, and the contrast was improved without depending on the angle of the pre-tilt θ2 in the liquid crystal display element of the VA mode of this example, since the liquid crystal molecule 41A on the TFT substrate 50 side was vertically oriented (pre-tilt θ1=0°) to the substrate surface, and the liquid crystal molecule 41B on the CF substrate 30 side had the pre-tilt θ2 (>0°).

Examples 5 to 9

The same procedure as the example 3 was carried out except that the dielectric body having the dielectric constant indicated in Table 1 was used as the dielectric body constituting the projection 50B3. In this case, LKD-T400 manufactured by JSR Co., Ltd. (example 5), p-MTES manufactured by Hitachi Development Co., Ltd. (example 6), or S1808 manufactured by Shipley & Co. (example 7) as being the photoresist material was used as the dielectric body. Further, the silicon oxide ($SiO_2$) (example 8), or the silicon nitride ($Si_3N_4$) (example 9) as being the inorganic material was used. In the examples 8 and 9, after the dielectric film was formed on the conductive layer 50B1 through the plasma CVD method ($SiH$—$NH_3$; example 8), or the thermal CVD method ($SiH_4$—$NH_3$; example 9), the pattern of the projection 50B3 was formed through the etching in the same manner as the example 3.

In the liquid crystal display element of the examples 5 to 9, the orientation of the liquid crystal when the drive voltage was applied was evaluated, and the results illustrated in Table 1 were obtained. When the orientation of the liquid crystal was evaluated, the drive voltage was slowly increased from 0V to 5V, and 7V, and the orientation of the liquid crystal was observed. In the case where dark lines due to an orientation defect in the pixel were hardly observed, it was evaluated as "AA". In the case where the dark lines were extremely-slightly observed, it was evaluated as "A". In the case where the dark lines were slightly observed, it was evaluated as "B".

TABLE 1

| | Dielectric constant of projection | Orientation of liquid crystal molecule |
|---|---|---|
| Example 5 | 2 | AA |
| Example 6 | 3 | AA |
| Example 7 | 4 | AA |
| Example 8 | 5 | A |
| Example 9 | 6 | B |

As illustrated in Table 1, the orientation of the liquid crystal molecules 41 when the drive voltage was applied was favorable in the examples 5 to 9 where the projection 50B3 was formed by using the dielectric body with the dielectric constant smaller than the dielectric constant $\in\perp$ in the whole liquid crystal molecules 41. Among them, the orientation of the liquid crystal molecules 41 was more favorable in the examples 5 to 8 compared with the example 9.

From this, it was confirmed that the more excellent response characteristics were obtained in the liquid crystal display element of the VA mode of this example, since the dielectric body constituting the projection 50B3 had the dielectric constant smaller than the dielectric constant $\in\perp$ in the whole liquid crystal molecules 41, and the more excellent orientation of the liquid crystal was obtained.

Example 10

The liquid crystal display element illustrated in FIG. 9 was manufactured by the following procedure.

First, the TFT substrate 20 and the CF substrate 30 were prepared. As the TFT substrate 20, the substrate obtained by forming the pixel electrode 20B (the width of the portion not provided with the slit 21 is 60 μm) made of ITO which had a slit pattern of the slit 21 with a width of 5 μm, and a pitch of 65 μm on one face side of the glass substrate 20A with a thickness of 0.7 mm was used. As the CF substrate 30, the substrate obtained by forming the facing electrode 30B (the width of the portion not provided with the slit 31 is 60 μm) made of ITO having the slit pattern of the slit 31 with a width of 5 μm and a pitch of 65 μm on the color filter of the glass substrate 3A with a thickness of 0.7 mm was used. Next, the spacer projection with a width of 3.5 μm was formed on the TFT substrate 20.

Next, after applying the orientation material (AL1H659 manufactured by JSR Co., Ltd.) containing the vertical orientation agent onto the surface on the pixel electrode 20B side of the TFT substrate 20 by using the spin coater, the coat film was dried in the hot plate at 80° C. for 80 seconds. Next, the TFT substrate 20 was heated in the oven under the nitrogen atmosphere at 200° C. for 1 hour. Thereby, the orientation film 22 was formed.

Further, the orientation film 32 was formed. In this case, first, the orientation material was prepared. The compound containing the crosslinkable functional group represented by the formula A-6 as the diamine compound, the compound including the vertical orientation organic structure section represented by the formula B-4, the tetracarboxylic dianhydride represented by the formula E-2, and the compound represented by the formula F-1 were dissolved in the N-methyl-2-pyrrolidone to obtain a mole ratio of 25:5:50:20 by (formula A-6: formula B-4: formula E-2: formula F-1). Next, after this solution was reacted at 60° C. for 6 hours, the large excess of purified water was poured into the reacted solution to deposit the reaction product. The deposited solid was separated, cleaned with the purified water, and dried under a reduced pressure at 40° C. for 15 hours, and the polyamic acid as the polymer compound precursor was synthesized. Finally, after the obtained polyamic acid was dissolved in the N-methyl-2-pyrrolidone (solid content: 3 weight %), the polyamic acid solution was filtered with the filter of 0.2 μm.

Next, after the prepared orientation material was applied onto the surface on the facing electrode 30B side of the CF substrate 30 by using the spin coater, and the coat film was dried and heated, thereby forming the orientation film 32. In this case, the drying conditions and the heating conditions of the coat film were the same as the conditions when the orientation film 22 was formed.

Next, the seal was formed by applying the ultraviolet cure resin onto the periphery of the pixel section on the CF substrate 30, and the liquid crystal material of MLC-7029 (manufactured by Merck & Co., Inc.: ∈⊥=7.2, ∈//=3.6) as the negative liquid crystal was instilled into the portion surrounded by the seal. Thereafter, the TTF substrate 20 and the CF substrate 30 are bonded so that the pixel electrode 20B and the facing electrode 30B face each other, and the seal was cured. Next, the seal was completely cured by being heated in the oven at 120° C. for 1 hour. Thereby, the liquid crystal layer 40 was sealed, and the liquid crystal cell was completed.

Next, in the state where the alternating electric field (60 Hz) having the rectangular wave with the effective voltage of 10V was applied to the liquid crystal cell, the ultraviolet light with a wavelength of 365 nm was irradiated at 500 mJ from outside of the TFT substrate 20 to react the compound before the orientation treatment in the orientation film 32. Thereby, the orientation film 32 containing the compound after the orientation treatment was formed on the CF substrate 30. As described above, the liquid crystal display element illustrated in FIG. 9 in which the liquid crystal molecule 41A on the TFT substrate 20 side was vertically oriented (pre-tilt θ1=0°) to the substrate surface, and the liquid crystal molecule 41B on the CF substrate 30 side had the pre-tilt θ2 was completed. Finally, the pair of polarizing plates was bonded to outside of the liquid crystal display element so that absorption axes were orthogonal to each other.

Here, the pre-tilts θ1 and θ2 in the completed liquid crystal display element were measured by using the tilt angle measurement device (by Otsuka Electronics Co., Ltd.; RETS-100), and θ1=0° and θ2=1±0.3°.

Example 11

The same procedure as the example 10 was carried out except that the effective voltage was 20 V when the alternating electric field having the rectangular wave was applied to the liquid crystal cell. In the same manner as the example 10, the pre-tilts θ1 and θ2 in the liquid crystal display element were measured, and θ1=0° and θ2=1.5±0.3°.

Example 12

The same procedure as the example 10 was carried out except that the effective voltage was 30 V when the alternating electric field having the rectangular wave was applied to the liquid crystal cell. In the same manner as the example 10, the pre-tilts θ1 and θ2 in the liquid crystal display element were measured, and θ1=0° and θ2=2.5±0.3°.

Comparative Example 7

The same procedure as the example 10 was carried out except that the orientation material containing the polymer compound precursor containing the crosslinkable functional group was used in substitution for the orientation material containing the vertical orientation agent when forming the orientation film 22. In the same manner as the example 10, the pre-tilts θ1 and θ2 in the liquid crystal display element were measured, and θ1=1±0.3° and θ2=1±0.3° (=θ1=θ2).

Comparative Example 8

The same procedure as the comparative example 7 was carried out except that the effective voltage was 20V when the alternating electric field having the rectangular wave was applied to the liquid crystal cell. In the same manner as the example 10, the pre-tilts θ1 and θ2 in the liquid crystal display element were measured, and θ1=1.5±0.3° and θ2=1.5±0.3° (=θ1=θ2).

Comparative Example 9

The same procedure as the comparative example 7 was carried out except that the effective voltage was 30V when the alternating electric field having the rectangular wave was applied to the liquid crystal cell. In the same manner as the example 10, the pre-tilts θ1 and θ2 in the liquid crystal display element were measured, and θ1=2.5±0.3° and θ2=2.5±0.3° (=θ1=θ2).

Examples 13 to 15

The same procedure as the examples 10 to 12 was carried out except that the material of the orientation film was changed. When the orientation film 32 was formed, the compound containing the crosslinkable functional group represented by the formula A-20, the compound having the vertical orientation organic structure section represented by the formula B-4, the compound represented by the formula C-1, the tetracarboxylic dianhydride represented by the formula E-2, and the compound represented by the formula F-1 were dissolved in the N-methyl-2-pyrrolidone to obtain a mole ratio of 15:5:10:50:20 by (formula A-20:formula B-4:formula C-1: formula E-2:formula F-1). The other procedures were the same as the examples 10 to 12. The pre-tilts θ1 and θ2 were measured, and θ1=0° and θ2=1±0.3° in the example 13, θ1=0° and θ2=1.6±0.3° in the example 14, and θ1=0° and θ2=2.7±0.3° in the example 15.

Comparative Examples 10 to 12

The same procedure as the comparative examples 7 to 9 was carried out except that the orientation film 32 was formed in the same manner as the examples 13 to 15. The pre-tilts θ1 and θ2 were measured, and θ1=θ2=1±0.3° in the comparative example 10, θ1=θ2=1.6±0.3° in the comparative example 11, and θ1=θ2=2.7±0.3° in the comparative example 12.

Figure 21A:
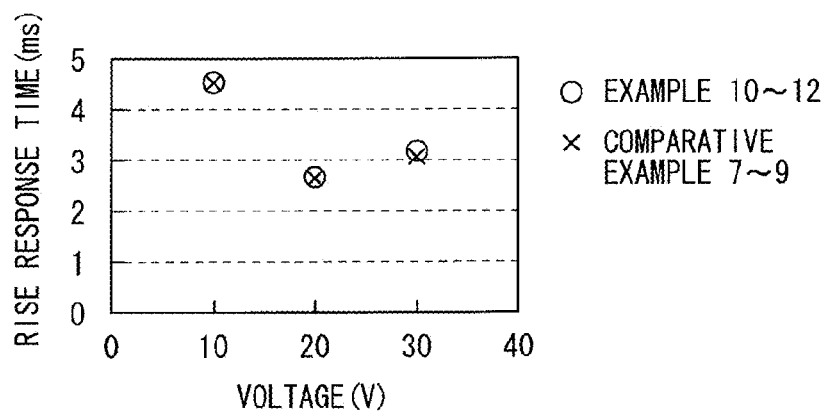
FIGS. 21A and 21B are characteristic views illustrating the relationship between the application voltage and a rise response time in examples 10 to 15, and comparative examples 7 to 12.
Figure 21B:
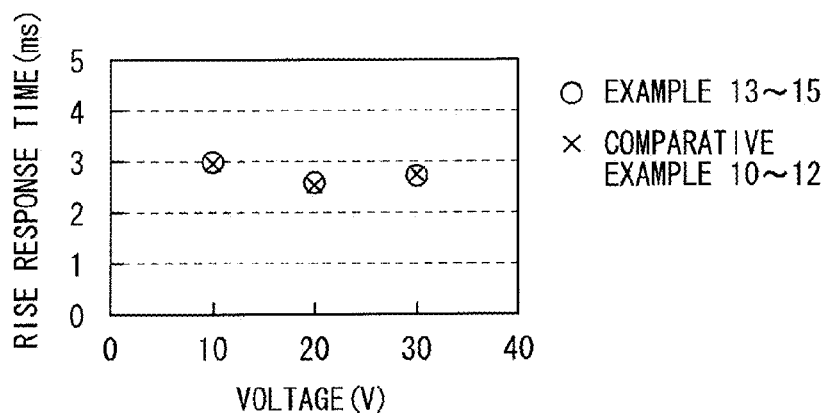
Figure 22A:
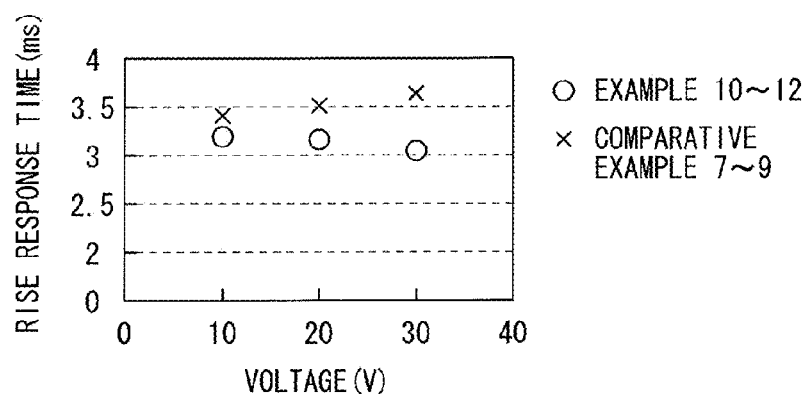
FIGS. 22A and 22B are characteristic views illustrating the relationship between the application voltage and a fall response time in the examples 10 to 15, and the comparative examples 7 to 12.
Figure 22B:
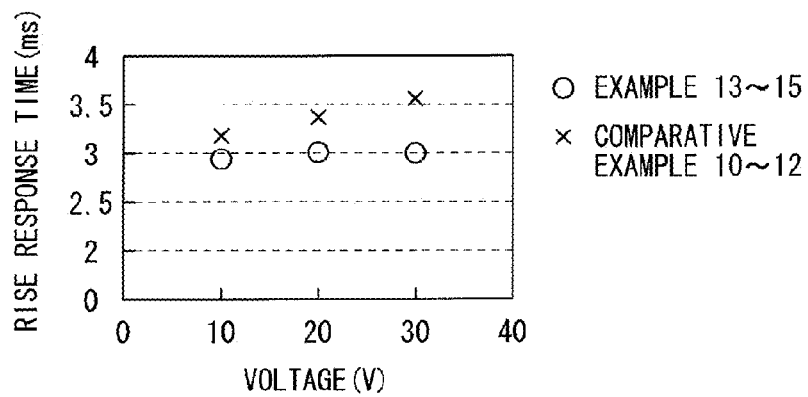
Figure 23A:
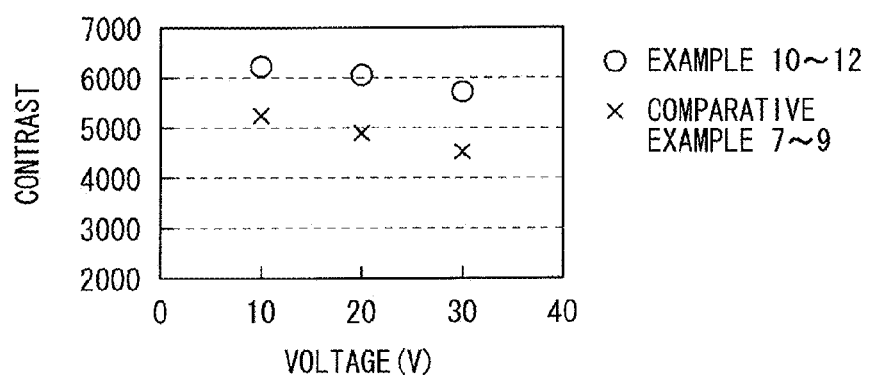
FIGS. 23A and 23B are characteristic views illustrating the relationship between the application voltage and a contrast in the examples 10 to 15, and the comparative examples 7 to 12.
Figure 23B:
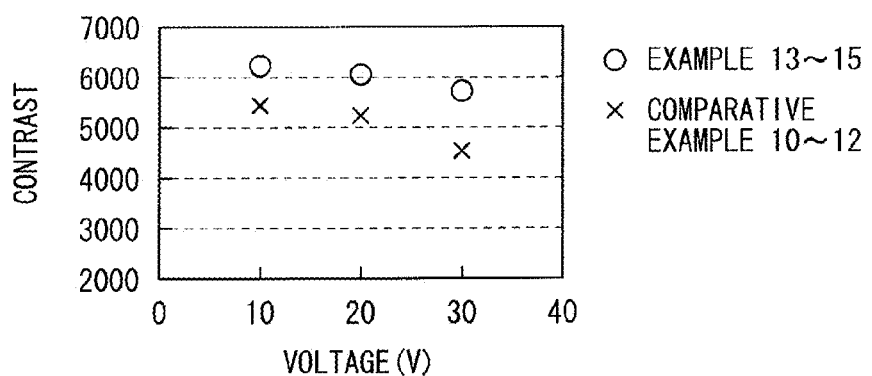

In the liquid crystal display elements in the examples 10 to 15, and the comparative examples 7 to 12, the response time (the rise response time and the fall response time) to the drive voltage, and the contrast were measured. The results of the rise response time were illustrated in FIGS. 21A and 21B, the results of the fall response time were illustrated in FIGS. 22A and 22B, and the results of the contrast were illustrated in FIGS. 23A and 23B. The measurement method of the response time and the contrast was the same as the examples 1 to 9, and the comparative examples 1 to 6. In addition, the response time measured in the examples 1 to 4 and the comparative examples 1 to 6 was a sum of the rise response time and the fall response time.

As illustrated in FIGS. 21A to 21C, to 23A to 23C, the fall response time was remarkably shorter while the rise response time was approximately maintained, and the contrast was higher in the examples 10 to 15 compared with the comparative examples 7 to 12.

Even in the case where the pixel electrode 20B was provided with the plurality of slits 21, and the facing electrode 30B was provided with the plurality of slits 31, these results indicated that the same advantages are obtained as the case where only the pixel electrode 20B was provided with the plurality of slits 21. In other words, the liquid crystal molecule 41A on the TFT substrate 20 side was vertically oriented (pre-tilt θ1=0°) to the substrate surface, and the liquid crystal molecule 41B on the CF substrate 30 side had the pre-tilt θ2 (>0°), thereby enabling the transmittance of the light to be reduced in the non-drive state (black display) and suppressing the disorder in the orientation of the liquid crystal molecules 41 as a whole, when the drive voltage was applied and in the black display state. Therefore, it was confirmed that the response characteristics were ensured, and the contrast might be improved.

In the embodiments, although the description has been made with the transmissive liquid crystal display element, and the liquid crystal display device equipped with the same, the present invention is not limited to this. For example, a reflective liquid crystal display element may be adopted. In the case of the reflective liquid crystal display element, the pixel electrode is constituted of a electrode material having light reflectivity, such as aluminum.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A liquid crystal display element performing a display by a VA mode comprising:
a first substrate including a first electrode;
a liquid crystal layer including a liquid crystal molecule exhibiting a negative dielectric anisotropy; and
a second substrate facing the first substrate with the liquid crystal layer in between, and including a second electrode facing the first electrode, wherein only the first electrode, or both of the first electrode and the second electrode are provided with a structure generating a distortion in an electric field, and
a liquid crystal molecule located on the second substrate side has a pre-tilt angle, measured from a direction normal to the surface of the second substrate, that is larger than that of the liquid crystal molecule located on a first substrate side, wherein the first electrode is configured to function as a pixel electrode, and the second electrode is configured to function as a facing electrode.

2. The liquid crystal display element according to claim 1, wherein only the first electrode, or both of the first electrode and the second electrode are provided with a plurality of slits.

3. The liquid crystal display element according to claim 2, wherein
both of the first electrode and the second electrode are provided with the plurality of slits, and the plurality of slits provided in the first electrode, and the plurality of slits provided in the second electrode are positionally shifted from each other within a substrate surface of the first substrate and the second substrate.

4. The liquid crystal display element according to claim 2, wherein
only the first electrode is provided with the plurality of slits, and
the second electrode is provided in a whole region facing the first electrode including a formation region of the plurality of slits.

5. The liquid crystal display element according to claim 1, wherein the liquid crystal molecule located on the first substrate side is vertically oriented to the substrate surface.

6. The liquid crystal display element according to claim 1, wherein the first substrate comprises: a semiconductor element driving the first electrode; and a color filter.

7. The liquid crystal display element according to claim 5, wherein
a pair of orientation films are provided between the first substrate and the liquid crystal layer, and between the second substrate and the liquid crystal layer, respectively,
the orientation film on the second substrate side contains a compound in which a polymer compound having a crosslinkable functional group, a polymerizable functional group, or a photosensitive functional group as a side chain is reacted through the crosslinkable functional group, the polymerizable functional group, or the photosensitive functional group, and
the reacted compound provides a pre-tilt angle to the liquid crystal molecule on the second substrate side.

8. The liquid crystal display element according to claim 7, wherein the polymer compound contains an imide bond in a repeating unit of a main chain.

9. The liquid crystal display element according to claim 7, wherein the polymer compound contains a group inducting a vertical orientation to the liquid crystal molecule.

10. The liquid crystal display element according to claim 1, wherein the pre-tilt angle of the liquid crystal molecule located on the second substrate side is larger than 0° and 10° or smaller.

11. The liquid crystal display element according to claim 1, wherein only the first electrode, or both of the first electrode and the second electrode are provided with a conductive layer, and a plurality of projections provided on a surface on the liquid crystal layer side of the conductive layer, and constituted of a dielectric body.

12. The liquid crystal display element according to claim 11, wherein
both of the first electrode and the second electrode are provided with the conductive layer, and the plurality of projections, and
the plurality of projections provided in the first electrode, and the plurality of projections provided in the second electrode are positionally shifted from each other within a substrate surface of the first substrate and the second substrate.

13. The liquid crystal display element according to claim 11, wherein
only the first electrode is provided with the conductive layer, and the plurality of slits, and the second electrode is provided in a whole region facing the first electrode.

14. The liquid crystal display element according to claim 11, wherein the plurality of projections are arranged to be away from each other, and extending on the conductive layer.

15. The liquid crystal display element according to claim 11, wherein the dielectric body has a dielectric constant smaller than a dielectric constant E-0.1 of the liquid crystal molecule.

16. The liquid crystal display element according to claim 11, wherein the liquid crystal molecule located on the first substrate side is vertically oriented to the substrate surface.

17. The liquid crystal display element according to claim 11, wherein the first substrate comprises: a semiconductor element driving the first electrode; and a color filter.

18. A liquid crystal display device comprising:
a liquid crystal display element performing a display by a VA mode including a first substrate including a first electrode, a liquid crystal layer including a liquid crystal molecule exhibiting a negative dielectric anisotropy, and a second substrate facing the first substrate with the liquid crystal layer in between, and including a second electrode facing the first electrode, wherein
only the first electrode, or both of the first electrode and the second electrode are provided with a structure generating a distortion in an electric field, and
a liquid crystal molecule located on the second substrate side has a pre-tilt angle, measured from a direction normal to the surface of the second substrate, that is larger than that of a liquid crystal molecule located on the first substrate side, wherein the first electrode is configured to function as a pixel electrode, and the second electrode is configured to function as a facing electrode.

19. The liquid crystal display device according to claim 18, wherein only the first electrode, or both of the first electrode and the second electrode are provided with a plurality of slits.

20. The liquid crystal display device according to claim 18, wherein only the first electrode, or both of the first electrode and the second electrode are provided with a conductive layer, and a plurality of projections provided on a surface on the liquid crystal layer side of the conductive layer, and constituted of a dielectric body.

* * * * *